(12) United States Patent
Sato et al.

(10) Patent No.: US 8,830,592 B2
(45) Date of Patent: Sep. 9, 2014

(54) ZOOM LENS, IMAGING APPARATUS, AND METHOD FOR MANUFACTURING ZOOM LENS

(75) Inventors: Haruo Sato, Kawaguchi (JP); Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 78 days.

(21) Appl. No.: 13/166,631

(22) Filed: Jun. 22, 2011

(65) Prior Publication Data

US 2011/0317278 A1    Dec. 29, 2011

(30) Foreign Application Priority Data

Jun. 23, 2010 (JP) ................. 2010-142941
Jun. 23, 2010 (JP) ................. 2010-142957
Apr. 7, 2011 (JP) ................. 2011-085599
Apr. 7, 2011 (JP) ................. 2011-085605

(51) Int. Cl.
*G02B 15/00* (2006.01)

(52) U.S. Cl.
USPC .......................... 359/682; 359/754

(58) Field of Classification Search
USPC ............... 359/680–682, 749–753, 676, 691; 348/240.3
See application file for complete search history.

(56) References Cited

U.S. PATENT DOCUMENTS

| | | | |
|---|---|---|---|
| 4,540,249 A | 9/1985 | Mogami | |
| 4,571,031 A | 2/1986 | Kato | |
| 5,000,550 A | 3/1991 | Takahashi et al. | |
| 5,781,349 A | 7/1998 | Sugawara | |
| 6,441,967 B2 | 8/2002 | Furuta | |
| 6,519,093 B2 * | 2/2003 | Enomoto | 359/682 |
| 6,621,645 B2 | 9/2003 | Sato | |
| 6,940,655 B2 | 9/2005 | Sato | |
| 7,239,456 B2 | 7/2007 | Kimura et al. | |
| 7,365,916 B2 * | 4/2008 | Sato et al. | 359/718 |
| 7,738,184 B2 | 6/2010 | Kashiki et al. | |
| 7,800,835 B2 | 9/2010 | Izuhara et al. | |
| 2001/0030812 A1 | 10/2001 | Furuta | |
| 2002/0057505 A1 | 5/2002 | Sato | |
| 2003/0234985 A1 | 12/2003 | Sato | |
| 2006/0066961 A1 | 3/2006 | Sato et al. | |
| 2008/0002259 A1 * | 1/2008 | Ishizawa et al. | 359/581 |

(Continued)

FOREIGN PATENT DOCUMENTS

| | | |
|---|---|---|
| JP | 58-005707 A | 1/1983 |
| JP | 58-121011 A | 7/1983 |

(Continued)

*Primary Examiner* — Scott J Sugarman
*Assistant Examiner* — William Alexander
(74) *Attorney, Agent, or Firm* — Miles & Stockbridge P.C.

(57) ABSTRACT

A zoom lens including, from an object: a front group having negative power; and a rear group having positive power, the rear group including, from the object, a positive lens, a negative lens having a concave surface facing the object, a cemented positive lens constructed by a negative lens and a positive lens, and a cemented lens constructed by a positive lens and a negative lens, the rear group further including a focusing group disposed to the object side of the positive lens La for focusing from infinity to a close object by moving from the object side to an image side, a distance between the front group and the rear group being varied thereby zooming from a wide-angle end state to a telephoto end state, and given condition being satisfied, thereby providing a downsized zoom lens having wide angle of view and excellent optical performance with fewer lenses.

29 Claims, 31 Drawing Sheets

(56) References Cited

U.S. PATENT DOCUMENTS

| | | | |
|---|---|---|---|
| 2009/0109546 A1* | 4/2009 | Watanabe et al. | 359/687 |
| 2009/0262236 A1* | 10/2009 | Kashiki et al. | 348/347 |
| 2009/0290227 A1 | 11/2009 | Izuhara et al. | |

FOREIGN PATENT DOCUMENTS

| | | |
|---|---|---|
| JP | 58-132209 A | 8/1983 |
| JP | 02-201310 A | 8/1990 |
| JP | 06-273670 A | 9/1994 |
| JP | 09-021953 A | 1/1997 |
| JP | 2000-356704 A | 12/2000 |
| JP | 2001-159732 A | 6/2001 |
| JP | 2001-166206 A | 6/2001 |
| JP | 2001-330774 A | 11/2001 |
| JP | 2004-021223 A | 1/2004 |
| JP | 2004-226740 A | 8/2004 |
| JP | 2005-316398 A | 11/2005 |
| JP | 2006-106109 A | 4/2006 |
| JP | 2007-094174 A | 4/2007 |
| JP | 2008-233284 A | 10/2008 |
| JP | 2009-276733 A | 11/2009 |
| JP | 2009-282465 A | 12/2009 |

* cited by examiner

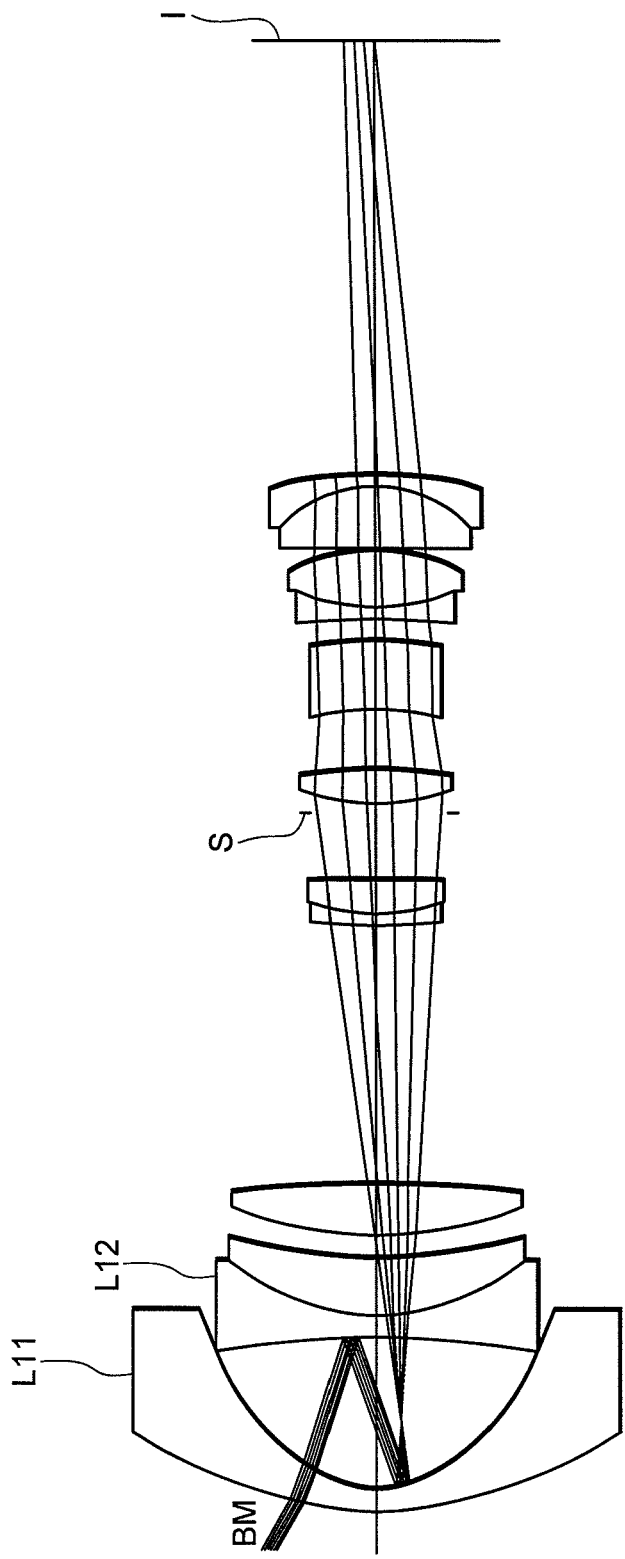

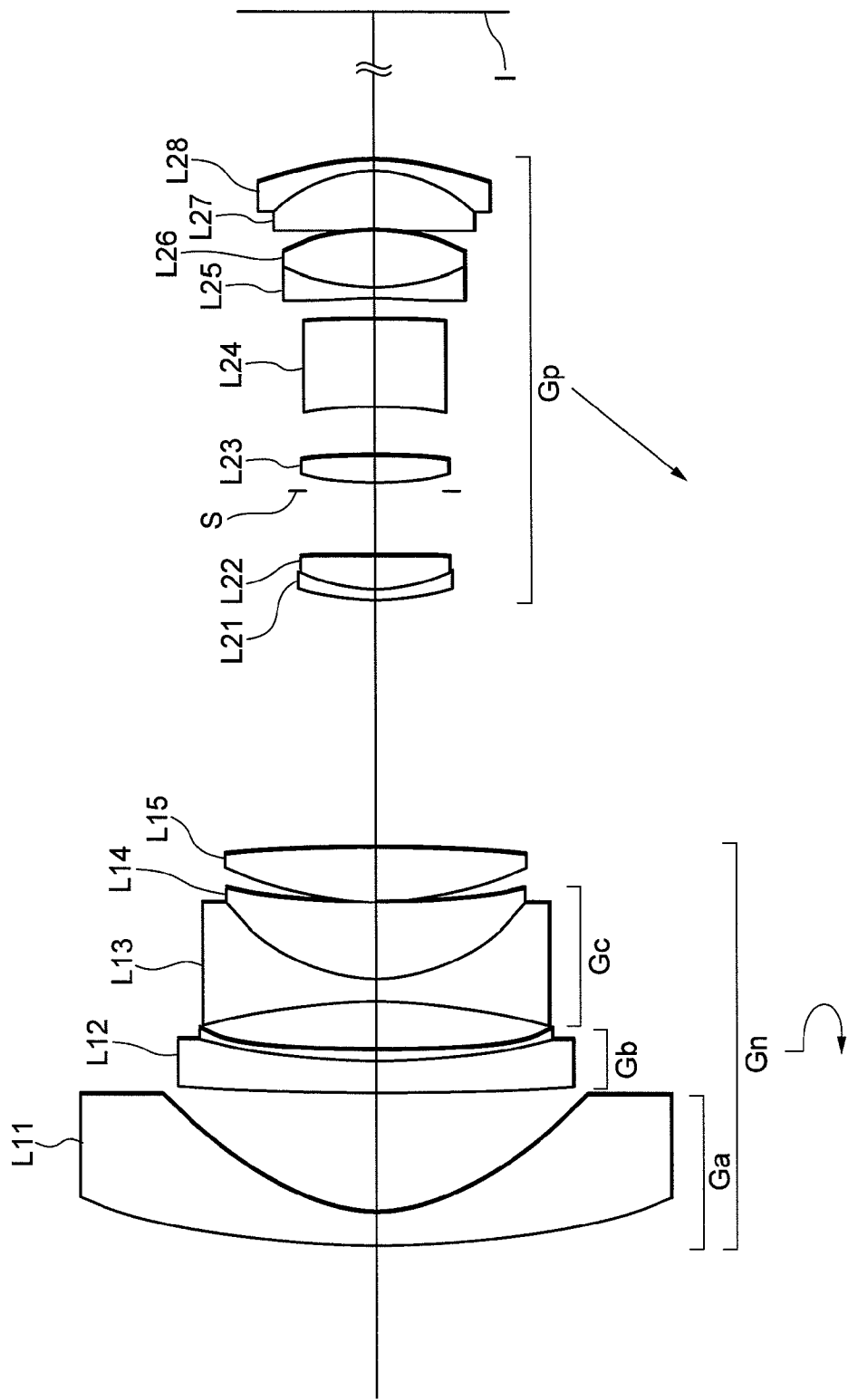

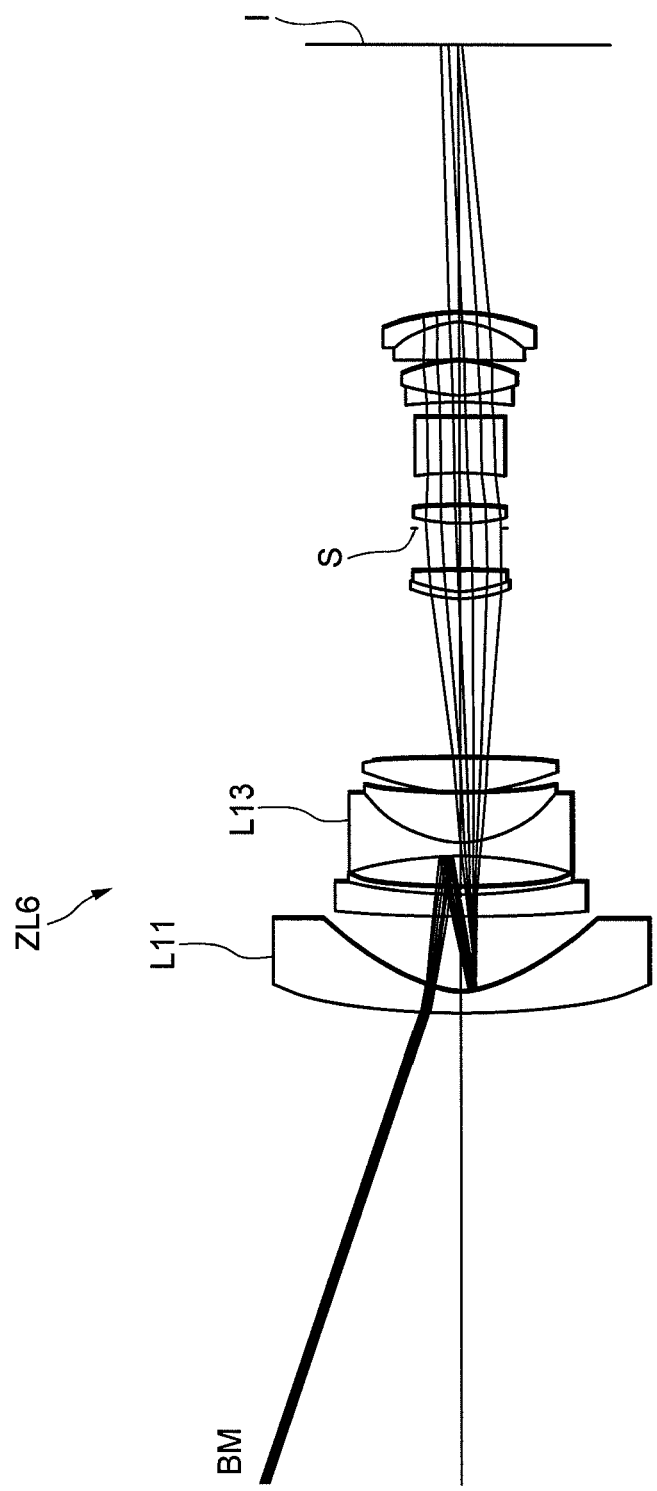

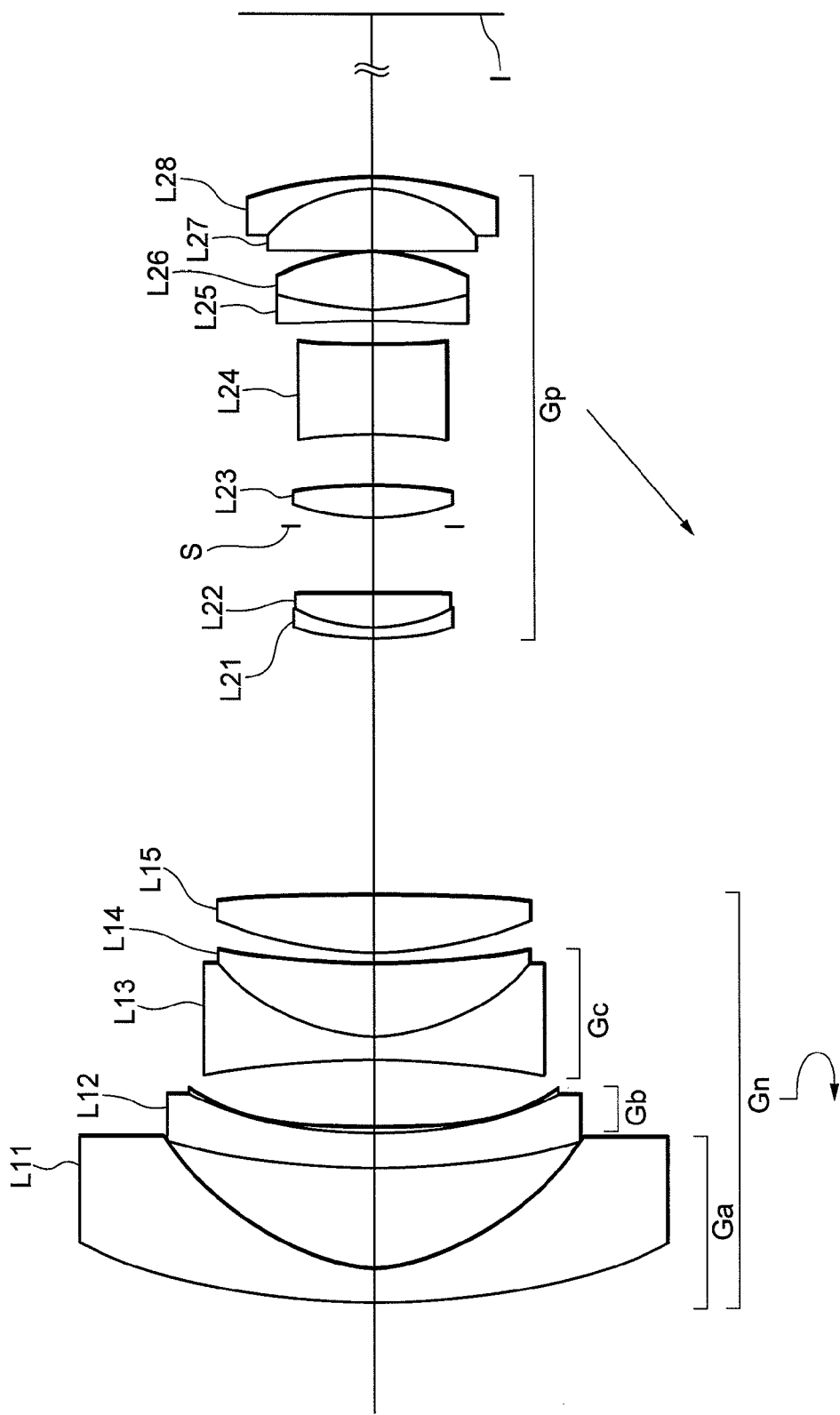

ZOOM LENS, IMAGING APPARATUS, AND METHOD FOR MANUFACTURING ZOOM LENS

The disclosure of the following priority applications are herein incorporated by reference:
Japanese Patent Application No. 2010-142957 filed on Jun. 23, 2010;
Japanese Patent Application No. 2010-142941 filed on Jun. 23, 2010;
Japanese Patent Application No. 2011-085605 filed on Apr. 7, 2011; and
Japanese Patent Application No. 2011-085599 filed on Apr. 7, 2011.

BACKGROUND OF THE INVENTION

1. Field of the Invention

The present invention relates to a zoom lens suitable for a single-lens reflex digital camera, a film camera and a video camera, an imaging apparatus equipped therewith, and a method for manufacturing the zoom lens.

2. Related Background Art

A zoom lens having a wide angle of view has been proposed in such as Japanese Patent Application Laid-Open No. 2004-21223. Regarding such a zoom lens having a wide angle of view, request for suppressing ghost images and flare, which deteriorate optical performance, as well as aberrations become increasingly strong. Accordingly, a higher optical performance is required to antireflection coatings applied to a lens surface, so that in order to meet such request, multilayer design technology and multilayer coating technology are continuously progressing (for example, see Japanese Patent Application Laid-Open No. 2000-356704).

However, in a conventional retrofocus type zoom lens described above, in order to improve optical performance, there has been a tendency that composition of the rear lens group becomes complicated and the number of lens elements increases. Moreover, since the rear lens group has been generally a so-called modified triplet type or an Ernostar type including a lens with strong negative power, decentering susceptibility tends to become high, so that assembling the lens system has been difficult.

Moreover, in a conventional zoom lens for a 35 mm format camera having a wide angle of view, since the diameter of the front lens is well exceeding a commonly used filter size. Moreover, when the angle of view of the zoom lens is made to be wider by using a conventional technique, the zoom lens may become a one having serious defects in astigmatism, curvature of field, coma and distortion. In addition, there is a problem that reflection light producing ghost images and flare is liable to be generated from optical surfaces in such a zoom lens.

SUMMARY OF THE INVENTION

The present invention is made in view of the above-described problems, and has an object to provide a downsized zoom lens having a wide angle of view and excellent optical performance with correcting various aberrations suppressing ghost images and flare, an imaging lens equipped therewith, and a method for manufacturing the zoom lens.

According to a first aspect of the present invention, there is provided a zoom lens comprising, in order from an object side: a front lens group having negative refractive power; and a rear lens group having positive refractive power, the rear lens group including, in order from the object side, a positive lens La, a negative lens Lb having a concave surface facing the object side, a cemented positive lens Lc constructed by a negative lens cemented with a positive lens, and a cemented lens Ld constructed by a positive lens cemented with a negative lens, the rear lens group further including a focusing lens group Gf disposed to the object side of the positive lens La for carrying out focusing from an infinitely distant object to a close object by moving from the object side to an image side, a distance between the front lens group and the rear lens group being varied thereby carrying out zooming from a wide-angle end state to a telephoto end state, the following conditional expression (1) being satisfied:

$$0.000 < Fw/(-Fb) < 1.000 \qquad (1)$$

where Fw denotes a focal length of the zoom lens in a wide-angle end state upon focusing on an infinitely distant object, and Fb denotes a focal length of the negative lens Lb in the rear lens group.

According to a second aspect of the present invention, there is provided an imaging apparatus equipped with the zoom lens according to the first aspect.

According to a third aspect of the present invention, there is provided a zoom lens comprising, in order from an object side: a front lens group having negative refractive power; and a rear lens group having positive refractive power, the front lens group including, in order from the object side, an aspherical lens component Ga that has negative refractive power and a shape that the negative refractive power becomes smaller toward the periphery, and an aspherical lens component Gb that has positive refractive power and a shape that the positive refractive power turns to negative refractive power toward the periphery or has negative refractive power and a shape that the negative refractive becomes stronger toward the periphery, a distance between the front lens group and the rear lens group being varied thereby carrying out zooming from a wide-angle end state to a telephoto end state, the following conditional expression (6) being satisfied:

$$0.000 \leq (-Fa)/|Fb| < 0.650 \qquad (6)$$

where Fa denotes a focal length of the aspherical lens component Ga in the front lens group, and Fb denotes a focal length of the aspherical lens component Gb in the front lens group.

According to a fourth aspect of the present invention, there is provided an imaging apparatus equipped with the zoom lens according to the third aspect.

According to a fifth aspect of the present invention, there is provided a method for manufacturing a zoom lens including, in order from an object side, a front lens group having negative refractive power, and a rear lens group having positive refractive power, the method comprising steps of: disposing, in order from the object side, a positive lens La, a negative lens Lb having a concave surface facing the object side, a cemented positive lens Lc constructed by a negative lens cemented with a positive lens, and a cemented lens Ld constructed by a positive lens cemented with a negative lens, and further disposing a focusing lens group Gf disposed to the object side of the positive lens La for carrying out focusing from an infinitely distant object to a close object by moving from the object side to the image side into the rear lens group; disposing each lens group with satisfying the following conditional expression (1):

$$0.000 < Fw/(-Fb) < 1.000 \qquad (1)$$

where Fw denotes a focal length of the zoom lens in a wide-angle end state upon focusing on an infinitely distant object, and Fb denotes a focal length of the negative lens Lb in the rear lens group; and carrying out zooming by varying a distance between the front lens group and the rear lens group.

According to a sixth aspect of the present invention, there is provided a method for manufacturing a zoom lens including, in order from an object side, a front lens group having negative refractive power, and a rear lens group having positive refractive power, the method comprising steps of: disposing, in order from the object side, an aspherical lens component Ga that has negative refractive power and the negative refractive power becomes weaker toward periphery, and an aspherical lens component Gb that has positive refractive power and the positive refractive power varies to negative toward periphery, or has negative refractive power and the negative refractive power becomes strong toward periphery into the front lens group; disposing the aspherical lens component Ga and the aspherical lens component Gb with satisfying the following conditional expression (6):

$$0.000 \leq (-Fa)/|Fb| < 0.650 \quad (6)$$

where Fa denotes a focal length of the aspherical lens component Ga in the front lens group, and Fb denotes a focal length of the aspherical lens component Gb in the front lens group; and carrying out zooming by varying a distance between the front lens group and the rear lens group.

The present invention makes it possible to provide a downsized zoom lens having a wide angle of view and excellent optical performance with fewer number of lenses with correcting various aberrations suppressing ghost images and flare, an imaging lens equipped therewith, and a method for manufacturing the zoom lens.

BRIEF DESCRIPTION OF THE DRAWINGS

FIGS. 2A, 2B and 2C are graphs showing various aberrations of the zoom lens according to Example 1 upon focusing on an infinitely distant object, in which FIG. 2A is a wide-angle end state, FIG. 2B is an intermediate focal length state, and FIG. 2C is a telephoto end state.

FIG. 3 is a sectional view showing the lens configuration of the lens system according to Example 1 of the first embodiment and is an explanatory view, in which light rays reflected from a first-ghost-generating surface are reflected by a second-ghost-generating surface.

FIGS. 5A, 5B and 5C are graphs showing various aberrations of the zoom lens according to Example 2 of the first embodiment upon focusing on an infinitely distant object, in which FIG. 5A is a wide-angle end state, FIG. 5B is an intermediate focal length state, and FIG. 5C is a telephoto end state.

FIGS. 7A, 7B and 7C are graphs showing various aberrations of the zoom lens according to Example 3 of the first embodiment upon focusing on an infinitely distant object, in which FIG. 7A is a wide-angle end state, FIG. 7B is an intermediate focal length state, and FIG. 7C is a telephoto end state.

FIGS. 9A, 9B and 9C are graphs showing various aberrations of the zoom lens according to Example 4 of the first embodiment upon focusing on an infinitely distant object, in which FIG. 9A is a wide-angle end state, FIG. 9B is an intermediate focal length state, and FIG. 9C is a telephoto end state.

FIGS. 11A, 11B and 11C are graphs showing various aberrations of the zoom lens according to Example 5 of the first embodiment upon focusing on an infinitely distant object, in which FIG. 11A is a wide-angle end state, FIG. 11B is an intermediate focal length state, and FIG. 11C is a telephoto end state.

FIG. 12 is a sectional view showing a lens configuration of a zoom lens according to Example 6 of a second embodiment of the present application.

FIGS. 13A, 13B and 13C are graphs showing various aberrations of the zoom lens according to Example 6 of the second embodiment upon focusing on an infinitely distant object, in which FIG. 13A is a wide-angle end state, FIG. 13B is an intermediate focal length state, and FIG. 13C is a telephoto end state.

FIG. 14 is a sectional view showing the lens configuration of the lens system according to Example 6 of the second embodiment and is an explanatory view, in which light rays reflected from a first-ghost-generating surface are reflected by a second-ghost-generating surface.

FIG. 15 is a sectional view showing a lens configuration of a zoom lens according to Example 7 of the second embodiment of the present application.

FIGS. 16A, 16B and 16C are graphs showing various aberrations of the zoom lens according to Example 7 of the second embodiment upon focusing on an infinitely distant object, in which FIG. 16A is a wide-angle end state, FIG. 16B is an intermediate focal length state, and FIG. 16C is a telephoto end state.

FIGS. 18A, 18B and 18C are graphs showing various aberrations of the zoom lens according to Example 8 of the second embodiment upon focusing on an infinitely distant object, in which FIG. 18A is a wide-angle end state, FIG. 18B is an intermediate focal length state, and FIG. 18C is a telephoto end state.

FIGS. 20A, 20B and 20C are graphs showing various aberrations of the zoom lens according to Example 9 of the second embodiment upon focusing on an infinitely distant object, in which FIG. 20A is a wide-angle end state, FIG. 20B is an intermediate focal length state, and FIG. 20C is a telephoto end state.

FIGS. 22A, 22B and 22C are graphs showing various aberrations of the zoom lens according to Example 10 of the second embodiment upon focusing on an infinitely distant object, in which FIG. 22A is a wide-angle end state, FIG. 22B is an intermediate focal length state, and FIG. 22C is a telephoto end state.

DESCRIPTION OF THE MOST PREFERRED EMBODIMENT

First Embodiment

Figure 1:
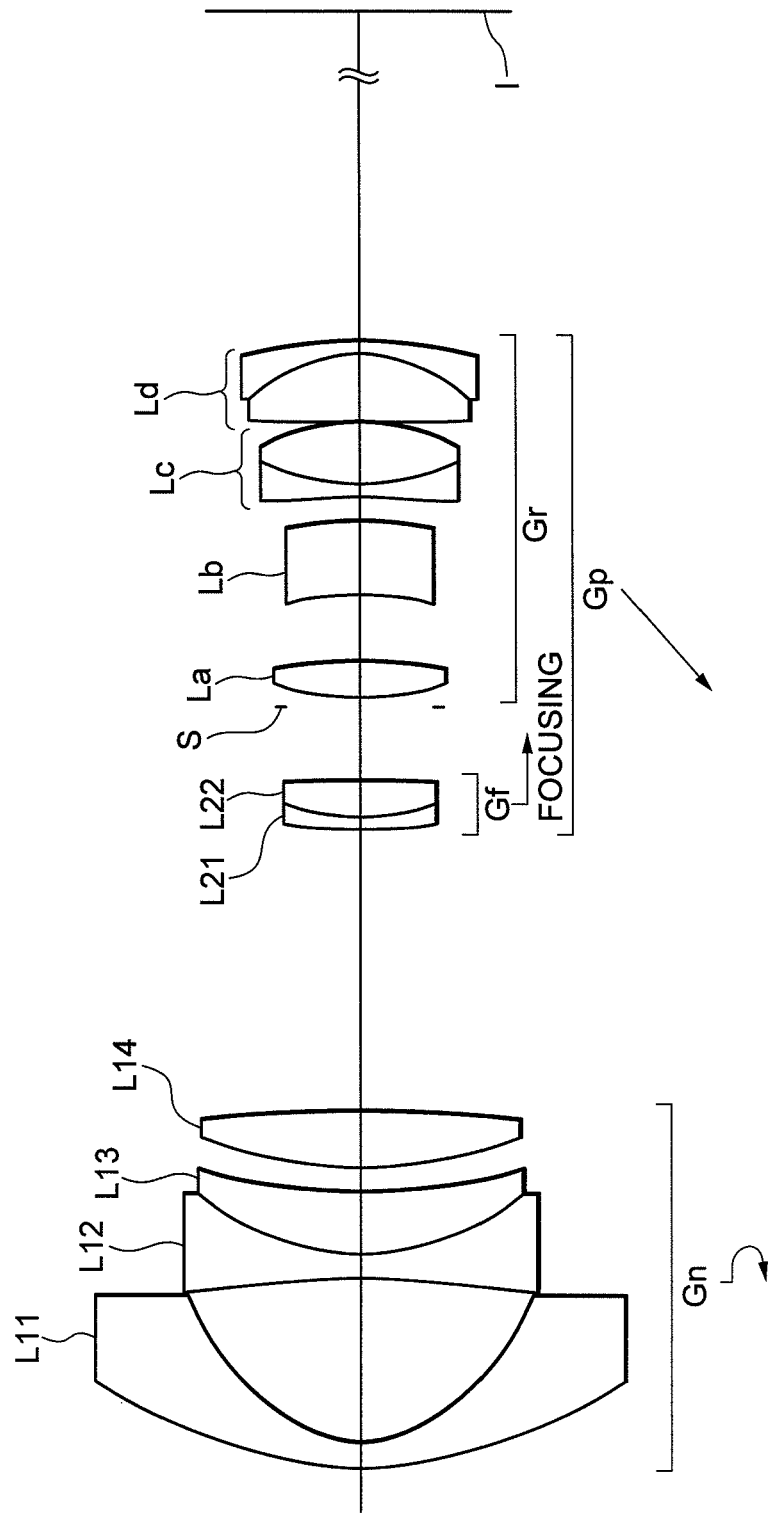
FIG. 1 is a sectional view showing a lens configuration of a zoom lens according to Example 1 of a first embodiment of the present application.

A zoom lens, an imaging apparatus equipped therewith, and a method for manufacturing the zoom lens according to a first embodiment of the present application are explained below.

A zoom lens according to the first embodiment of the present application includes, in order from an object side, a front lens group having negative refractive power, and a rear lens group having positive refractive power. The rear lens group includes, in order from the object side, a positive lens La, a negative lens Lb having a concave surface facing the object side, a cemented positive lens Lc constructed by a negative lens cemented with a positive lens, and a cemented lens Ld constructed by a positive lens cemented with a negative lens, and further includes a focusing lens group Gf having positive refractive power disposed to the object side of the positive lens La for carrying out focusing from an infinitely distant object to a close object by moving from the object side to the image side. Zooming is carried out by varying a distance between the front lens group and the rear lens group. The following conditional expression (1) is satisfied:

$$0.000 < Fw/(-Fb) < 1.000 \quad (1)$$

where Fw denotes a focal length of the zoom lens in a wide-angle end state upon focusing on an infinitely distant object, and Fb denotes a focal length of the negative lens Lb in the rear lens group.

Generally, in a construction of a rear lens group, which is a master lens group, of a retrofocus type zoom lens having a wide angle of view, a modified triplet type or an Ernostar type has been a mainstream because of a relation between a principal point and a back focal length. However, since such a rear lens group takes a measure to correct aberrations generated in the positive lens by the negative lens, susceptibility of each of decentering, a lens thickness, and an air distance tends to become high. Such a phenomenon is conspicuous in a zoom lens having a larger diameter, or a zoom lens whose rear lens group, which is a master lens, has large refractive power.

In a zoom lens according to the first embodiment, in order to improve this point, the lens construction composed of, in order from the object side, a positive lens group, a positive lens, a negative lens, a cemented positive lens and a cemented lens is made a basic construction of the rear lens group, so that refractive power of the negative lens disposed in the center can be small. Accordingly, the susceptibility can be lowered, and spherical aberration, coma, curvature of field and astigmatism can be excellently corrected, so that a downsized zoom lens having a wide angle of view and excellent optical performance can be accomplished.

Then, the characteristics of a zoom lens according to the first embodiment of the present application are explained on the basis of each conditional expression.

Conditional expression (1) defines a focal length of the negative lens Lb in the rear lens group, in other words, refractive power of the negative lens Lb.

When the ratio Fw/(−Fb) is equal to or exceeds the upper limit of conditional expression (1), an absolute value of the focal length of the negative lens Lb becomes small, in other words, negative refractive power of the negative lens Lb becomes strong. In this case, spherical aberration becomes over-correction, so that it is undesirable. Moreover, decentering susceptibility increases, so that it is undesirable.

In order to secure the effect of the present application, it is preferable to set the upper limit of conditional expression (1) to 0.900 or less. In order to further secure the effect of the present application, it is greatly preferable to set the upper limit of conditional expression (1) to 0.800 or less, so that excellent aberration correction can be carried out. In order to further secure the effect of the present application, it is greatly preferable to set the upper limit of conditional expression (1) to 0.700 or less. In order to still further secure the effect of the present application, it is greatly preferable to set the upper limit of conditional expression (1) to 0.600 or less. In order to still further secure the effect of the present application, it is most preferable to set the upper limit of conditional expression (1) to 0.500 or less.

On the other hand, when the ratio Fw/(−Fb) is equal to or falls below the lower limit of conditional expression (1), the absolute value of the focal length of the negative lens Lb becomes large, in other words, negative refractive power of the negative lens Lb becomes excessively small. Otherwise, the negative lens Lb becomes to have positive refractive power. In this case, spherical aberration becomes under-correction, and burden of aberration correction is born on the cemented positive lens Lc and the cemented lens Ld. As a result, coma, curvature of field and astigmatism become worse, so that it is undesirable.

In order to secure the effect of the present application, it is preferable to set the lower limit of conditional expression (1) to 0.005 or more. In order to further secure the effect of the present application, it is preferable to set the lower limit of conditional expression (1) to 0.010 or more, so that various aberrations can be excellently corrected. In order to further secure the effect of the present application, it is preferable to set the lower limit of conditional expression (1) to 0.020 or more. In order to fully secure the effect of the present application, it is most preferable to set the lower limit of conditional expression (1) to 0.030 or more.

In a zoom lens according to the first embodiment of the present application, the following conditional expression (2) is preferably satisfied:

$$0.00 < Fw/|Fd| < 1.00 \quad (2)$$

where Fw denotes a focal length of the zoom lens in the wide-angle end state upon focusing on an infinitely distant object, and Fd denotes a focal length of the cemented lens Ld in the rear lens group.

Conditional expression (2) defines the focal length of the cemented lens Ld in the rear lens group, in other words, refractive power of the cemented lens Ld.

When the ratio<Fw/|Fd| is equal to or exceeds the upper limit of conditional expression (2), an absolute value of the focal length of the cemented lens Ld becomes small, in other words, refractive power of the cemented lens Ld becomes large. In this case, spherical aberration, coma, and variation in coma upon zooming increase, so that it is undesirable. Moreover, curvature of field and astigmatism become worse, so that it is undesirable.

In order to secure the effect of the present application, it is preferable to set the upper limit of conditional expression (2) to 0.80 or less. In order to further secure the effect of the present application, it is greatly preferable to set the upper limit of conditional expression (2) to 0.50 or less, so that various aberrations can be effectively corrected. In order to further secure the effect of the present application, it is greatly preferable to set the upper limit of conditional expression (2) to 0.30 or less. In order to still further secure the effect of the present application, it is greatly preferable to set the upper limit of conditional expression (2) to 0.20 or less. In order to fully secure the effect of the present application, it is most preferable to set the upper limit of conditional expression (2) to 0.10 or less.

On the other hand, when the ratio<Fw/|Fd| is equal to or falls below the lower limit of conditional expression (2), an absolute value of the focal length of the cemented lens Ld becomes large, in other words, refractive power of the cemented lens Ld becomes excessively small. In this case, aberration correction ability of the cemented lens Ld becomes excessively small, so that burden of aberration correction is born on the positive cemented lens Lc. As a result, variation in coma with respect to an angle and coma upon zooming increase, so that it is undesirable.

In order to secure the effect of the present application, it is preferable to set the lower limit of conditional expression (2) to 0.0005 or more. In order to further secure the effect of the present application, it is greatly preferable to set the lower limit of conditional expression (2) to 0.0010 or more, so that various aberrations such as coma can be effectively corrected. In order to still further secure the effect of the present application, it is greatly preferable to set the lower limit of conditional expression (2) to 0.0015 or more. In order to fully secure the effect of the present application, it is most preferable to set the lower limit of conditional expression (2) to 0.0030 or more.

In a zoom lens according to the first embodiment of the present application, the following conditional expression (3) is preferably satisfied:

$$0.005 < Fw/Fc < 1.000 \quad (3)$$

where Fw denotes a focal length of the zoom lens in the wide-angle end state upon focusing on an infinitely distant object, and Fc denotes a focal length of the cemented positive lens Lc in the rear lens group.

Conditional expression (3) defines the focal length of the cemented positive lens Lc in the rear lens group, in other words, refractive power of the cemented positive lens Lc.

When the ratio <Fw/Fc is equal to or exceeds the upper limit of conditional expression (3), the focal length of the cemented positive lens Lc becomes small, in other words, refractive power of the cemented positive lens Lc becomes large. In this case, spherical aberration, and variation in coma upon zooming increase, so that it is undesirable. Moreover, curvature of field and astigmatism become worse, so that it is undesirable.

In order to secure the effect of the present application, it is preferable to set the upper limit of conditional expression (3) to 0.80 or less. In order to further secure the effect of the present application, it is greatly preferable to set the upper limit of conditional expression (3) to 0.50 or less. In order to further secure the effect of the present application, it is greatly preferable to set the upper limit of conditional expression (3) to 0.30 or less. In order to fully secure the effect of the present application, it is most preferable to set the upper limit of conditional expression (3) to 0.20 or less.

On the other hand, when the ratio Fw/Fc is equal to or falls below the lower limit of conditional expression (3), the focal length of the cemented positive lens Lc becomes large, in other words, refractive power of the cemented positive lens Lc becomes excessively small. Otherwise, the cemented positive lens Lc has negative refractive power. In this case, burden of aberration correction is born on the cemented lens Ld. As a result, variation in coma with respect to an angle of view and coma upon zooming increase, so that it is undesirable.

In order to secure the effect of the present application, it is preferable to set the lower limit of conditional expression (3) to 0.01 or more. In order to further secure the effect of the present application, it is greatly preferable to set the lower limit of conditional expression (3) to 0.03 or more, so that various aberrations can be effectively corrected. In order to still further secure the effect of the present application, it is greatly preferable to set the lower limit of conditional expression (3) to 0.05 or more. In order to fully secure the effect of the present application, it is most preferable to set the lower limit of conditional expression (3) to 0.07 or more.

In a zoom lens according to the first embodiment of the present application, the following conditional expression (4) is preferably satisfied:

$$0.005 < Fw/Ff < 1.000 \quad (4)$$

where Fw denotes a focal length of the zoom lens in the wide-angle end state upon focusing on an infinitely distant object, and Ff denotes a focal length of the focusing lens group Gf in the rear lens group.

Conditional expression (4) defines the focal length of the focusing lens group Gf in the rear lens group, in other words, refractive power of the focusing lens group Gf.

When the ratio Fw/Ff is equal to or exceeds the upper limit of conditional expression (4), the focal length of the focusing lens group Gf becomes small, in other words, refractive power of the focusing lens group Gf becomes large. Accordingly, chromatic difference in spherical aberration, longitudinal chromatic aberration and coma in the telephoto end state become worse, so that it is undesirable.

In order to secure the effect of the present application, it is preferable to set the upper limit of conditional expression (4) to 0.80 or less. In order to further secure the effect of the present application, it is greatly preferable to set the upper limit of conditional expression (4) to 0.70 or less, so that various aberrations can be effectively corrected. In order to further secure the effect of the present application, it is greatly preferable to set the upper limit of conditional expression (4) to 0.50 or less. In order to fully secure the effect of the present application, it is most preferable to set the upper limit of conditional expression (4) to 0.30 or less.

On the other hand, when the ratio Fw/Ff is equal to or falls below the lower limit of conditional expression (4), the focal length of the focusing lens group Gf becomes large, in other words, refractive power of the focusing lens group Gf becomes excessively small. Otherwise, the focusing lens group Gf has negative refractive power. In this case, the focusing lens group Gf cannot play the part of the focusing lens group, and moving amount of the focusing lens group Gf for focusing becomes large, so that the whole of the zoom lens becomes large. Accordingly, it is undesirable. Moreover, chromatic difference in spherical aberration, longitudinal chromatic aberration, and coma in the telephoto end state consequently become worse, so that it is undesirable.

In order to secure the effect of the present application, it is preferable to set the lower limit of conditional expression (4) to 0.01 or more. In order to further secure the effect of the present application, it is greatly preferable to set the lower limit of conditional expression (4) to 0.03 or more, so that various aberrations can be excellently corrected. In order to still further secure the effect of the present application, it is greatly preferable to set the lower limit of conditional expression (4) to 0.04 or more. In order to fully secure the effect of the present application, it is most preferable to set the lower limit of conditional expression (4) to 0.05 or more.

In a zoom lens according to the first embodiment of the present application, the following conditional expression (5) is preferably satisfied:

$$0.00 \leq (r2+r1)/(r2-r1) < 30.00 \quad (5)$$

where r1 denotes a radius of curvature of the object side lens surface of the negative lens Lb in the rear lens group, and r2 denotes a radius of curvature of the image side lens surface of the negative lens Lb in the rear lens group.

Conditional expression (5) defines a shape factor (Q factor) of the negative lens Lb in the rear lens group. Conditional expression (5) means that the negative lens Lb takes a shape from a so-called equal radius of curvature double concave shape, in which the radius of curvature of the object side lens surface is equal to the radius of curvature of the image side lens surface, to a meniscus shape having a concave surface facing the object side. Moreover, conditional expression (5) means that curvature of the object side lens surface of the negative lens Lb is always larger than curvature of the image side lens surface thereof except the double concave shape having equal radius of curvature.

Accordingly, when the value (r2+r1)/(r2−r1) is equal to or exceeds the upper limit of conditional expression (5), the shape of the negative lens Lb becomes excessive meniscus shape. In this case, chromatic difference in spherical aberration, coma, and variation in curvature of field upon zooming become worse, so that it is undesirable.

In order to secure the effect of the present application, it is preferable to set the upper limit of conditional expression (5) to 25.00 or less. In order to further secure the effect of the present application, it is greatly preferable to set the upper limit of conditional expression (5) to 20.00 or less, so that various aberrations can be effectively corrected. In order to further secure the effect of the present application, it is greatly preferable to set the upper limit of conditional expression (5) to 10.00 or less. In order to fully secure the effect of the present application, it is most preferable to set the upper limit of conditional expression (5) to 8.00 or less.

On the other hand, when the value (r2+r1)/(r2−r1) falls below the lower limit of conditional expression (5), the radius of curvature of the object side lens surface of the negative lens Lb becomes smaller than the radius of curvature of the image side lens surface of the negative lens Lb. In this case, susceptibility increases, so that coma and spherical aberration become worse. Accordingly, it is undesirable.

In order to secure the effect of the present application, it is preferable to set the lower limit of conditional expression (5) to 0.10 or more. In order to further secure the effect of the present application, it is greatly preferable to set the lower limit of conditional expression (5) to 0.20 or more, so that various aberrations can be excellently corrected. In order to further secure the effect of the present application, it is greatly preferable to set the lower limit of conditional expression (5) to 0.30 or more. In order to fully secure the effect of the present application, it is most preferable to set the lower limit of conditional expression (5) to 0.40 or more.

In a zoom lens according to the first embodiment of the present application, when the cemented lens Ld in the rear lens group has positive refractive power, coma can be excellently corrected.

In a zoom lens according to the first embodiment of the present application, when the cemented lens Ld in the rear lens group has negative refractive power, distortion can be excellently corrected.

In a zoom lens according to the first embodiment of the present application, the focusing lens group Gf in the rear lens group preferably includes a cemented lens having positive refractive power or negative refractive power. With this configuration, it becomes possible to excellently correct particularly coma and spherical aberration in the telephoto end state.

An imaging apparatus according to the first embodiment of the present application is equipped with the zoom lens described above. With this construction, it become possible to realize a downsized imaging apparatus having a wide angle of view, excellent optical performance with fewer number of lens elements with excellently correcting various aberrations.

A method for manufacturing a zoom lens according to the first embodiment of the present application is a method for manufacturing a zoom lens including, in order from an object side, a front lens group having negative refractive power, and a rear lens group having positive refractive power, the method comprising steps of:

disposing, in order from the object side, a positive lens La, a negative lens Lb having a concave surface facing the object side, a cemented positive lens Lc constructed by a negative lens cemented with a positive lens, and a cemented lens Ld constructed by a positive lens cemented with a negative lens, and further disposing a focusing lens group Gf having positive refractive power disposed to the object side of the positive lens La for carrying out focusing from an infinitely distant object to a close object by moving from the object side to the image side into the rear lens group Gp;

disposing each lens group with satisfying conditional expression (1):

$$0.000 < Fw/(-Fb) < 1.000 \quad (1)$$

where Fw denotes a focal length of the zoom lens in a wide-angle end state upon focusing on an infinitely distant object, and Fb denotes a focal length of the negative lens Lb in the rear lens group; and carrying out zooming by varying a distance between the front lens group Gn and the rear lens group Gp.

With this method for manufacturing a zoom lens according to the first embodiment of the present application, it becomes possible to manufacture a downsized zoom lens having a wide angle of view, excellent optical performance with fewer number of lens elements with excellently correcting various aberrations.

Then, a zoom lens, an imaging apparatus equipped therewith, and a method for manufacturing the zoom lens seen from another point of view according to the first embodiment of the present application are explained below.

A zoom lens seen from another point of view according to the first embodiment of the present application includes, in order from an object side, a front lens group having negative refractive power, and a rear lens group having positive refractive power. The rear lens group includes, in order from the object side, a positive lens La, a negative lens Lb having a concave surface facing the object side, a cemented positive lens Lc constructed by a negative lens cemented with a positive lens, and a cemented lens Ld constructed by a positive lens cemented with a negative lens, and further includes a focusing lens group Gf having positive refractive power disposed to the object side of the positive lens La for carrying out focusing from an infinitely distant object to a close object by moving from the object side to the image side. Zooming is carried out by varying a distance between the front lens group and the rear lens group. The following conditional expression (1) is satisfied:

$$0.000 < Fw/(-Fb) < 1.000 \quad (1)$$

where Fw denotes a focal length of the zoom lens in a wide-angle end state upon focusing on an infinitely distant object, and Fb denotes a focal length of the negative lens Lb in the rear lens group.

Conditional expression (1) defines a focal length of the negative lens Lb in the rear lens group, in other words, refractive power of the negative lens Lb. However, conditional expression (1) has already been explained above, so that duplicated explanations are omitted.

In a zoom lens seen from another point of view according to the first embodiment of the present application, at least one optical surface in the front lens group is applied with an antireflection coating, and the antireflection coating includes at least one layer that is formed by a wet process. With this configuration, a zoom lens seen from another point of view according to the first embodiment of the present application makes it possible to suppress ghost images and flare generated by the light rays from the object reflected from the optical surfaces, thereby realizing excellent optical performance.

Moreover, in a zoom lens seen from another point of view according to the first embodiment of the present application, the antireflection coating is a multilayer film, and the layer formed by the wet process is preferably the outermost layer among the layers composing the multilayer coating. With this configuration, since difference in refractive index with respect to the air can be small, reflection of light can be small, so that ghost images and flare can further be suppressed.

In a zoom lens seen from another point of view according to the first embodiment of the present application, when a refractive index at d-line of the layer formed by the wet process is denoted by nd, the refractive index nd is preferably 1.30 or less. With this configuration, since difference in refractive index with respect to the air can be small, reflection of light can be small, so that ghost images and flare can further be suppressed.

Moreover, in a zoom lens seen from another point of view according to the first embodiment of the present application, the optical surface in the front lens group on which the antireflection coating is formed is preferably a concave surface seen from an aperture stop. Since ghost images are liable to be generated on a concave surface seen from the aperture stop among optical surfaces in the front lens group, with applying the antireflection coating on such an optical surface, ghost images and flare can effectively be suppressed.

In a zoom lens seen from another point of view according to the first embodiment, it is desirable that, among the front lens group, the concave surface on which the antireflection coating is applied as viewed from the aperture stop is an image side lens surface. Since the concave surface as viewed from the aperture stop among optical surfaces in the front lens group tends to generate ghost images, that optical surface is formed with the antireflection coating, thereby enabling ghost images and flare to be effectively reduced.

In a zoom lens seen from another point of view according to the first embodiment, it is desirable that the image side lens surface on which the antireflection coating is applied is the most object side lens in the front lens group. Since the image side concave surface of the most object side lens in the front lens group as viewed from the aperture stop tends to generate ghost images, that optical surface is formed with the antireflection coating, thereby enabling ghost images and flare to be effectively reduced.

In a zoom lens seen from another point of view according to the first embodiment, it is desirable that, among the front lens group, the concave surface on which the antireflection coating is applied as viewed from the aperture stop is an object side lens surface. Since the object side concave surface as viewed from the aperture stop among optical surfaces in the front lens group tends to generate ghost images, that optical surface is formed with the antireflection coating, thereby enabling ghost images and flare to be effectively reduced.

In a zoom lens seen from another point of view according to the first embodiment, among optical surfaces in the front lens group, it is desirable that the optical surface on which the antireflection coating is applied is a concave surface as viewed from the object. With this configuration, since the concave surface as viewed from the object among optical surfaces in the front lens group tends to generate ghost images, that optical surface is formed with the antireflection coating, thereby enabling ghost images and flare to be effectively reduced.

In a zoom lens seen from another point of view according to the first embodiment, among optical surfaces in the front lens group, it is desirable that the optical surface having the concave shape as viewed from the object on which the antireflection coating is applied is the object side lens surface of the image side second lens from the most object side of the front lens group. Since the object side lens surface of the image side second lens from the most object side of the front lens group tends to generate ghost images, that optical surface is formed with the antireflection coating, thereby enabling ghost images and flare to be effectively reduced.

In a zoom lens seen from another point of view according to the first embodiment, among optical surfaces in the front lens group, it is desirable that the optical surface having the concave shape as viewed from the object on which the antireflection coating is applied is the object side lens surface of the image side third lens from the most object side of the front lens group. Since the object side lens surface of the image side third lens from the most object side of the front lens group tends to generate ghost images, that optical surface is formed with the antireflection coating, thereby enabling ghost images and flare to be effectively reduced.

In a zoom lens seen from another point of view according to the first embodiment, among optical surfaces in the front lens group, it is desirable that the optical surfaces on which the antireflection coating is applied are the image side lens surface of the most object side lens which is a concave surface seen from the aperture stop, and the object side lens surface of the image side third lens from the most object side of the front lens group which is a concave surface seen from the object. Among optical surfaces in the front lens group, since the image side lens surface of the most object side lens which is a concave surface seen from the aperture stop, and the object side lens surface of the image side third lens from the most object side of the front lens group which is a concave surface seen from the object tend to generate ghost images, those optical surfaces are formed with the antireflection coating, thereby enabling ghost images and flare to be effectively reduced.

In a zoom lens seen from another point of view according to the first embodiment, the antireflection coating may also be formed by a dry process etc without being limited to the wet process. On this occasion, it is preferable that the antireflection coating contains at least one layer of which the refractive index is equal to 1.30 or less. Thus, the same effects as in the case of using the wet process can be obtained by forming the antireflection coating based on the dry process etc. Note that at this time the layer of which the refractive index is equal to 1.30 or less is preferably the layer of the uppermost surface of the layers composing the multi-layered film.

In a zoom lens seen from another point of view according to the first embodiment of the present application, the following conditional expression (2) is preferably satisfied:

$$0.0000 < Fw/|Fd| < 1.00 \qquad (2)$$

where Fw denotes a focal length of the zoom lens in the wide-angle end state upon focusing on an infinitely distant object, and Fd denotes a focal length of the cemented lens Ld in the rear lens group.

Conditional expression (2) defines the focal length of the cemented lens Ld in the rear lens group, in other words, refractive power of the cemented lens Ld. However, conditional expression (2) has already been explained above, so that duplicated explanations are omitted.

In a zoom lens seen from another point of view according to the first embodiment of the present application, the following conditional expression (3) is preferably satisfied:

$$0.005 < Fw/Fc < 1.000 \qquad (3)$$

where Fw denotes a focal length of the zoom lens in the wide-angle end state upon focusing on an infinitely distant object, and Fc denotes a focal length of the cemented positive lens Lc in the rear lens group.

Conditional expression (3) defines the focal length of the cemented positive lens Lc in the rear lens group, in other words, refractive power of the cemented positive lens Lc. However, conditional expression (3) has already been explained above, so that duplicated explanations are omitted.

In a zoom lens seen from another point of view according to the first embodiment of the present application, the following conditional expression (4) is preferably satisfied:

$$0.005 < Fw/Ff < 1.000 \qquad (4)$$

where Fw denotes a focal length of the zoom lens in the wide-angle end state upon focusing on an infinitely distant object, and Ff denotes a focal length of the focusing lens group Gf in the rear lens group.

Conditional expression (4) defines the focal length of the focusing lens group Gf in the rear lens group, in other words, refractive power of the focusing lens group Gf. However, conditional expression (4) has already been explained above, so that duplicated explanations are omitted.

In a zoom lens seen from another point of view according to the first embodiment of the present application, the following conditional expression (5) is preferably satisfied:

$$0.00 \leq (r2+r1)/(r2-r1) < 30.00 \qquad (5)$$

where r1 denotes a radius of curvature of the object side lens surface of the negative lens Lb in the rear lens group, and r2 denotes a radius of curvature of the image side lens surface of the negative lens Lb in the rear lens group.

Conditional expression (5) defines a shape factor (Q factor) of the negative lens Lb in the rear lens group. However, conditional expression (5) has already been explained above, so that duplicated explanations are omitted.

In a zoom lens seen from another point of view according to the first embodiment of the present application, when the cemented lens Ld in the rear lens group has positive refractive power, coma can be excellently corrected.

In a zoom lens seen from another point of view according to the first embodiment of the present application, when the cemented lens Ld in the rear lens group has negative refractive power, distortion can be excellently corrected.

In a zoom lens seen from another point of view according to the first embodiment of the present application, the focusing lens group Gf in the rear lens group preferably includes a cemented lens having positive refractive power or negative refractive power. With this configuration, it becomes possible to excellently correct particularly coma and spherical aberration in the telephoto end state.

An imaging apparatus according to the first embodiment of the present application is equipped with the zoom lens seen from another point of view described above. With this construction, it become possible to realize a downsized imaging apparatus having a wide angle of view, excellent optical performance with fewer number of lens elements with excellently correcting various aberrations.

A method for manufacturing a zoom lens seen from another point of view according to the first embodiment of the present application is a method for manufacturing a zoom lens including, in order from an object side, a front lens group having negative refractive power, and a rear lens group having positive refractive power, the method comprising steps of:

disposing, in order from the object side, a positive lens La, a negative lens Lb having a concave surface facing the object side, a cemented positive lens Lc constructed by a negative lens cemented with a positive lens, and a cemented lens Ld constructed by a positive lens cemented with a negative lens, and further disposing a focusing lens group Gf disposed to the object side of the positive lens La for carrying out focusing from an infinitely distant object to a close object by moving from the object side to the image side into the rear lens group Gp;

applying an antireflection coating on at least one optical surface in the front lens group, and including at least one layer that is formed by a wet process in the antireflection coating;

disposing each lens group with satisfying conditional expression (1):

$$0.000 < Fw/(-Fb) < 1.000 \qquad (1)$$

where Fw denotes a focal length of the zoom lens in a wide-angle end state upon focusing on an infinitely distant object, and Fb denotes a focal length of the negative lens Lb in the rear lens group; and making an arrangement so as to carry out zooming by varying a distance between the front lens group Gn and the rear lens group Gp.

With this method for manufacturing a zoom lens according to the first embodiment of the present application, it becomes possible to manufacture a downsized zoom lens having a wide angle of view, excellent optical performance with fewer number of lens elements with excellently correcting various aberrations.

Then, a zoom lens according to each Example of the first embodiment is explained below with reference to accompanying drawings.

Example 1

FIG. 1 is a sectional view showing a lens configuration of a zoom lens according to Example 1 of the first embodiment of the present application.

The zoom lens according to Example 1 of the first embodiment is composed of, in order from an object side, a front lens group Gn having negative refractive power, and a rear lens group Gp having positive refractive power.

The front lens group Gn is composed of, in order from the object side, a double aspherical negative meniscus lens L11 having a concave surface facing an image side and aspherical surfaces on both sides, a cemented negative lens constructed by a double concave negative lens L12 cemented with a positive meniscus lens L13 having a convex surface facing the object side, and a double convex positive lens L14.

The rear lens group Gp is composed of, in order from the object side, a focusing lens group Gf having positive refractive power, an aperture stop S, and a positive lens group Gr having positive refractive power.

The focusing lens group Gf is moved from the object side to the image side for carrying out focusing from an infinitely distant object to a close object, and composed of only a cemented positive lens constructed by, in order from the object side, a negative meniscus lens L21 having a convex surface facing the object side cemented with a double convex positive lens L22.

The positive lens group Gr is composed of, in order from the object side, a double convex positive lens La, a negative meniscus lens Lb having a concave surface facing the object side, a cemented positive lens Lc constructed by a double concave negative lens cemented with a double convex positive lens, and a cemented negative lens Ld constructed by a double convex positive lens cemented with a negative meniscus lens having a convex surface facing the image plane I side.

In the zoom lens according to Example 1, a distance between the front lens group Gn and the rear lens group Gp is varied, thereby carrying out zooming from the wide-angle end state to the telephoto end state. Each arrow in FIG. 1 indicates moving trajectory of each of the front lens group Gn and the rear lens group Gp upon zooming from the wide-angle end state to the telephoto end state.

In the zoom lens seen from another point of view according to Example 1 of the first embodiment, an antireflection coating described later is applied to the image plane I side lens surface of the negative meniscus lens L11 in the front lens group Gn and the object side lens surface of the double concave negative lens L12 in the front lens group Gn.

Various values associated with the zoom lens according to Example 1 are listed in Table 1.

In (Specifications), W denotes a wide-angle end state, M denotes an intermediate focal length state, T denotes a telephoto end state, f denotes a focal length of the zoom lens, FNO denotes an f-number, ω denotes a half angle of view (degree), Y denotes an image height, TL denotes a total lens length, Σd denotes a distance between the most object side lens surface and the most image side lens surface, and BF denotes a back focal length.

In (Lens Data), the left most column "i" shows optical surface number, the second column "r" shows a radius of curvature of each optical surface (mm), the third column "d" shows a surface distance (mm), the fourth column "nd" shows a refractive index at d-line (wavelength: 587.56 nm), and the fifth column "vd" shows an Abbe number at d-line. In the fifth column "nd" refractive index of the air nd=1.000000 is omitted. In the second column "r", r=∞ indicates a plane surface.

An aspherical surface is expressed by the following expression when y is a height in the direction vertical to the optical axis, X(y) is a distance (sag amount) along the optical axis from a tangent plane of a vertex of each aspherical surface at the height y up to each aspherical surface, r is a radius of curvature (paraxial radius of curvature) of a reference sphere, k is a conical coefficient and Cn is an n-th order aspherical surface coefficient. Note that [E-n] represents [×10$^{-n}$] in the subsequent Examples:

$$X(y) = (y^2/r)/[1 + (1 - k \times y^2/r^2)^{1/2}] + A4 \times y^4 + A6 \times y^6 + A8 \times y^8 + A10 \times y^{10} + A12 \times y^{12}.$$

In (Aspherical Surface Data), "E-n" denotes "×10$^{-n}$", in which "n" is an integer, and for example "1.234E-05" denotes "1.234×10$^{-5}$". Each aspherical surface is expressed in (Lens Data) by attaching "*" to the left side of the surface number.

In (Variable Distances), β denotes a shooting magnification, d0 denotes a distance between the object and the first lens surface, and Bf denotes a back focal length. In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples including Examples in the second embodiment.

TABLE 1

(Specifications)
zoom ratio = 1.77

|  | W | M | T |
|---|---|---|---|
| F = | 16.48 | 24.00 | 29.10 |
| FNO = | 4.67 | 5.39 | 5.88 |
| ω = | 53.47 | 41.61 | 36.17° |
| Y = | 21.60 | 21.60 | 21.60 |
| TL = | 129.75 | 125.92 | 127.84 |
| Σd = | 91.47 | 76.11 | 70.21 |
| BF = | 38.28 | 49.81 | 57.63 |

(Lens Data)

| i | r | d | nd | vd |
|---|---|---|---|---|
| *1) | 27.6095 | 2.0000 | 1.744429 | 49.52 |
| *2) | 10.4613 | 13.4130 | | |
| 3) | −91.8404 | 2.0000 | 1.816000 | 46.63 |
| 4) | 20.9975 | 5.0000 | 1.603420 | 38.02 |
| 5) | 46.4047 | 2.0000 | | |
| 6) | 34.9634 | 4.5000 | 1.717360 | 29.52 |
| 7) | −145.3428 | (d7) | | |
| 8) | 43.3884 | 1.0000 | 1.788000 | 47.38 |
| 9) | 16.6939 | 3.0000 | 1.497820 | 82.56 |
| 10) | −179.2154 | (d10) | | |
| 11) | ∞ | 0.7000 | Aperture Stop S | |
| 12) | 18.7726 | 3.0000 | 1.516800 | 64.12 |
| 13) | −48.4517 | 5.4164 | | |
| 14) | −24.9329 | 6.0000 | 1.755000 | 52.29 |
| 15) | −43.6855 | 2.0000 | | |
| 16) | −60.8893 | 1.0000 | 1.755000 | 52.29 |
| 17) | 18.0968 | 5.0000 | 1.518230 | 58.89 |
| 18) | −17.6009 | 0.1000 | | |
| 19) | 312.1189 | 5.5000 | 1.497820 | 82.56 |
| 20) | −12.3197 | 1.0000 | 1.834810 | 42.72 |
| 21) | −39.7672 | BF | | |

TABLE 1-continued (Aspherical Surface Data)

Surface Number = 1

κ = −3.0300
A4 = 2.51696E−06
A6 = 1.97213E−09
A8 = 9.53579E−13
A10 = −4.10542E−15
A12 = 0.000

Surface Number = 2

κ = 0.3010
A4 = −5.11743E−06
A6 = 2.38317E−08
A8 = −4.77560E−10
A10 = 3.04666E−12
A12 = −0.43400E−14

(Variable Distances)

|  | W | M | T |
|---|---|---|---|
| F = | 16.48000 | 24.00000 | 29.10000 |
| d0 = | ∞ | ∞ | ∞ |
| d7 = | 22.83725 | 7.48076 | 1.58270 |
| d10 = | 6.00001 | 6.00001 | 6.00001 |
| BF = | 38.28373 | 49.81133 | 57.62926 |
| β = | −0.03333 | −0.03333 | −0.03333 |
| d0 = | 473.9082 | 700.5201 | 854.0684 |
| d7 = | 25.12741 | 9.41676 | 3.34451 |
| d10 = | 3.70985 | 4.06401 | 4.23820 |
| BF = | 38.28373 | 49.81133 | 57.62926 |
| β = | −0.05668 | −0.08173 | −0.09992 |
| d0 = | 270.2495 | 274.0784 | 272.1586 |
| d7 = | 26.69585 | 12.12987 | 6.71209 |
| d10 = | 2.14141 | 1.35090 | 0.87062 |
| BF = | 38.28373 | 49.81133 | 57.62926 |

(Lens Group Data)

| Group | I | Focal Length |
|---|---|---|
| Gn | 1 | −22.95412 |
| Gf | 8 | 270.27515 |
| Gr | 12 | 38.38092 |

(Values for Conditional Expressions)

(1) Fw/(−Fb) = 0.1847
(2) Fw/|Fd| = 0.07311
(3) Fw/Fc = 0.10804
(4) Fw/Ff = 0.06097
(5) (r2 + r1)/(r2 − r1) = 3.659

Figure 2A:
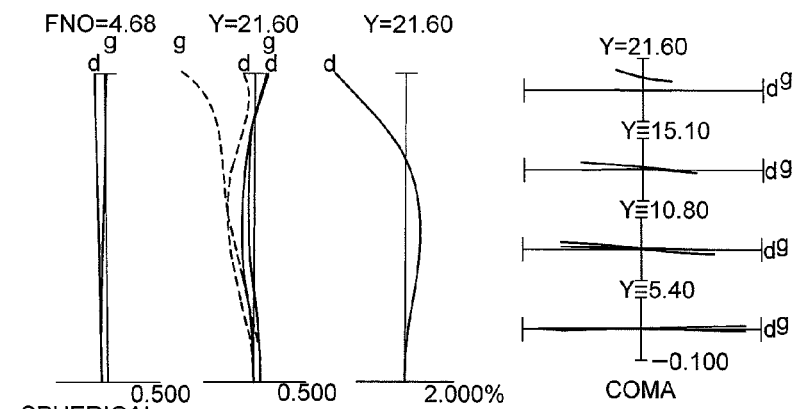
Figure 2B:
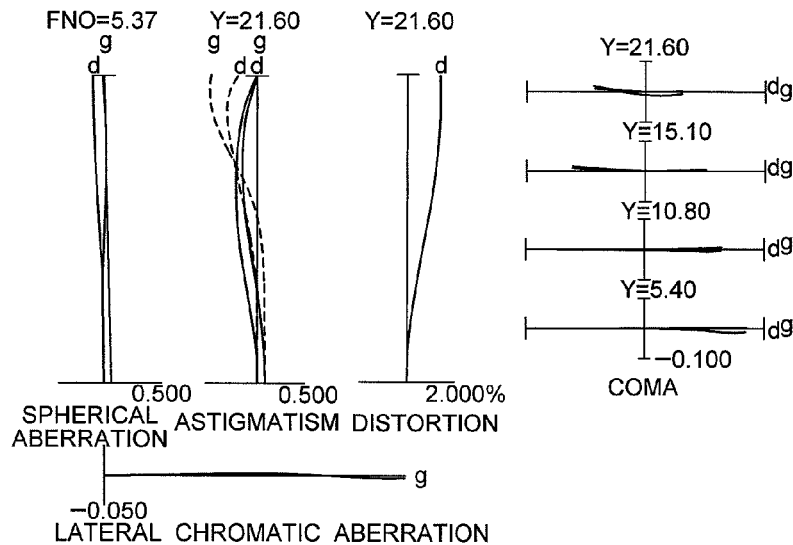
Figure 2C:
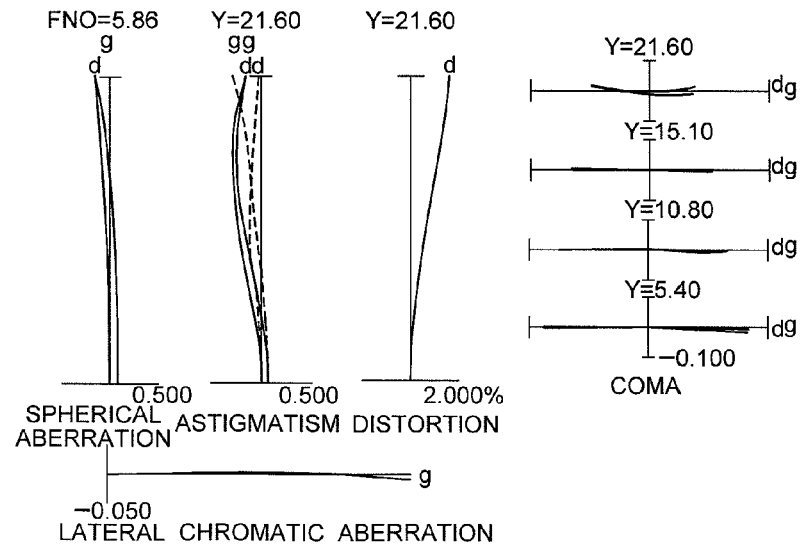

FIGS. 2A, 2B and 2C are graphs showing various aberrations of the zoom lens according to Example 1 upon focusing on an infinitely distant object, in which FIG. 2A is a wide-angle end state, FIG. 2B is an intermediate focal length state, and FIG. 2C is a telephoto end state.

In respective graphs, FNO denotes an f-number, Y denotes an image height, d denotes an aberration curve at d-line (wavelength λ=587.6 nm), and g denotes an aberration curve at g-line (wavelength λ=435.8 nm). In graphs showing spherical aberration, an f-number with respect to the maximum aperture is shown. In graphs showing astigmatism and distortion, the maximum image height is shown. In graphs showing astigmatism, a solid line indicates a sagittal image plane, and a broken line indicates a meridional image plane. The explanations of reference symbols are the same in the other Examples including Examples in the second embodiment.

As is apparent from various graphs, the zoom lens according to Example 1 of the first embodiment shows superb optical performance as a result of good corrections to various aberrations including spherical aberration, curvature of field, astigmatism and coma.

An example of generation of ghost images in the zoom lens seen from another point of view according to Example 1 is explained with reference to FIG. 3.

As shown in FIG. 3, when light rays BM from an object are incident on the zoom lens, the rays are reflected by the object side lens surface (a first-ghost-generating surface whose surface number is 3) of the double concave negative lens L12, and the reflected light rays are reflected again by the image plane I side lens surface (a second-ghost-generating surface whose surface number is 2) of the negative meniscus lens L11 to reach the image plane I with generating ghost images. Incidentally, the first-ghost-generating surface 3 is a concave surface seen from the object side, and the second—ghost-generating surface 2 is a concave surface seen from the aperture stop S. With forming an antireflection coating corresponding to a broad wavelength range, it becomes possible to effectively suppress ghost images.

Example 2

Figure 4:
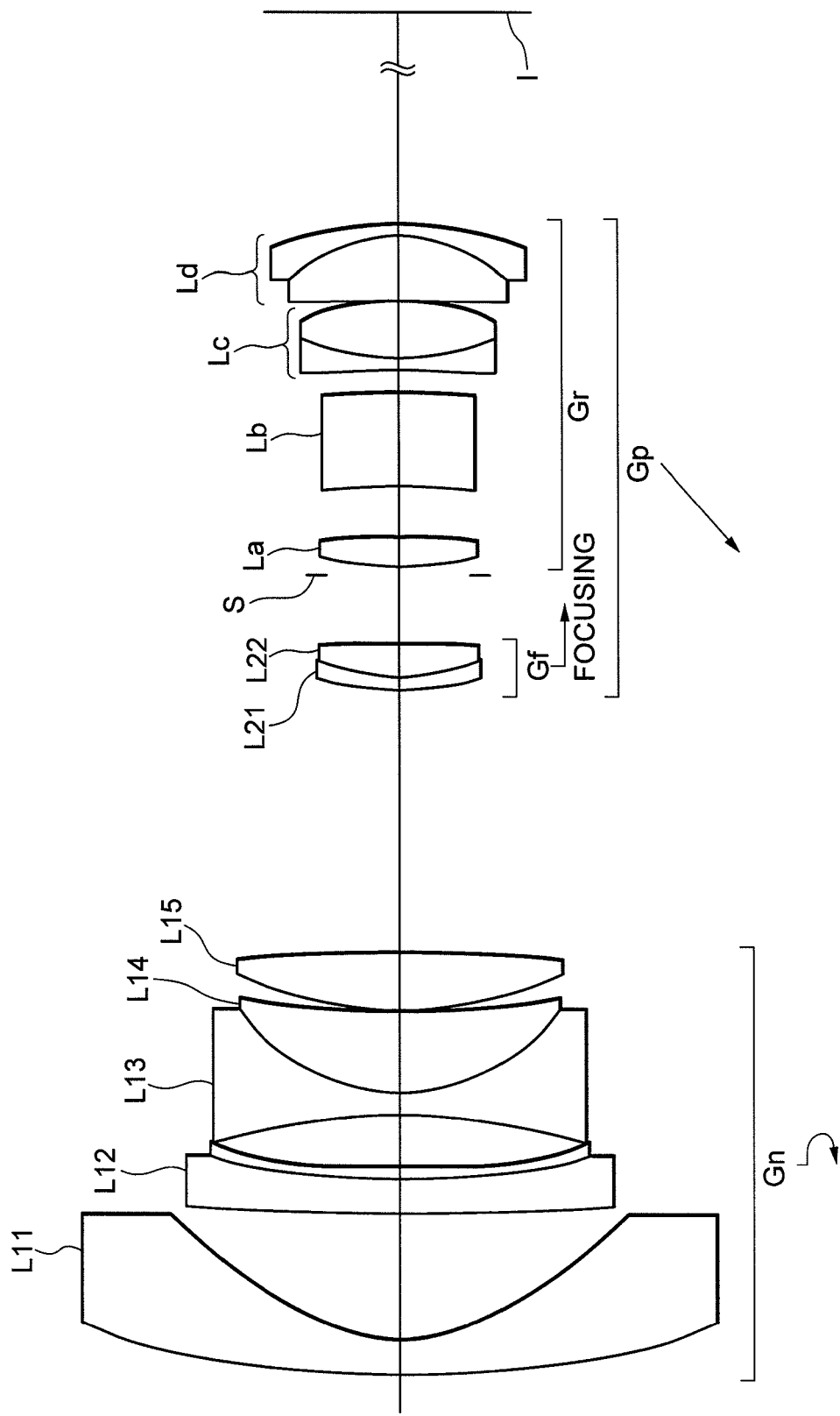
FIG. 4 is a sectional view showing a lens configuration of a zoom lens according to Example 2 of the first embodiment of the present application.

FIG. 4 is a sectional view showing a lens configuration of a zoom lens according to Example 2 of the first embodiment of the present application.

The zoom lens according to Example 2 of the first embodiment is composed of, in order from an object side, a front lens group Gn having negative refractive power, and a rear lens group Gp having positive refractive power.

The front lens group Gn is composed of, in order from the object side, a double aspherical meniscus lens L11, a compound type aspherical positive lens L12, a cemented negative lens constructed by a double concave negative lens L13 cemented with a positive meniscus lens L14 having a convex surface facing the object side, and a double convex positive lens L15.

The double aspherical meniscus lens L11 having a concave surface facing the image plane I side has negative refractive power and has a shape that the negative refractive power becomes weak from the center to the periphery.

The compound type aspherical positive lens L12 has a shape that positive refractive power formed by combination turns to negative refractive power from the center to the periphery. The lens L12 is formed by combination of a glass material and a resin material.

The rear lens group Gp is composed of, in order from the object side, a focusing lens group Gf having positive refractive power, an aperture stop S, and a positive lens group Gr having positive refractive power.

The focusing lens group Gf is moved from the object side to the image side for carrying out focusing from an infinitely distant object to a close object, and composed of only a cemented positive lens constructed by, in order from the object side, a negative meniscus lens L21 having a convex surface facing the object side cemented with a double convex positive lens L22.

The positive lens group Gr is composed of, in order from the object side, a double convex positive lens La, a negative meniscus lens Lb having a concave surface facing the object side, a cemented positive lens Lc constructed by a double concave negative lens cemented with a double convex positive lens, and a cemented positive lens Ld constructed by a positive meniscus lens having a convex surface facing the image plane I side cemented with a negative meniscus lens having a convex surface facing the image plane I side.

In the zoom lens according to Example 2, a distance between the front lens group Gn and the rear lens group Gp is varied, thereby carrying out zooming from the wide-angle end state to the telephoto end state. Each arrow in FIG. 4 indicates moving trajectory of each of the front lens group Gn and the rear lens group Gp upon zooming from the wide-angle end state to the telephoto end state.

In the zoom lens seen from another point of view according to Example 2 of the first embodiment, an antireflection coating described later is applied to the image plane I side lens surface of the negative meniscus lens L11 in the front lens group Gn and the object side lens surface of the positive lens L12 in the front lens group Gn.

Various values associated with the zoom lens according to Example 2 are listed in Table 2.

TABLE 2

(Specifications)
zoom ratio = 1.77

|   | W | M | T |
|---|---|---|---|
| F = | 16.48 | 24.00 | 29.10 |
| FNO = | 4.41 | 5.29 | 5.88 |
| ω = | 53.27 | 41.72 | 35.932° |
| Y = | 21.60 | 21.60 | 21.60 |
| TL = | 138.15 | 135.51 | 138.24 |
| Σd = | 99.84 | 84.47 | 78.57 |
| BF = | 38.31 | 51.04 | 59.67 |

(Lens Data)

| i | r | d | nd | νd |
|---|---|---|---|---|
| *1) | 120.0323 | 3.0000 | 1.744430 | 49.53 |
| *2) | 14.8111 | 11.0000 | | |
| 3) | 320.0965 | 3.0000 | 1.516800 | 64.12 |
| 4) | 70.0000 | 1.0000 | 1.553890 | 38.09 |
| *5) | −993.8663 | 4.5000 | | |
| 6) | −56.5907 | 2.0000 | 1.816000 | 46.63 |
| 7) | 17.0196 | 7.0000 | 1.603420 | 38.02 |
| 8) | 73.8459 | 0.1000 | | |
| 9) | 32.4760 | 5.0000 | 1.717360 | 29.52 |
| 10) | −157.9244 | (d10) | | |
| 11) | 23.8096 | 1.0000 | 1.795000 | 45.30 |
| 12) | 15.6593 | 3.0000 | 1.497820 | 82.56 |
| 13) | −1090.6220 | (d13) | | |
| 14) | ∞ | 0.7000 | Aperture Stop S | |
| 15) | 26.3980 | 2.5000 | 1.497820 | 82.56 |
| 16) | −79.3224 | 4.6000 | | |
| 17) | −39.5467 | 8.0000 | 1.744000 | 44.79 |
| 18) | −162.0229 | 2.0000 | | |
| 19) | −92.3426 | 1.0000 | 1.755000 | 52.29 |
| 20) | 20.8016 | 5.0000 | 1.518230 | 58.89 |
| 21) | −21.0542 | 0.1000 | | |
| 22) | −344.4872 | 5.5000 | 1.497820 | 82.56 |
| 23) | −13.5094 | 1.0000 | 1.834810 | 42.72 |
| 24) | −31.7192 | BF | | |

(Aspherical Surface Data)

Surface Number = 1

κ = 12.7063
A4 = 2.52869E−07
A6 = 5.51300E−10
A8 = 4.77913E−13
A10 = −3.07832E−16
A12 = −0.49549E−19

Surface Number = 2

κ = −0.0947
A4 = −6.70196E−06
A6 = −1.78783E−08
A8 = −5.15142E−12
A10 = −4.83366E−14
A12 = 0.21367E−15

TABLE 2-continued

Surface Number = 5

κ = 0.00000
A4 = 2.50710E−05
A6 = 2.09871E−08
A8 = 1.63612E−10
A10 = −1.20936E−13
A12 = −0.17594E−14

(Variable Distances)

|   | W | M | T |
|---|---|---|---|
| F = | 16.48000 | 24.00000 | 29.10000 |
| d0 = | ∞ | ∞ | ∞ |
| d10 = | 22.83854 | 7.47382 | 1.57260 |
| d13 = | 6.00001 | 6.00001 | 6.00001 |
| BF = | 38.31325 | 51.03766 | 59.66724 |
| β = | −0.03333 | −0.03333 | −0.03333 |
| d0 = | 470.1967 | 697.5176 | 851.2221 |
| d10 = | 23.82277 | 8.14376 | 2.14016 |
| d13 = | 5.01578 | 5.33006 | 5.43245 |
| BF = | 38.31325 | 51.03766 | 59.66724 |
| β = | −0.08858 | −0.12836 | −0.15853 |
| d0 = | 161.8482 | 164.4885 | 161.7602 |
| d10 = | 25.46251 | 10.04579 | 4.25456 |
| d13 = | 3.37604 | 3.42803 | 3.31805 |
| BF = | 38.31325 | 51.03766 | 59.66724 |

(Lens Group Data)

| Group | I | Focal Length |
|---|---|---|
| Gn | 1 | −21.85385 |
| Gf | 11 | 65.79150 |
| Gr | 15 | 59.98221 |

(Values for Conditional Expressions)

(1) Fw/(−Fb) = 0.2278
(2) Fw/|Fd| = 0.005215
(3) Fw/Fc = 0.1105
(4) Fw/Ff = 0.2505
(5) (r2 + r1)/(r2 − r1) = 1.646

Figure 5A:
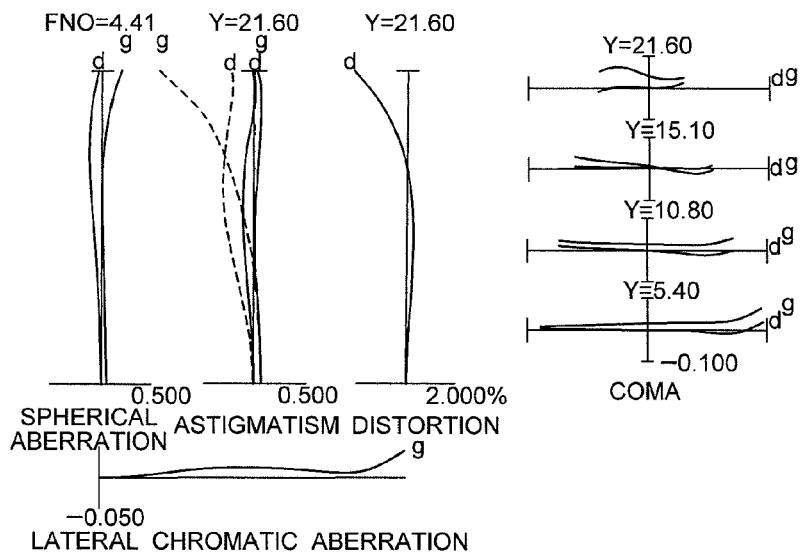
Figure 5B:
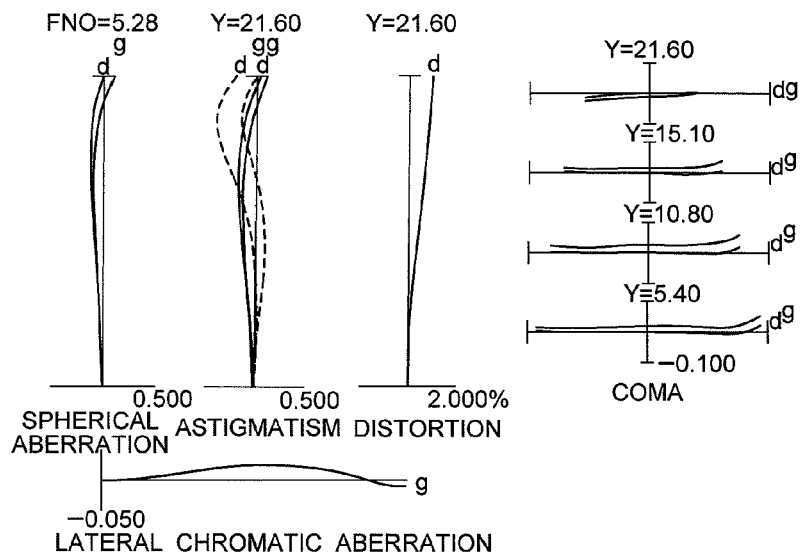
Figure 5C:
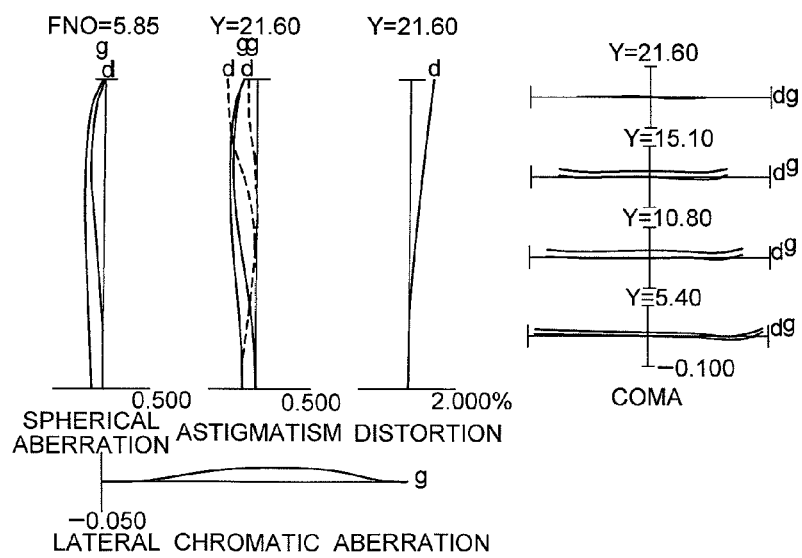

FIGS. 5A, 5B and 5C are graphs showing various aberrations of the zoom lens according to Example 2 of the first embodiment upon focusing on an infinitely distant object, in which FIG. 5A is a wide-angle end state, FIG. 5B is an intermediate focal length state, and FIG. 5C is a telephoto end state.

As is apparent from various graphs, the zoom lens according to Example 2 of the first embodiment shows superb optical performance as a result of good corrections to various aberrations including spherical aberration, curvature of field, astigmatism and coma.

Example 3

Figure 6:
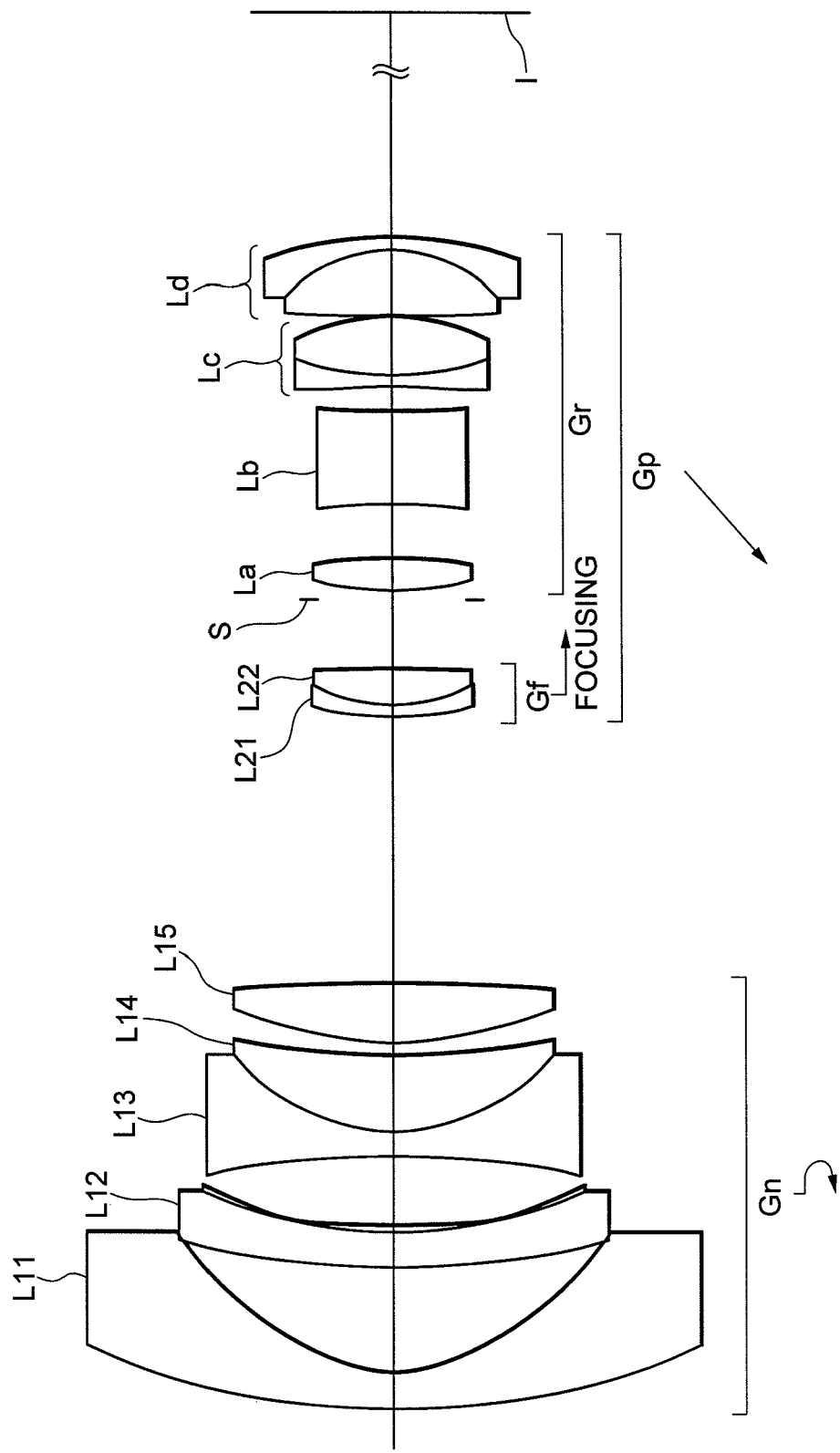
FIG. 6 is a sectional view showing a lens configuration of a zoom lens according to Example 3 of the first embodiment of the present application.

FIG. 6 is a sectional view showing a lens configuration of a zoom lens according to Example 3 of the first embodiment of the present application.

The zoom lens according to Example 3 of the first embodiment is composed of, in order from an object side, a front lens group Gn having negative refractive power, and a rear lens group Gp having positive refractive power.

The front lens group Gn is composed of, in order from the object side, a double aspherical meniscus lens L11, a compound type aspherical positive lens L12, a cemented negative lens constructed by a double concave negative lens L13 cemented with a positive meniscus lens L14 having a convex surface facing the object side, and a double convex positive lens L15.

The double aspherical meniscus lens L11 having a concave surface facing the image plane I side has negative refractive power and has a shape that the negative refractive power becomes weak from the center to the periphery.

The compound type aspherical positive lens L12 has a shape that positive refractive power formed by combination turns to negative refractive power from the center to the periphery. The lens L12 is formed by combination of a glass material and a resin material.

The rear lens group Gp is composed of, in order from the object side, a focusing lens group Gf having positive refractive power, an aperture stop S, and a positive lens group Gr having positive refractive power.

The focusing lens group Gf is moved from the object side to the image side for carrying out focusing from an infinitely distant object to a close object, and composed of only a cemented positive lens constructed by, in order from the object side, a negative meniscus lens L21 having a convex surface facing the object side cemented with a double convex positive lens L22.

The positive lens group Gr is composed of, in order from the object side, a double convex positive lens La, a double concave negative lens Lb, a cemented positive lens Lc constructed by a double concave negative lens cemented with a double convex positive lens, and a cemented negative lens Ld constructed by a double convex positive lens cemented with a negative meniscus lens having a convex surface facing the image plane I side.

In the zoom lens according to Example 3, a distance between the front lens group Gn and the rear lens group Gp is varied, thereby carrying out zooming from the wide-angle end state to the telephoto end state. Each arrow in FIG. 6 indicates moving trajectory of each of the front lens group Gn and the rear lens group Gp upon zooming from the wide-angle end state to the telephoto end state.

In the zoom lens seen from another point of view according to Example 3 of the first embodiment, an antireflection coating described later is applied to the image plane I side lens surface of the negative meniscus lens L11 in the front lens group Gn and the object side lens surface of the double convex positive lens L15 in the front lens group Gn.

Various values associated with the zoom lens according to Example 3 are listed in Table 3.

TABLE 3

(Specifications)
zoom ratio = 1.77

|  | W | M | T |
|---|---|---|---|
| F = | 16.48 | 24.00 | 29.10 |
| FNO = | 4.42 | 5.28 | 5.87 |
| ω = | 53.20 | 41.29 | 35.96° |
| Y = | 21.60 | 21.60 | 21.60 |
| TL = | 137.91 | 135.13 | 137.77 |
| Σd = | 99.62 | 84.25 | 78.35 |
| BF = | 38.29 | 50.88 | 59.41 |

(Lens Data)

| i | r | d | nd | vd |
|---|---|---|---|---|
| *1) | 82.7358 | 3.0000 | 1.744429 | 49.52 |
| *2) | 14.1379 | 9.0000 |  |  |
| 3) | 75.5790 | 3.0000 | 1.516800 | 64.12 |
| 4) | 40.0000 | 0.5000 | 1.553890 | 38.09 |
| *5) | 83.8029 | 6.0000 |  |  |
| 6) | −77.5324 | 2.0000 | 1.816000 | 46.63 |
| 7) | 17.4612 | 6.5000 | 1.603420 | 38.02 |
| 8) | 70.9358 | 1.0500 |  |  |

TABLE 3-continued

| 9) | 34.6649 | 5.0000 | 1.717360 | 29.52 |
|---|---|---|---|---|
| 10) | −214.0325 | (d10) |  |  |
| 11) | 27.4177 | 1.0000 | 1.788000 | 47.38 |
| 12) | 15.1887 | 3.0000 | 1.497820 | 82.56 |
| 13) | −218.1559 | (d13) |  |  |
| 14) | ∞ | 0.7000 | Aperture Stop S |  |
| 15) | 23.2434 | 2.8000 | 1.487490 | 70.45 |
| 16) | −45.2239 | 4.6270 |  |  |
| 17) | −39.0084 | 8.0000 | 1.755000 | 52.29 |
| 18) | 114.1192 | 2.0000 |  |  |
| 19) | −94.3568 | 1.0000 | 1.755000 | 52.29 |
| 20) | 26.8051 | 5.0000 | 1.518230 | 58.89 |
| 21) | −18.1493 | 0.1000 |  |  |
| 22) | 471.7364 | 5.5000 | 1.497820 | 82.56 |
| 23) | −12.7396 | 1.0000 | 1.834810 | 42.72 |
| 24) | −33.4851 | BF |  |  |

(Aspherical Surface Data)

Surface Number = 1

κ = 4.0103
A4 = 1.16908E−06
A6 = 4.58987E−10
A8 = 4.52741E−14
A10 = −7.38248E−16
A12 = 0.0000

Surface Number = 2

κ = −0.0638
A4 = −7.94597E−07
A6 = −5.98169E−09
A8 = 2.11786E−11
A10 = −5.51429E−14
A12 = 0.81892E−16

Surface Number = 5

κ = −5.6064
A4 = 2.51241E−05
A6 = 2.20702E−08
A8 = 5.50134E−11
A10 = −1.42359E−13
A12 = −0.72010E−15

(Variable Distances)

|  | W | M | T |
|---|---|---|---|
| F = | 16.48000 | 24.00000 | 29.10000 |
| d0 = | ∞ | ∞ | ∞ |
| d10 = | 22.83872 | 7.47624 | 1.57589 |
| d13 = | 6.00001 | 6.00001 | 6.00001 |
| BF = | 38.29175 | 50.87810 | 59.41406 |
| β = | −0.03333 | −0.03333 | −0.03333 |
| d0 = | 471.3609 | 698.1959 | 851.7729 |
| d10 = | 23.82393 | 8.20492 | 2.20852 |
| d13 = | 5.01479 | 5.27133 | 5.36738 |
| BF = | 38.29175 | 50.87810 | 59.41406 |
| β = | −0.12195 | −0.17557 | −0.21797 |
| d0 = | 112.0925 | 114.8687 | 112.2331 |
| d10 = | 26.43169 | 11.27028 | 5.64318 |
| d13 = | 2.40704 | 2.20597 | 1.93272 |
| BF = | 38.29175 | 50.87810 | 59.41406 |

(Lens Group Data)

| Group | I | Focal Length |
|---|---|---|
| Gn | 1 | −21.97176 |
| Gf | 11 | 82.35563 |
| Gr | 15 | 52.85072 |

(Values for Conditional Expressions)

(1) Fw/(−Fb) = 0.4376
(2) Fw/|Fd| = 0.001919
(3) Fw/Fc = 0.2208
(4) Fw/Ff = 0.2001
(5) (r2 + r1)/(r2 − r1) = 0.4905

Figure 7A:
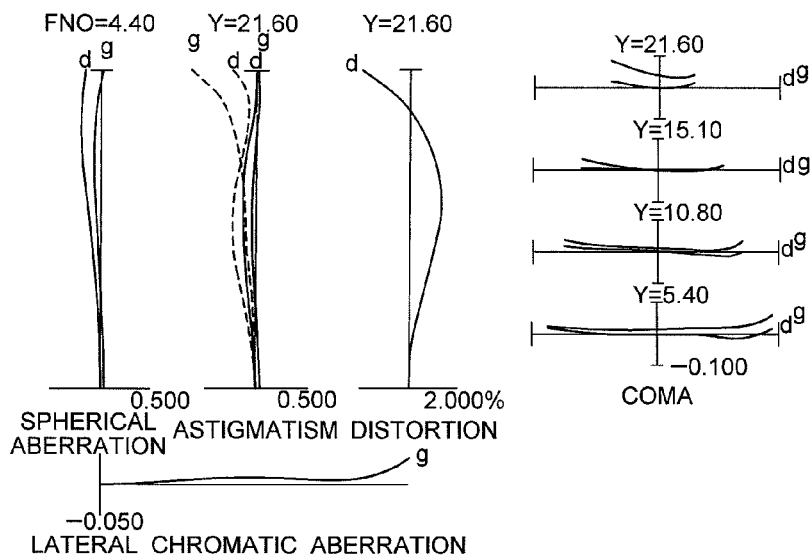
Figure 7B:
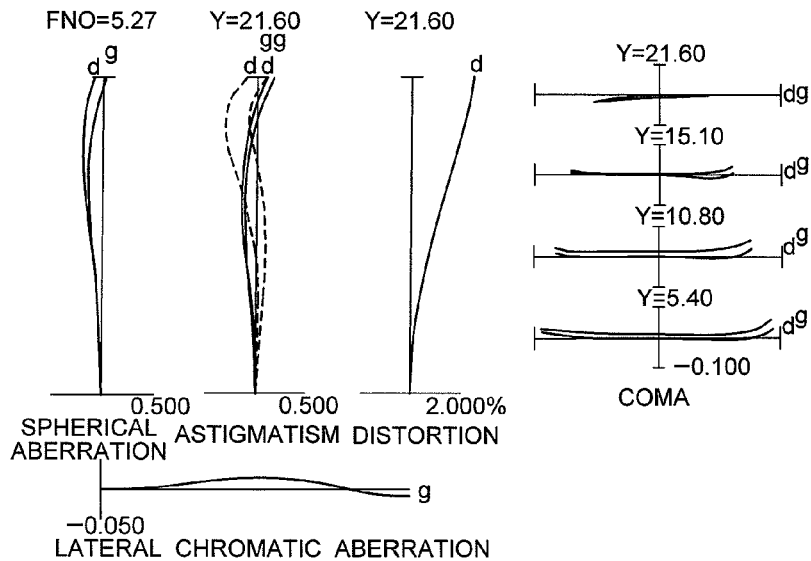
Figure 7C:
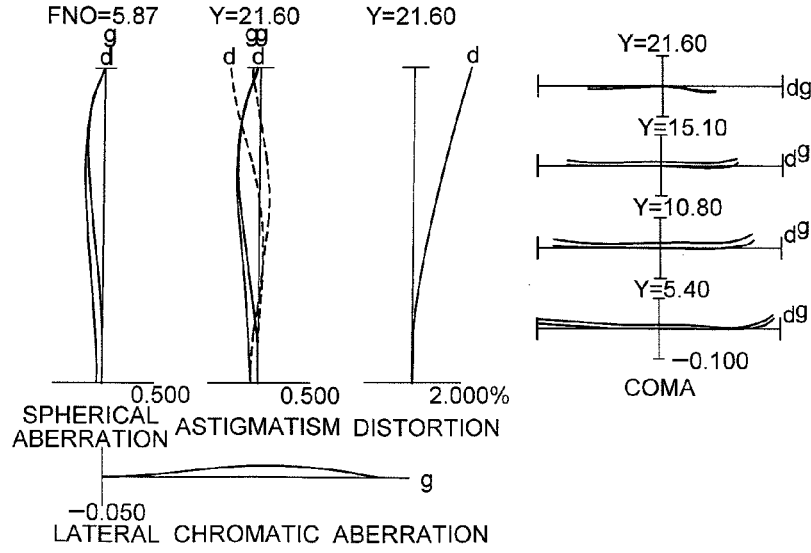

FIGS. 7A, 7B and 7C are graphs showing various aberrations of the zoom lens according to Example 3 of the first embodiment upon focusing on an infinitely distant object, in which FIG. 7A is a wide-angle end state, FIG. 7B is an intermediate focal length state, and FIG. 7C is a telephoto end state.

As is apparent from various graphs, the zoom lens according to Example 3 of the first embodiment shows superb optical performance as a result of good corrections to various aberrations including spherical aberration, curvature of field, astigmatism and coma.

Example 4

Figure 8:
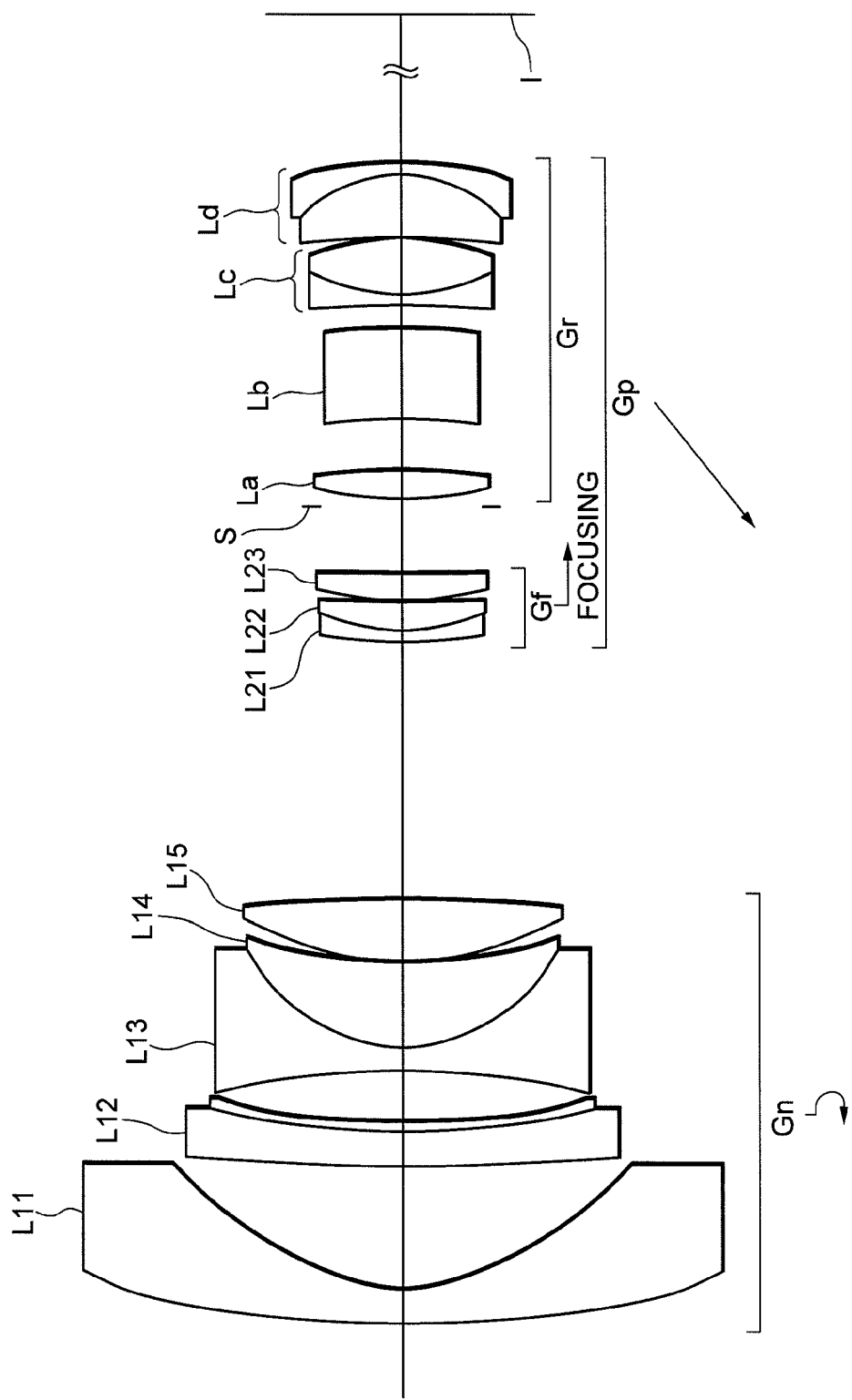
FIG. 8 is a sectional view showing a lens configuration of a zoom lens according to Example 4 of the first embodiment of the present application.

FIG. 8 is a sectional view showing a lens configuration of a zoom lens according to Example 4 of the first embodiment of the present application.

The zoom lens according to Example 4 of the first embodiment is composed of, in order from an object side, a front lens group Gn having negative refractive power, and a rear lens group Gp having positive refractive power.

The front lens group Gn is composed of, in order from the object side, a double aspherical meniscus lens L11, a compound type aspherical positive lens L12, a cemented negative lens constructed by a double concave negative lens L13 cemented with a positive meniscus lens L14 having a convex surface facing the object side, and a double convex positive lens L15.

The double aspherical meniscus lens L11 having a concave surface facing the image plane I side has negative refractive power and has a shape that the negative refractive power becomes weak from the center to the periphery.

The compound type aspherical positive lens L12 has a shape that positive refractive power formed by combination turns to negative refractive power from the center to the periphery. The lens L12 is formed by combination of a glass material and a resin material.

The rear lens group Gp is composed of, in order from the object side, a focusing lens group Gf having positive refractive power, an aperture stop S, and a positive lens group Gr having positive refractive power.

The focusing lens group Gf is moved from the object side to the image side for carrying out focusing from an infinitely distant object to a close object, and composed of, in order from the object side, a cemented negative lens constructed by a negative meniscus lens L21 having a convex surface facing the object side cemented with a positive meniscus lens L22 having a convex surface facing the object side, and a positive meniscus lens L23 having a convex surface facing the object side.

The positive lens group Gr is composed of, in order from the object side, a double convex positive lens La, a negative meniscus lens Lb having a concave surface facing the object side, a cemented positive lens Lc constructed by a double concave negative lens cemented with a double convex positive lens, and a cemented negative lens Ld constructed by a positive meniscus lens having a convex surface facing the image plane I side cemented with a negative meniscus lens having a convex surface facing the image plane I side.

In the zoom lens according to Example 4, a distance between the front lens group Gn and the rear lens group Gp is varied, thereby carrying out zooming from the wide-angle end state to the telephoto end state. Each arrow in FIG. 8 indicates moving trajectory of each of the front lens group Gn and the rear lens group Gp upon zooming from the wide-angle end state to the telephoto end state.

In the zoom lens seen from another point of view according to Example 4 of the first embodiment, an antireflection coating described later is applied to the image plane I side lens surface of the negative meniscus lens L11 in the front lens group Gn and the image plane I side lens surface of the positive meniscus lens L14 in the front lens group Gn.

Various values associated with the zoom lens according to Example 4 are listed in Table 4.

TABLE 4

(Specifications)
zoom ratio = 1.77

|  | W | M | T |
|---|---|---|---|
| F = | 16.48 | 24.00 | 29.10 |
| FNO = | 4.35 | 5.14 | 5.68 |
| ω = | 53.12 | 41.82 | 36.38° |
| Y = | 21.60 | 21.60 | 21.60 |
| TL = | 141.21 | 140.02 | 143.41 |
| Σd = | 102.95 | 88.69 | 83.22 |
| BF = | 38.26 | 51.33 | 60.20 |

(Lens Data)

| i | r | d | nd | νd |
|---|---|---|---|---|
| *1) | 153.3543 | 3.0000 | 1.744430 | 49.53 |
| *2) | 15.3606 | 11.0000 | | |
| 3) | 236.8320 | 3.0000 | 1.516800 | 64.12 |
| 4) | 70.0000 | 1.0000 | 1.553890 | 38.09 |
| *5) | 3985.5156 | 4.5000 | | |
| 6) | −67.6319 | 2.0000 | 1.816000 | 46.63 |
| 7) | 15.1899 | 7.5000 | 1.603420 | 38.02 |
| 8) | 43.3750 | 0.1000 | | |
| 9) | 27.7464 | 5.5000 | 1.717360 | 29.52 |
| 10) | −157.9244 | (d10) | | |
| 11) | 49.1344 | 1.0000 | 1.804000 | 46.58 |
| 12) | 16.8331 | 2.5000 | 1.516800 | 64.12 |
| 13) | 146.9875 | 0.1000 | | |
| 14) | 25.6591 | 2.5000 | 1.497820 | 82.56 |
| 15) | 599.0698 | (d15) | | |
| 16) | ∞ | 0.7000 | Aperture Stop S | |
| 17) | 29.3063 | 2.5000 | 1.497820 | 82.56 |
| 18) | −61.3653 | 4.6000 | | |
| 19) | −50.5351 | 8.0000 | 1.744000 | 44.79 |
| 20) | −67.6742 | 2.0000 | | |
| 21) | −79.7962 | 1.0000 | 1.755000 | 52.29 |
| 22) | 18.3139 | 5.0000 | 1.518230 | 58.89 |
| 23) | −20.4715 | 0.1000 | | |
| 24) | −60.2074 | 5.5000 | 1.497820 | 82.56 |
| 25) | −12.2737 | 1.0000 | 1.834810 | 42.72 |
| 26) | −31.7192 | BF | | |

(Aspherical Surface Data)

Surface Number = 1

κ = 13.2493
A4 = 1.31283E−06
A6 = 1.06752E−09
A8 = 1.38001E−13
A10 = −8.11754E−16
A12 = 0.10966E−17

Surface Number = 2

κ = −0.2095
A4 = −5.86923E−06
A6 = −7.67156E−09
A8 = −1.78993E−11
A10 = −5.48129E−14
A12 = 0.28144E−15

Surface Number = 5

κ = 0.0000
A4 = 2.47964E−05
A6 = 2.84299E−08
A81.25579E−10=

TABLE 4-continued

A10 = −1.72740E−13
A12 = −0.21040E−14

(Variable Distances)

|  | W | M | T |
|---|---|---|---|
| F = | 16.48000 | 24.00000 | 29.10000 |
| d0 = | ∞ | ∞ | ∞ |
| d10 = | 22.85014 | 8.59216 | 3.11601 |
| d15 = | 6.00001 | 6.00001 | 6.00001 |
| BF = | 38.26242 | 51.33188 | 60.19547 |
| β = | −0.03333 | −0.03333 | −0.03333 |
| d0 = | 471.1267 | 698.0278 | 851.5633 |
| d10 = | 23.72910 | 9.20066 | 3.63146 |
| d15 = | 5.12105 | 5.39151 | 5.48457 |
| BF = | 38.26242 | 51.33188 | 60.19547 |
| β = | −0.12479 | −0.18187 | −0.22726 |
| d0 = | 108.7874 | 109.9760 | 106.5885 |
| d10 = | 26.14974 | 11.89568 | 6.59818 |
| d15 = | 2.70041 | 2.69648 | 2.51784 |
| BF = | 38.26242 | 51.33188 | 60.19547 |

(Lens Group Data)

| Group | I | Focal Length |
|---|---|---|
| Gn | 1 | −20.77230 |
| Gf | 11 | 69.36596 |
| Gr | 17 | 62.45782 |

(Values for Conditional Expressions)

(1) Fw/(−Fb) = 0.04921
(2) Fw/|Fd| = 0.1469
(3) Fw/Fc = 0.08016
(4) Fw/Ff = 0.2376
(5) (r2 + r1)/(r2 − r1) = 6.897

Figure 9A:
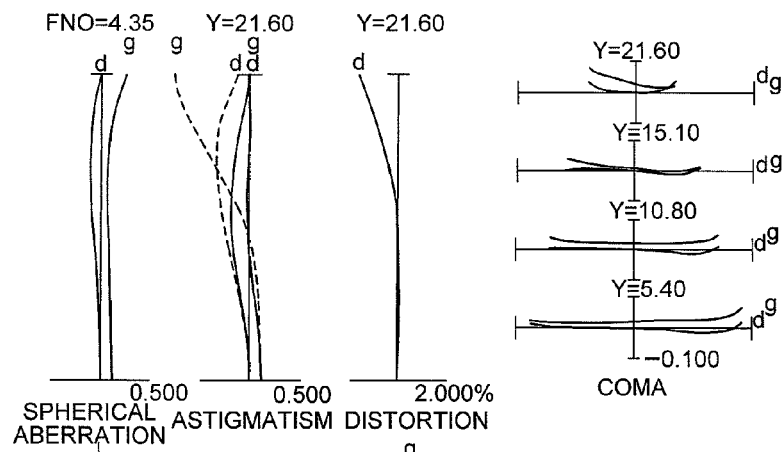
Figure 9B:
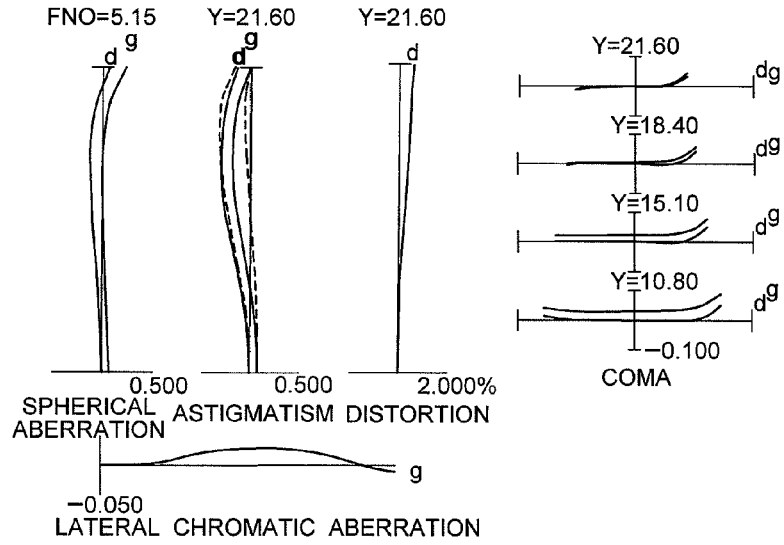
Figure 9C:
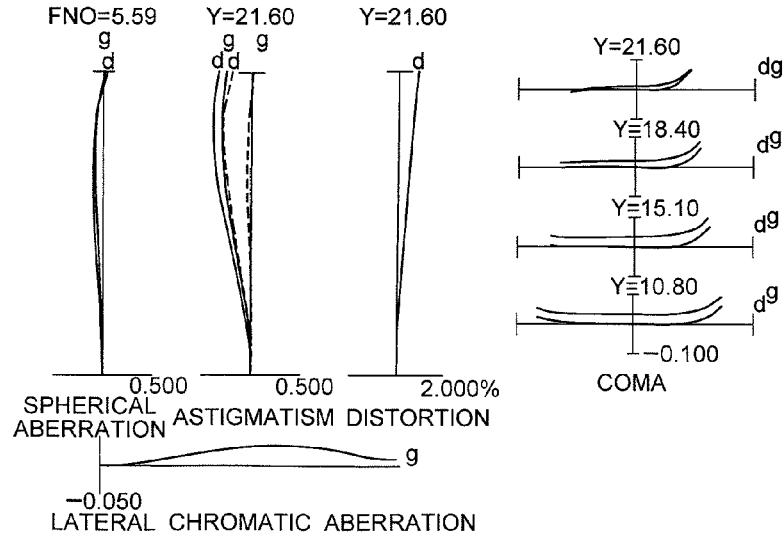

FIGS. 9A, 9B and 9C are graphs showing various aberrations of the zoom lens according to Example 4 of the first embodiment upon focusing on an infinitely distant object, in which FIG. 9A is a wide-angle end state, FIG. 9B is an intermediate focal length state, and FIG. 9C is a telephoto end state.

As is apparent from various graphs, the zoom lens according to Example 4 of the first embodiment shows superb optical performance as a result of good corrections to various aberrations including spherical aberration, curvature of field, astigmatism and coma.

Example 5

Figure 10:
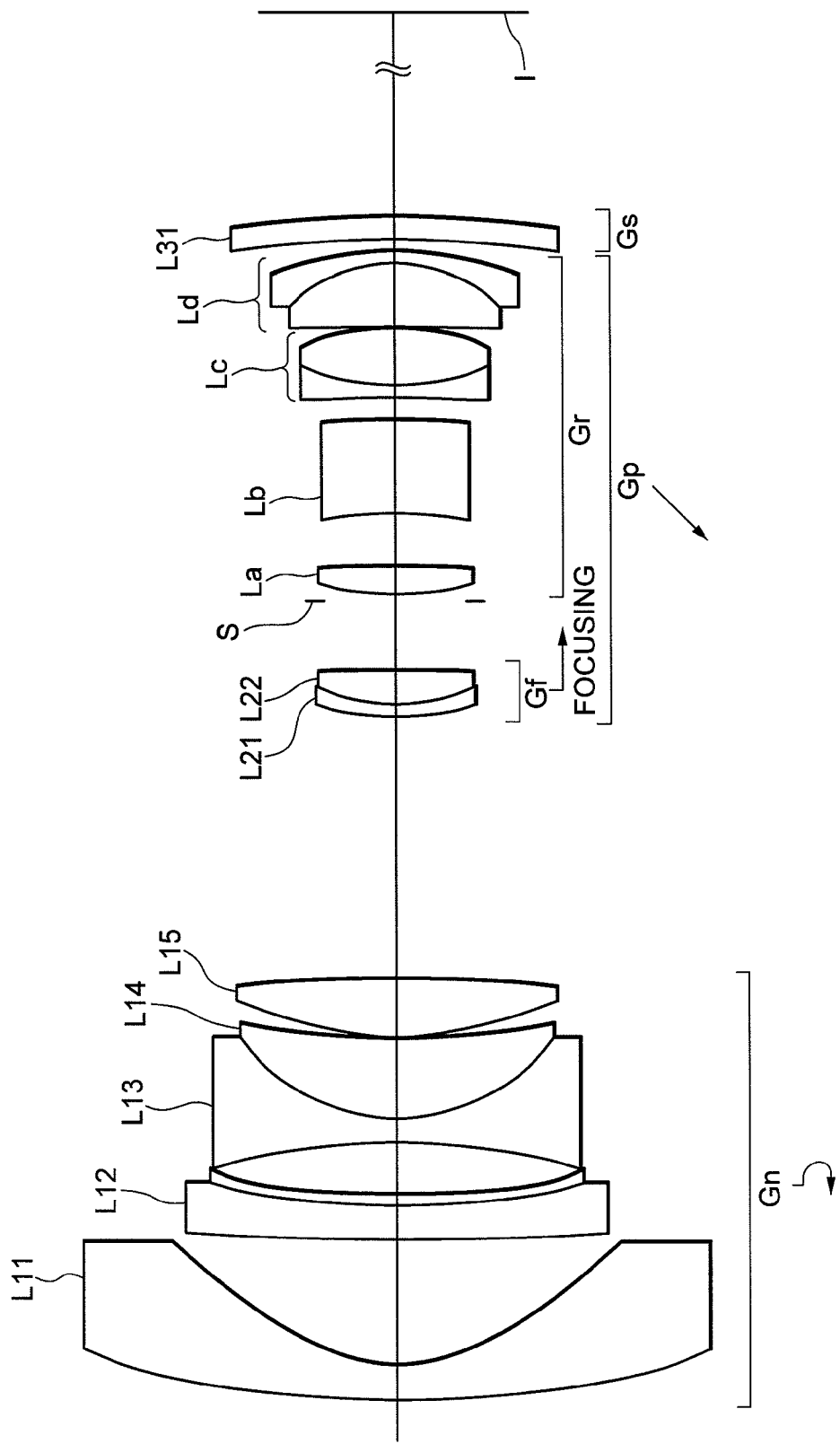
FIG. 10 is a sectional view showing a lens configuration of a zoom lens according to Example 5 of the first embodiment of the present application.

FIG. 10 is a sectional view showing a lens configuration of a zoom lens according to Example 5 of the first embodiment of the present application.

The zoom lens according to Example 5 of the first embodiment is composed of, in order from an object side, a front lens group Gn having negative refractive power, a rear lens group Gp having positive refractive power, and a fixed lens group Gs.

The front lens group Gn is composed of, in order from the object side, a double aspherical meniscus lens L11, a compound type aspherical positive lens L12, a cemented negative lens constructed by a double concave negative lens L13 cemented with a positive meniscus lens L14 having a convex surface facing the object side, and a double convex positive lens L15.

The double aspherical meniscus lens L11 having a concave surface facing the image plane I side has negative refractive power and has a shape that the negative refractive power becomes weak from the center to the periphery.

The compound type aspherical positive lens L12 has a shape that positive refractive power formed by combination turns to negative refractive power from the center to the periphery. The lens L12 is formed by combination of a glass material and a resin material.

The rear lens group Gp is composed of, in order from the object side, a focusing lens group Gf having positive refractive power, an aperture stop S, and a positive lens group Gr having positive refractive power.

The focusing lens group Gf is moved from the object side to the image side for carrying out focusing from an infinitely distant object to a close object, and composed of only a cemented positive lens constructed by, in order from the object side, a negative meniscus lens L21 having a convex surface facing the object side cemented with a double convex positive lens L22.

The positive lens group Gr is composed of, in order from the object side, a double convex positive lens La, a negative meniscus lens Lb having a concave surface facing the object side, a cemented positive lens Lc constructed by a double concave negative lens cemented with a double convex positive lens, and a cemented positive lens Ld constructed by a positive meniscus lens having a convex surface facing the image plane I side cemented with a negative meniscus lens having a convex surface facing the image plane I side.

The fixed lens group Gs is composed of only a negative meniscus lens L31 having a convex surface facing the image side.

In the zoom lens according to Example 5, a distance between the front lens group Gn and the rear lens group Gp is varied, thereby carrying out zooming from the wide-angle end state to the telephoto end state. Incidentally, the position of the fixed lens group Gs is fixed upon zooming. Each arrow in FIG. 10 indicates moving trajectory of each of the front lens group Gn and the rear lens group Gp upon zooming from the wide-angle end state to the telephoto end state.

In the zoom lens seen from another point of view according to Example 5 of the first embodiment, an antireflection coating described later is applied to the image plane I side lens surface of the negative meniscus lens L11 in the front lens group Gn and the object side lens surface of the double concave negative lens L13 in the front lens group Gn.

Various values associated with the zoom lens according to Example 5 are listed in Table 5.

TABLE 5

(Specifications)
zoom ratio = 1.77

|  | W | M | T |
|---|---|---|---|
| F = | 16.48 | 24.00 | 29.10 |
| FNO = | 4.49 | 5.33 | 5.93 |
| ω = | 52.73 | 41.73 | 36.33° |
| Y = | 21.60 | 21.60 | 21.60 |
| TL = | 139.69 | 136.93 | 139.40 |
| Σd = | 102.78 | 100.03 | 102.50 |
| BF = | 36.90 | 36.90 | 36.90 |

(Lens Data)

| i | r | d | nd | νd |
|---|---|---|---|---|
| *1) | 120.0323 | 3.0000 | 1.744430 | 49.53 |
| *2) | 14.8111 | 11.0000 |  |  |
| 3) | 320.0965 | 3.0000 | 1.516800 | 64.12 |
| 4) | 70.0000 | 1.0000 | 1.553890 | 38.09 |
| *5) | −993.8663 | 4.5000 |  |  |
| 6) | −56.5907 | 2.0000 | 1.816000 | 46.63 |
| 7) | 17.0196 | 7.0000 | 1.603420 | 38.02 |

TABLE 5-continued

| | | | | |
|---|---|---|---|---|
| 8) | 73.8459 | 0.1000 | | |
| 9) | 32.4760 | 5.0000 | 1.717360 | 29.52 |
| 10) | −157.9244 | (d10) | | |
| 11) | 23.8096 | 1.0000 | 1.795000 | 45.30 |
| 12) | 15.6593 | 3.0000 | 1.497820 | 82.56 |
| 13) | −1090.6220 | (d13) | | |
| 14) | ∞ | 0.7000 | Aperture Stop S | |
| 15) | 26.3980 | 2.5000 | 1.497820 | 82.56 |
| 16) | −79.3224 | 4.6000 | | |
| 17) | −39.5467 | 8.0000 | 1.744000 | 44.79 |
| 18) | −162.0229 | 2.0000 | | |
| 19) | −92.3426 | 1.0000 | 1.755000 | 52.29 |
| 20) | 20.8016 | 5.0000 | 1.518230 | 58.89 |
| 21) | −21.0542 | 0.1000 | | |
| 22) | −344.4872 | 5.5000 | 1.497820 | 82.56 |
| 23) | −13.5094 | 1.0000 | 1.834810 | 42.72 |
| 24) | −31.7192 | (d24) | | |
| 25) | −100.0000 | 2.0000 | 1.516800 | 64.12 |
| 26) | −107.0000 | BF | | |

(Aspherical Surface Data)

Surface Number = 1

$\kappa = 12.7063$
$A4 = 2.52869E-07$
$A6 = 5.51300E-10$
$A8 = 4.77913E-13$
$A10 = -3.07832E-16$
$A12 = -0.49549E-19$ Surface Number = 2

$\kappa = -0.0947$
$A4 = -6.70196E-06$
$A6 = -1.78783E-08$
$A8 = -5.15142E-12$
$A10 = -4.83366E-14$
$A12 = 0.21367E-15$ Surface Number = 5

$\kappa = 0.00000$
$A4 = 2.50710E-05$
$A6 = 2.09871E-08$
$A8 = 1.63612E-10$
$A10 = -1.20936E-13$
$A12 = -0.17594E-14$ (Variable Distances)

| | W | M | T |
|---|---|---|---|
| F = | 16.48000 | 24.00000 | 29.10000 |
| d0 = | ∞ | ∞ | ∞ |
| d10 = | 22.83854 | 8.08582 | 2.08111 |
| d13 = | 5.94351 | 5.94351 | 5.94351 |
| d24 = | 1.00000 | 12.99953 | 21.47140 |
| BF = | 36.90477 | 36.90477 | 36.9047 |
| β = | −0.03333 | −0.03333 | −0.03333 |
| d0 = | 479.0879 | 697.4475 | 851.1518 |
| d10 = | 23.80535 | 8.75458 | 2.64698 |
| d13 = | 4.97670 | 5.27476 | 5.37764 |
| d24 = | 1.00000 | 12.99953 | 21.47140 |
| BF = | 36.90477 | 36.90477 | 36.90477 |
| β = | −0.09092 | −0.12930 | −0.15949 |
| d0 = | 160.3132 | 163.0664 | 160.5992 |
| d10 = | 25.48445 | 10.67259 | 4.77187 |
| d13 = | 3.29760 | 3.35675 | 3.25276 |
| d24 = | 1.00000 | 12.99953 | 21.47140 |
| BF = | 36.90477 | 36.90477 | 36.90477 |

(Lens Group Data)

| Group | I | Focal Length |
|---|---|---|
| Gn | 1 | −21.85385 |
| Gf | 11 | 65.79150 |
| Gr | 15 | 59.98221 |
| Gs | 25 | −3276.74607 |

(Values for Conditional Expressions)

(1) Fw/(−Fb) = 0.2278
(2) Fw/|Fd| = 0.005215
(3) Fw/Fc = 0.1105
(4) Fw/Ff = 0.2505
(5) (r2 + r1)/(r2 − r1) = 1.646

Figure 11A:
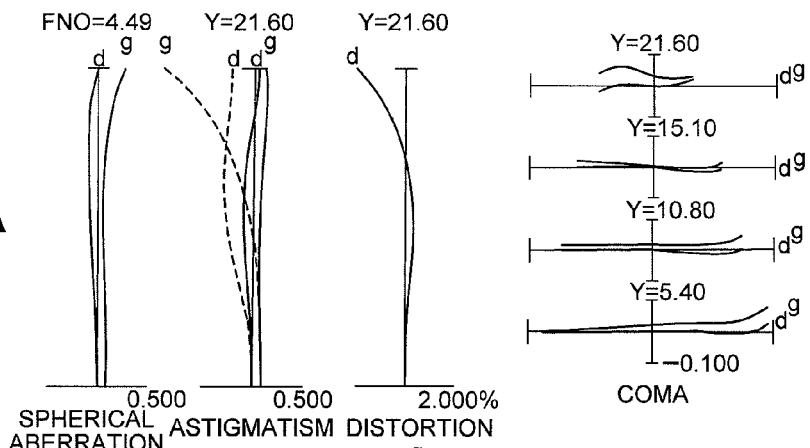
Figure 11B:
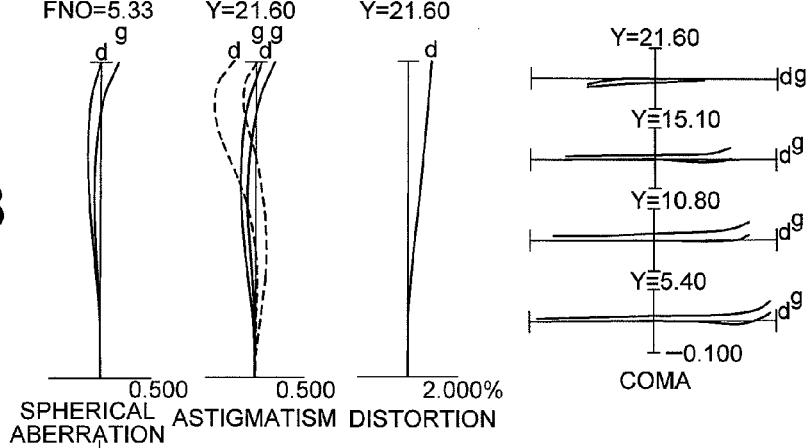
Figure 11C:
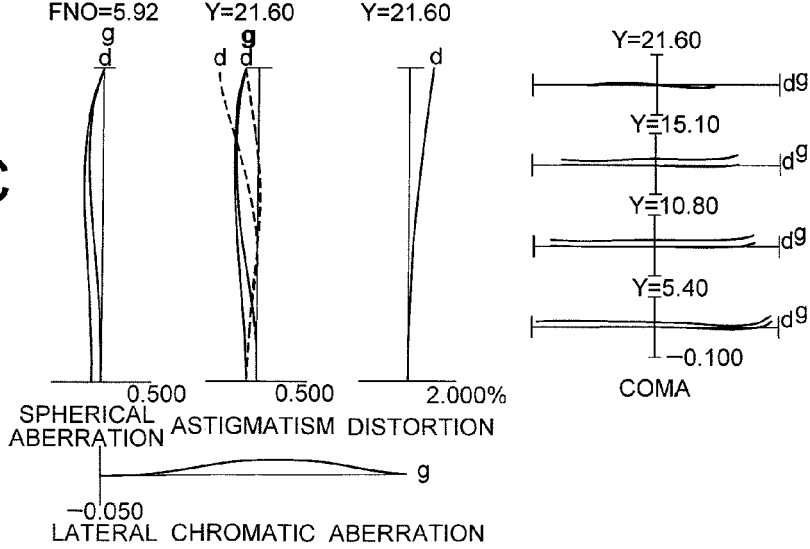

FIGS. 11A, 11B and 11C are graphs showing various aberrations of the zoom lens according to Example 5 of the first embodiment upon focusing on an infinitely distant object, in which FIG. 11A is a wide-angle end state, FIG. 11B is an intermediate focal length state, and FIG. 11C is a telephoto end state.

As is apparent from various graphs, the zoom lens according to Example 5 of the first embodiment shows superb optical performance as a result of good corrections to various aberrations including spherical aberration, curvature of field, astigmatism and coma.

Then, an antireflection coating used in the zoom lens seen from another point of view according to Example 1 through 5 of the first embodiment is explained. Incidentally, a zoom lens seen from another point of view according to each of Example 6 through 10 of the second embodiment explained later is used the same antireflection coating.

Figure 23:
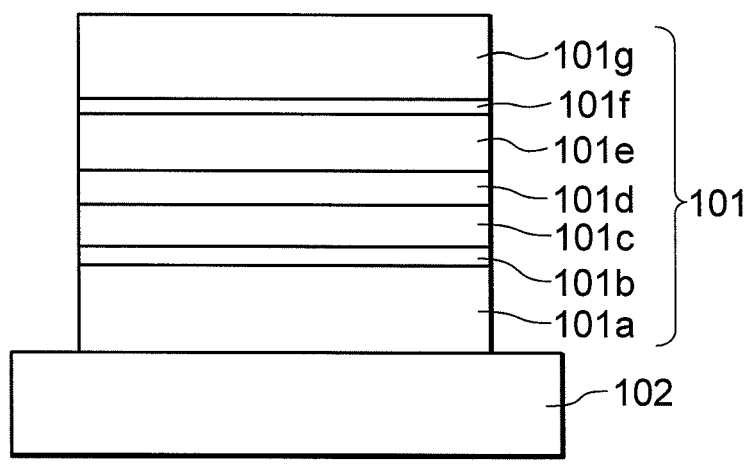
FIG. 23 is an explanatory view showing a configuration of an antireflection coating according to the present application.

FIG. 23 is an explanatory view showing a configuration of an antireflection coating (which is also referred to as a multi-layered broadband antireflection coating) used in the zoom lens according to the present embodiment. The antireflection coating 101 is composed of seven layers and is formed on an optical surface of an optical member 102 such as a lens. A first layer 101a is formed with aluminum oxide by means of a vacuum evaporation method. On the first layer 101a, a second layer 101b formed with mixture of titanium oxide and zirconium oxide by means of a vacuum evaporation method is formed. Moreover, on the second layer 101b, a third layer 101c formed with aluminum oxide by means of vacuum evaporation method is formed. Moreover, on the third layer 101c, a fourth layer 101f formed with a mixture of titanium oxide and zirconium oxide by means of a vacuum evaporation method is formed. Furthermore, on the fourth layer 101d, a fifth layer 101e formed with aluminum oxide by means of vacuum evaporation method is formed. On the fifth layer 101e, a sixth layer 101f formed with mixture of titanium oxide and zirconium oxide by means of a vacuum evaporation method is formed.

Then, on the sixth layer 101f formed in this manner, a seventh layer 101g formed with a mixture of silica and magnesium fluoride is formed by means of a wet process to form the antireflection coating according to the present embodiment. In order to form the seventh layer 101g, a sol-gel process, which is a kind of wet process, is used. The sol-gel process is a process of transforming a sol acquired by mixing a material into a gel having no fluidity through hydrolyzing condensation polymerization reaction and acquiring a product by heat-decomposing this gel. In manufacturing an optical thin film, the film may be generated by coating a material sol of the optical thin film over the optical surface of the optical member and dry-solidifying the sol into a gel film. Note that the wet process may involve using, without being limited to the sol-gel process, a process of acquiring a solid-state film through none of the gel state.

In this manner, the first layer 101a through the sixth layer 101f are formed by electron beam evaporation, which is a dry process, and the seventh layer 101g, which is the uppermost layer, is formed by a following wet-process using sol liquid prepared by a hydrofluoric acid/magnesium acetate method. At first, an aluminum oxide layer, which becomes a first layer 101a, a mixture of titanium oxide and zirconium oxide layer, which becomes a second layer 101b, an aluminum oxide layer, which becomes a third layer 101a, a mixture of titanium oxide and zirconium oxide layer, which becomes a fourth layer 101b, an aluminum oxide layer, which becomes a fifth layer 101a, and a mixture of titanium oxide and zirconium oxide layer, which becomes a sixth layer 101b are formed on a film-forming surface (the above-mentioned optical surface of the optical member 102) in this order by a vacuum evaporation equipment. Then, after being took out from the vacuum evaporation equipment, the optical member 102 is applied with a sol liquid prepared by the hydrofluoric acid/magnesium acetate method by means of a spin coat method, so that a layer formed by a mixture of silica and magnesium fluoride, which becomes a seventh layer 101g, is formed. A reaction formula prepared by the hydrofluoric acid/magnesium acetate method is shown by expression (a):

$$2HF + Mg(CH3COO)2 \rightarrow MgF2 + 2CH3COOH \quad (a).$$

The sol liquid is used for forming the film after mixing ingredients with undergoing high temperature, high pressure maturing process at 140° C., 24 hours by means of an autoclave. After completion of forming the seventh layer 101g, the optical member 102 is processed with heating treatment at 160° C. in atmospheric pressure for 1 hour to be completed. With using such a sol gel method, atoms or molecules are built up from several to several tens to become particles of several nanometers to several tens of nanometers, and several these particles are built up to form secondary particles. As a result, the secondary particles are piled up to form the seventh layer 101g.

Optical performance of the optical member including the thus-formed antireflection coating 101 will hereinafter be described by using spectral characteristics shown in FIG. 24.

The optical member (lens) including the antireflection coating according to the present embodiment is formed under the conditions shown in the following Table 11. Herein, the Table 11 shows respective optical film thicknesses of the layers 101a (the first layer) through 101g (the seventh layer) of the antireflection coating 101, which are obtained under such conditions that λ denotes a reference wavelength and the refractive index of the substrate (optical member) is set to 1.62, 1.74 and 1.85. Note that the Table 11 shows $Al_2O_3$ expressed as the aluminum oxide, $ZrO_2+TiO_2$ expressed as the mixture of titanium oxide and zirconium oxide and $MgF_2+SiO_2$ expressed as the mixture of magnesium fluoride and silica.

TABLE 11

| layer | material | n | thicknesses of layers | | |
|---|---|---|---|---|---|
| | medium air | 1 | | | |
| 7 | MgF2 + SiO2 | 1.26 | 0.268λ | 0.271λ | 0.269λ |
| 6 | ZrO2 + TiO2 | 2.12 | 0.057λ | 0.054λ | 0.059λ |
| 5 | Al2O3 | 1.65 | 0.171λ | 0.178λ | 0.162λ |
| 4 | ZrO2 + TiO2 | 2.12 | 0.127λ | 0.13λ | 0.158λ |
| 3 | Al2O3 | 1.65 | 0.122λ | 0.107λ | 0.08λ |
| 2 | ZrO2 + TiO2 | 2.12 | 0.059λ | 0.075λ | 0.105λ |
| 1 | Al2O3 | 1.65 | 0.257λ | 0.03λ | 0.03λ |
| | n (substrate) | | 1.62 | 1.74 | 1.85 |

Figure 24:
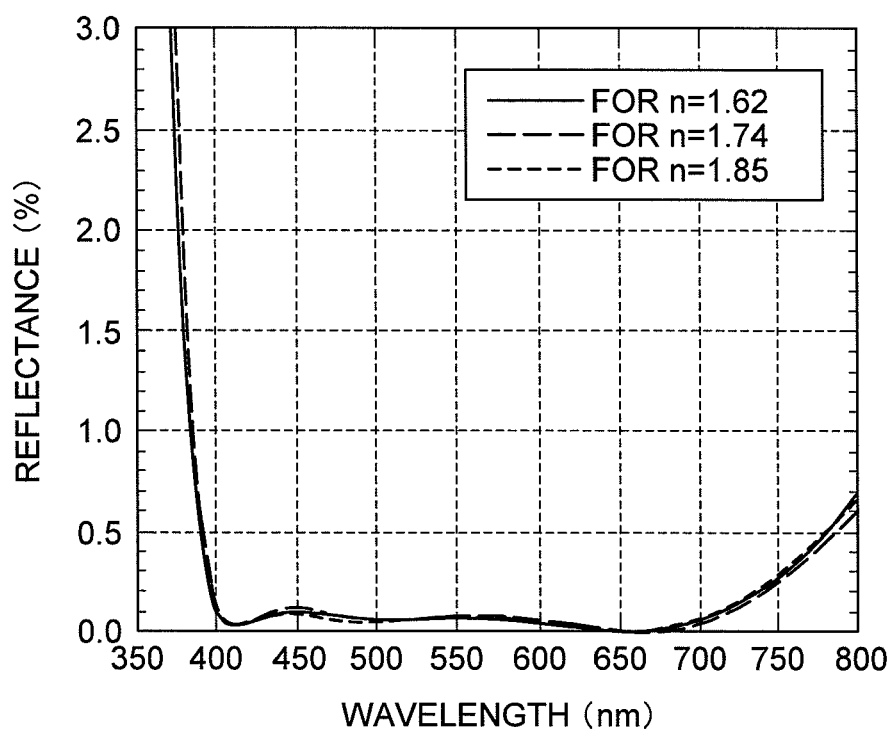
FIG. 24 is a graph showing spectral reflectance of an anti reflection coating according to the present embodiment.

FIG. 24 shows the spectral characteristics when the light beams vertically are incident on the optical member in which the optical film thickness of each of the layers of the antireflection coating 101 is designed, with the reference wavelength λ set to 550 nm in the Table 11.

It is understood from FIG. 24 that the optical member including the antireflection coating 101 designed with the reference wavelength λ set to 550 nm can restrain the reflectance down to 0.2% or under over the entire range in which the wavelengths of the light beams are 420 nm through 720 nm. Further, in the Table 11, even the optical member including the antireflection coating 101, in which each optical film thickness is designed with the reference wavelength λ set to the d-line (wavelength 587.6 nm), has substantially the same spectral characteristics as in the case where the reference wavelength λ shown in FIG. 24 is 550 nm in a way that affects substantially none of the spectral characteristics thereof.

Next, a modified example of the antireflection coating will be explained. The antireflection coating is a 5-layered film, and, similarly to the Table 11, the optical film thickness of each layer with respect to the reference wavelength λ is designed under conditions shown in the following Table 12. In this modified example, the formation of the fifth layer involves using the sol-gel process described above.

TABLE 12

| layer | material | n | thicknesses of layers | |
|---|---|---|---|---|
| | medium air | 1 | | |
| 5 | MgF2 + SiO2 | 1.26 | 0.275λ | 0.269λ |
| 4 | ZrO2 + TiO2 | 2.12 | 0.045λ | 0.043λ |
| 3 | Al2O3 | 1.65 | 0.212λ | 0.217λ |
| 2 | ZrO2 + TiO2 | 2.12 | 0.077λ | 0.066λ |
| 1 | Al2O3 | 1.65 | 0.288λ | 0.290λ |
| | n (substrate) | | 1.46 | 1.52 |

Figure 25:
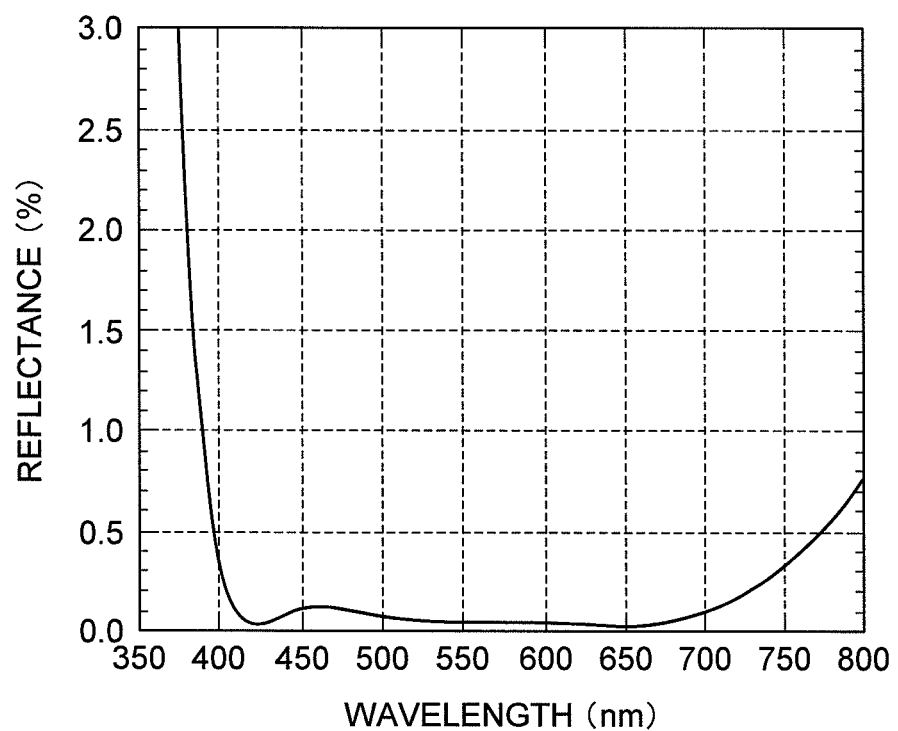
FIG. 25 is a graph showing spectral reflectance of an anti reflection coating according to a variation of the present application.

FIG. 25 shows the spectral characteristics when the light beams vertically are incident on the optical member in which the optical film thickness of each of the layers is designed, with the substrate refractive index set to 1.52 and the reference wavelength λ set to 550 nm in the Table 12. It is understood from FIG. 25 that the antireflection coating in the modified example can restrain the reflectance down to 0.2% or under over the entire range in which the wavelengths of the light beams are 420 nm-720 nm. Note that in the Table 12, even the optical member including the antireflection coating, in which each optical film thickness is designed with the reference wavelength λ set to the d-line (wavelength 587.6 nm), has substantially the same spectral characteristics as the spectral characteristics shown in FIG. 25 in a way that affects substantially none of the spectral characteristics thereof.

Figure 26:
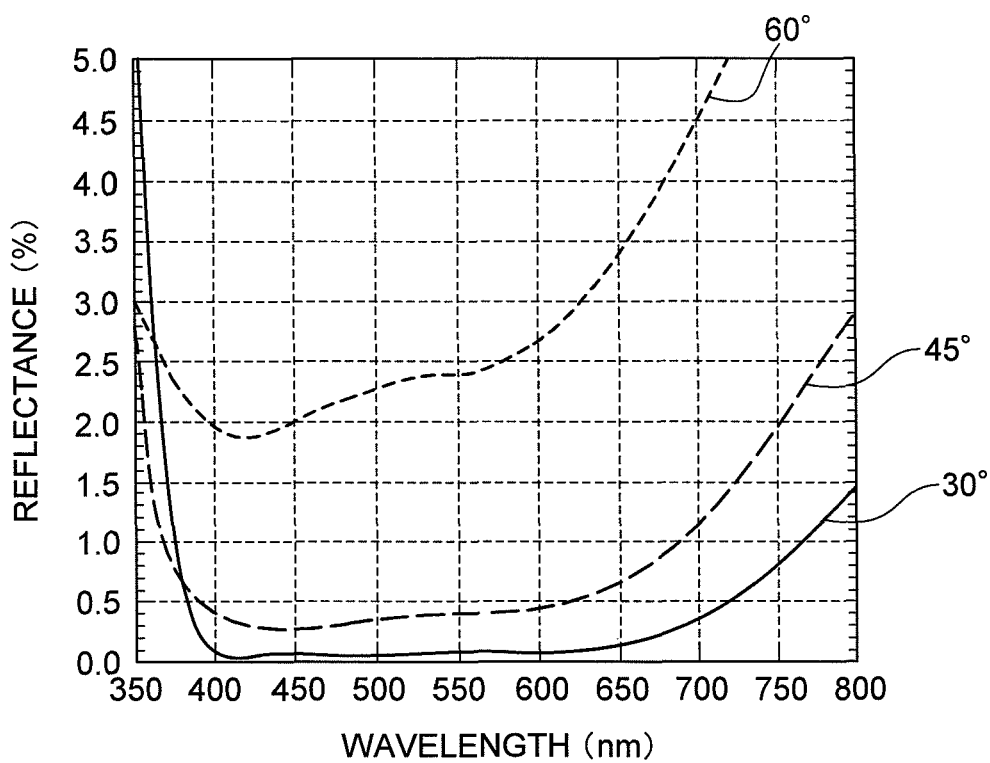
FIG. 26 is a graph showing incident angle dependency of spectral reflectance of the anti reflection coating according to the variation.

FIG. 26 shows the spectral characteristics in such a case that the incident angles of the light beams upon the optical member having the spectral characteristics shown in FIG. 25 are 30 degrees, 45 degrees and 60 degrees, respectively. Note that FIGS. 25 and 26 do not illustrate the spectral characteristics of the optical member including the antireflection coating in which the substrate refractive index is 1.46 shown in Table 12, however, it is understood that the optical member has substantially the same spectral characteristics such as the substrate refractive index being 1.52.

Figure 27:
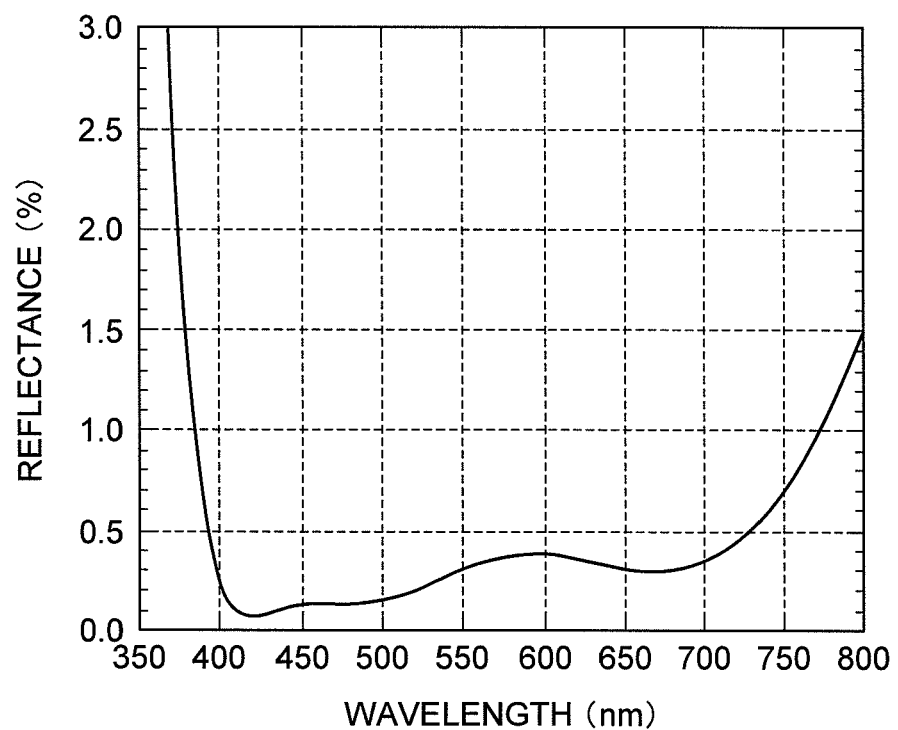
FIG. 27 is a graph showing spectral reflectance of an anti reflection coating according to a conventional example.

Furthermore, FIG. 27 shows one example of the antireflection coating grown by only the dry process such as the conventional vacuum evaporation method by way of a comparison. FIG. 27 shows the spectral characteristics when the light beams are incident on the optical member in which to design the antireflection coating structured under the conditions shown in the following Table 13, with the substrate refractive index set to 1.52 in the same way as in the Table 12. Moreover, FIG. 28 shows the spectral characteristics in such a case that the incident angles of the light beams upon the optical member having the spectral characteristics shown in FIG. 27 are 30 degrees, 45 degrees and 60 degrees, respectively.

TABLE 13

| layer | material | n | thicknesses of layers |
|---|---|---|---|
|  | medium air | 1 |  |
| 7 | MgF2 | 1.39 | 0.243λ |
| 6 | ZrO2 + TiO2 | 2.12 | 0.119λ |
| 5 | Al2O3 | 1.65 | 0.057λ |
| 4 | ZrO2 + TiO2 | 2.12 | 0.220λ |
| 3 | Al2O3 | 1.65 | 0.064λ |
| 2 | ZrO2 + TiO2 | 2.12 | 0.057λ |
| 1 | Al2O3 | 1.65 | 0.193λ |
| refractive index of substrate |  |  | 1.52 |

Figure 28:
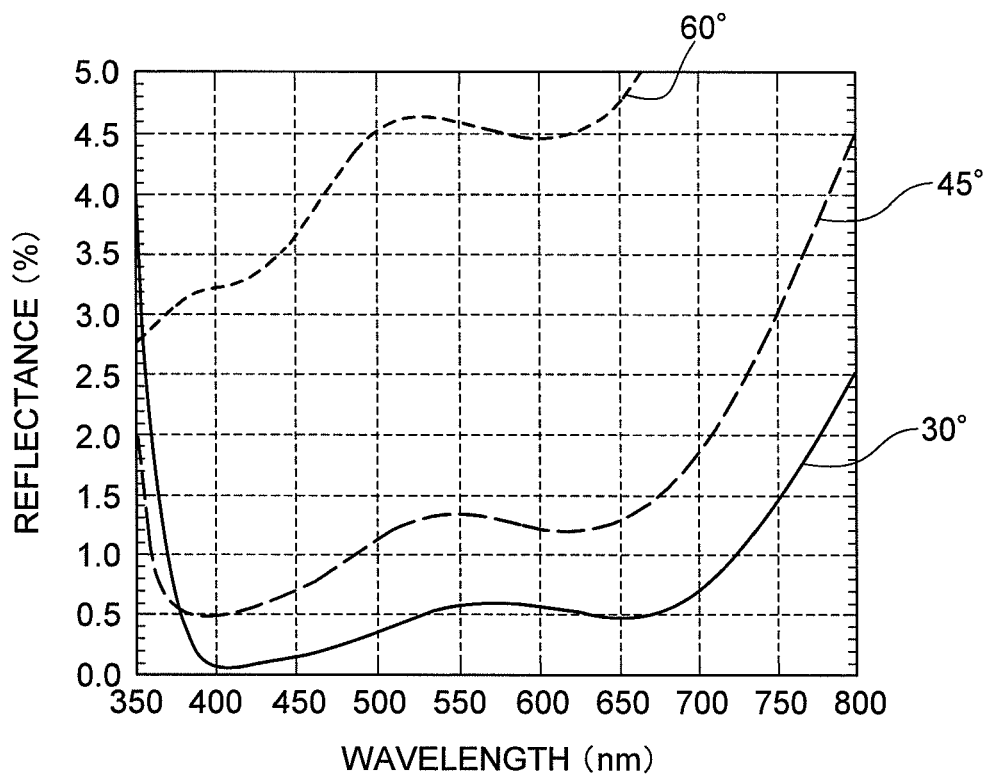
FIG. 28 is a graph showing incident angle dependency of spectral reflectance of the anti reflection coating according to the conventional example.

To compare the spectral characteristics of the optical member including the antireflection coating according to the present embodiment illustrated in FIGS. 24 through 26 with the spectral characteristics in the conventional examples shown in FIGS. 27 and 28, it is well understood that the present antireflection coating has the much lower reflectance at any incident angles and, besides, has the low reflectance in the broader band.

The above explanation for the antireflection coating according to the first embodiment is the same in the second embodiment.

Then, an example of applying the antireflection coating shown in the Tables 11 and 12 to Examples 1 through 5 of the first embodiment discussed above is explained.

In the zoom lens seen from another point of view according to Example 1, as shown in the Table 1, the refractive index nd of the negative meniscus lens L11 of the front lens group Gn is 1.744430 (nd=1.744430), and the refractive index nd of the double concave negative lens L12 of the front lens group Gn is 1.816000 (nd=1.816000), whereby it is feasible to reduce the reflected light from each lens surface and to reduce ghost images and flare as well by applying the antireflection coating 101 (see Table 11) corresponding to 1.74 as the substrate refractive index to the image side lens surface of the negative meniscus lens L11 and applying the antireflection coating (see Table 11) corresponding to 1.85 as the substrate refractive index to the object side lens surface of the double concave negative lens L12.

In the zoom lens seen from another point of view according to Example 2, as shown in the Table 2, the refractive index nd of the negative meniscus lens L11 of the front lens group Gn is 1.744430 (nd=1.744430), and the refractive index nd of the positive lens L12 of the front lens group Gn is 1.516800 (nd=1.516800), whereby it is feasible to reduce the reflected light from each lens surface and to reduce ghost images and flare as well by applying the antireflection coating 101 (see Table 11) corresponding to 1.74 as the substrate refractive index to the image side lens surface of the negative meniscus lens L11 and applying the antireflection coating (see Table 12) corresponding to 1.52 as the substrate refractive index to the object side lens surface of the positive lens L12.

In the zoom lens seen from another point of view according to Example 3, as shown in the Table 3, the refractive index nd of the negative meniscus lens L11 of the front lens group Gn is 1.744430 (nd=1.744430), and the refractive index nd of the double convex positive lens L15 of the front lens group Gn is 1.717360 (nd=1.717360), whereby it is feasible to reduce the reflected light from each lens surface and to reduce ghost images and flare as well by applying the antireflection coating 101 (see Table 11) corresponding to 1.74 as the substrate refractive index to the image side lens surface of the negative meniscus lens L11 and applying the antireflection coating (see Table 11) corresponding to 1.74 as the substrate refractive index to the object side lens surface of the double convex positive lens L15.

In the zoom lens seen from another point of view according to Example 4, as shown in the Table 4, the refractive index nd of the negative meniscus lens L11 of the front lens group Gn is 1.744430 (nd=1.744430), and the refractive index nd of the positive meniscus lens L14 of the front lens group Gn is 1.603420 (nd=1.603420), whereby it is feasible to reduce the reflected light from each lens surface and to reduce ghost images and flare as well by applying the antireflection coating 101 (see Table 11) corresponding to 1.74 as the substrate refractive index to the image side lens surface of the negative meniscus lens L11 and applying the antireflection coating (see Table 11) corresponding to 1.62 as the substrate refractive index to the image side lens surface of the positive meniscus lens L14.

In the zoom lens seen from another point of view according to Example 5, as shown in the Table 5, the refractive index nd of the negative meniscus lens L11 of the front lens group Gn is 1.744430 (nd=1.744430), and the refractive index nd of the double concave negative lens L13 of the front lens group Gn is 1.816000 (nd=1.816000), whereby it is feasible to reduce the reflected light from each lens surface and to reduce ghost images and flare as well by applying the antireflection coating 101 (see Table 11) corresponding to 1.74 as the substrate refractive index to the image side lens surface of the negative meniscus lens L11 and applying the antireflection coating (see Table 11) corresponding to 1.85 as the substrate refractive index to the object side lens surface of the double concave negative lens L13.

As described above, each example of the first embodiment makes it possible to realize a downsized retrofocus type zoom lens suitable for an imaging apparatus such as a single-lens reflex camera, having an angle of view of 2ω=106.3 degrees or more in the wide-angle end state, an f-number of about 4 to 5.6, fewer number of lens elements, a small diameter of the front lens, in other words, a small filter diameter, and excellent optical performance with excellently correcting various aberrations, suppressing ghost images and flare.

Figure 29:
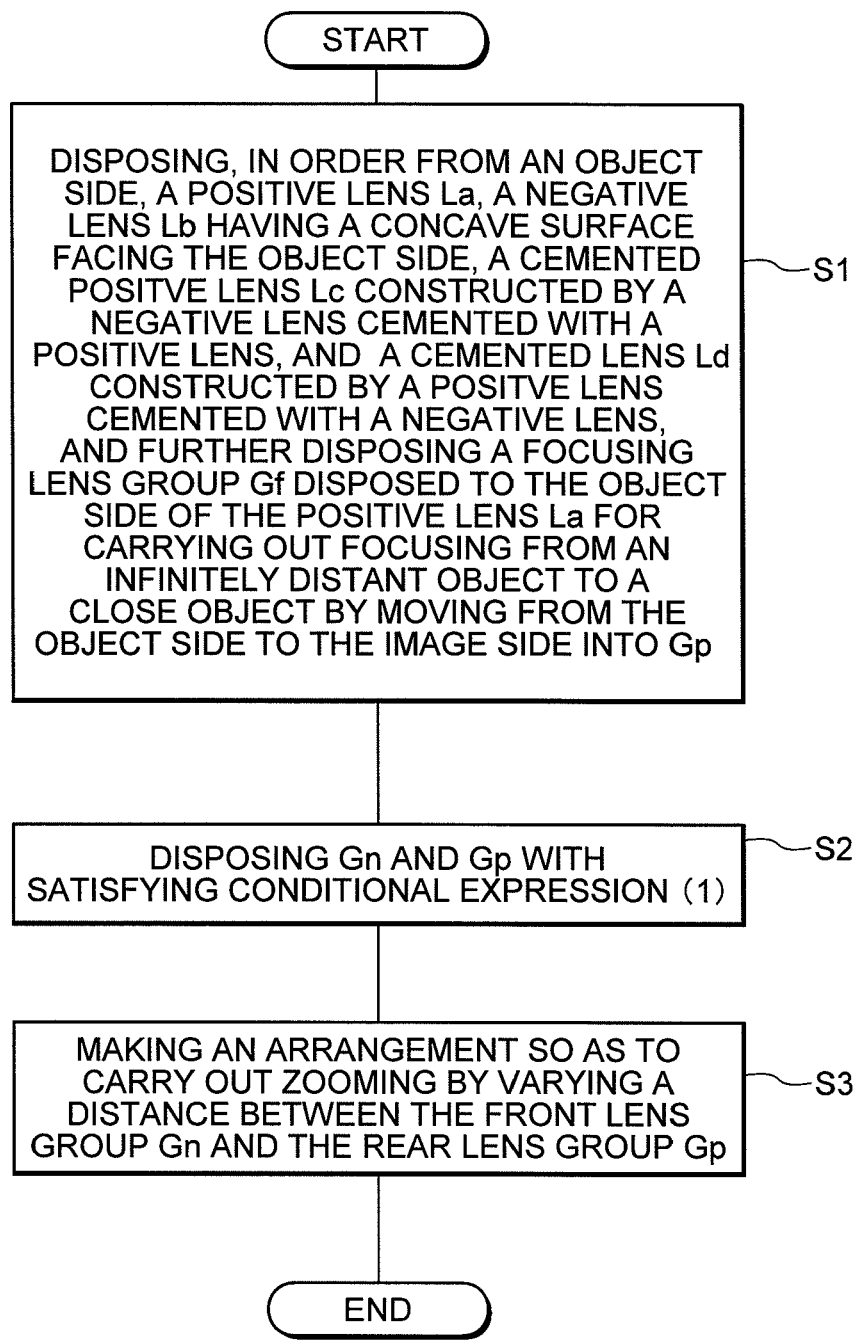
FIG. 29 is a flowchart schematically explaining a method for manufacturing the zoom lens according to the first embodiment.

Then, an outline of a method for manufacturing a zoom lens according to the first embodiment is explained with reference to FIG. 29.

The method for manufacturing a zoom lens according to the first embodiment is a method for manufacturing a zoom lens including, in order from an object side, a front lens group having negative refractive power, and a rear lens group having positive refractive power, and being constructed such that at least one optical surface in the front lens group is applied with an antireflection coating, and the antireflection coating includes at least one layer that is formed by a wet process, the method including steps S1 through S3.

Step S1: disposing, in order from the object side, a positive lens La, a negative lens Lb having a concave surface facing the object side, a cemented positive lens Lc constructed by a negative lens cemented with a positive lens, and a cemented lens Ld constructed by a positive lens cemented with a negative lens, and further disposing a focusing lens group Gf disposed to the object side of the positive lens La for carrying out focusing from an infinitely distant object to a close object by moving from the object side to the image side into the rear lens group Gp.

Step S2: Disposing, in order from the object side, the front lens group Gn and the rear lens group Gp into the lens barrel with satisfying conditional expression (1):

$$0.000 < Fw/(-Fb) < 1.000 \tag{1}$$

where Fw denotes a focal length of the zoom lens in a wide-angle end state upon focusing on an infinitely distant object, and Fb denotes a focal length of the negative lens Lb in the rear lens group.

Step S3: making an arrangement so as to carry out zooming by varying a distance between the front lens group Gn and the rear lens group Gp.

With this method for manufacturing a zoom lens according to the first embodiment, it becomes possible to manufacture a downsized zoom lens having a wide angle of view and excellent optical performance with fewer number of lenses with correcting various aberrations suppressing ghost images and flare.

Second Embodiment

A zoom lens, an imaging apparatus equipped therewith, and a method for manufacturing the zoom lens according to a second embodiment of the present application are explained below.

A zoom lens according to the second embodiment of the present application includes, in order from an object side, a front lens group having negative refractive power, and a rear lens group having positive refractive power. The front lens group includes, in order from the object side, an aspherical lens component Ga that has negative refractive power and a shape that the negative refractive power becomes smaller toward the periphery, and an aspherical lens component Gb that has positive refractive power and a shape that the positive refractive power turns to negative refractive power toward the periphery or has negative refractive power and a shape that the negative refractive becomes stronger toward the periphery. A distance between the front lens group and the rear lens group is varied, thereby carrying out zooming. The following conditional expression (6) is satisfied:

$$0.000 \leq (-Fa)/|Fb| < 0.650 \tag{6}$$

where Fa denotes a focal length of the aspherical lens component Ga in the front lens group, and Fb denotes a focal length of the aspherical lens component Gb in the front lens group.

Generally, in a retrofocus type zoom lens having a wide angle of view, the front lens group having negative refractive power tends to become large, so that the filter diameter thereof also tends to become large. In a zoom lens whose image area exceeds the 35 mm film format, in particular, a zoom lens whose angle of view (2ω) exceeds 106 degrees, the filter diameter thereof tends to well exceed 77 mm, which is the diameter of commonly used filter.

Accordingly, in a zoom lens according to the second embodiment, in order to downsize, in particular, the diameter of the front lens group, the above described aspherical lens component Ga and the aspherical lens component Gb are disposed in the front lens group. With disposing the aspherical lens component Ga in the front lens group, various aberrations such as coma, curvature of field, astigmatism and distortion can be excellently corrected. The aspherical lens component Ga has large negative refractive power in paraxial area, and negative refractive power becomes weak in the periphery. Such a configuration has a characteristic capable of excellently controlling off-axis aberrations such as distortion, curvature of field, and astigmatism.

However, in the present case where an aspherical shape varies drastically, aberration correction becomes excessive, so that distortion and coma have to be corrected by other lenses than the aspherical lens component Ga. Moreover, when negative refractive power becomes excessively small in the periphery of the aspherical lens component Ga, the incident height of the oblique ray becomes large, so that the diameter of the front lens group becomes large.

Accordingly, in a zoom lens according to the second embodiment of the present application, in order to improve the above described two points, the aspherical lens component Gb is introduced in the front lens group. The aspherical lens component Gb plays a role of a so-called aspherical correction plate. The aspherical lens component Gb has relatively weak refractive power in the paraxial area. Refractive power may be positive or negative. On the other hand, the component Gb has relatively large negative refractive power in the periphery, which is the characteristic of the aspherical lens component Gb. With this aspherical lens component Gb, it becomes possible to lower the incident height of the oblique ray, and to downsize the diameter of the front lens group. Moreover, over-corrected distortion, coma, curvature of field and astigmatism can be excellently corrected, and a zoom lens having a wide angle of view and a excellent optical performance can be realized.

Then, characteristics of a zoom lens according to the second embodiment will be explained with reference to each conditional expression.

Conditional explanation (6) defines paraxial power ratio between the aspherical lens component Ga and the aspherical lens component Gb in the front lens group. Incidentally, the reason why the word "lens component" is used is the so-called compound type aspherical lens is concerned. In the case of the compound type aspherical lens formed by a resin material and a glass material, since the resin portion cannot exist independently, the combination as a whole is thought as one lens is appropriate different from an ordinary cemented lens. Accordingly, upon calculating conditional expression (6), when each of the aspherical lens components Ga and Gb is a compound type aspherical lens, a combined paraxial focal length combining the resin portion and the glass portion is to be used.

In a zoom lens according to the second embodiment of the present application, the paraxial focal length of the aspherical lens component Ga is relatively small, in other words, refractive power is large. On the other hand, the paraxial focal length of the aspherical lens component Gb is relatively large, in other words, refractive power is small. The effect of this characteristic is that distortion, coma, curvature of field and astigmatism can be excellently corrected as described above, and the diameter of the front lens group can be downsized.

When the ratio (−Fa)/|Fb| is equal to or exceeds the upper limit of conditional expression (6), the absolute value of the paraxial focal length of the aspherical lens component Ga becomes large, in other words, paraxial negative refractive power becomes small. In this case, an incident height of oblique ray becomes large, and the diameter of the front lens group becomes large, so that it is undesirable. Otherwise, the paraxial focal length of the aspherical lens component Gb becomes small, in other words, the paraxial refractive power becomes large. In this case, coma, curvature of field and astigmatism in the wide-angle end state, and coma and spherical aberration in the telephoto end state become worse, so that it is undesirable.

In order to secure the effect of the present application, it is preferable to set the upper limit of conditional expression (6) to 0.625 or less. In order to secure the effect of the present application, it is preferable to set the upper limit of conditional expression (6) to 0.600 or less. In order to secure the effect of the present application, it is preferable to set the upper limit of conditional expression (6) to 0.550 or less, so that aberrations such as coma can be excellently corrected. In order to further secure the effect of the present application, it is greatly preferable to set the upper limit of conditional expression (6) to 0.300 or less. In order to further secure the effect of the present application, it is greatly preferable to set the upper limit of conditional expression (6) to 0.200 or less. In order to fully secure the effect of the present application, it is most preferable to set the upper limit of conditional expression (6) to 0.100 or less.

On the other hand, when the ratio $(-Fa)/|Fb|$ falls below the lower limit of conditional expression (6), the aspherical lens component Ga has positive refractive power. In this case, an incident height of oblique ray becomes large, so that the whole of the front lens group becomes large. Moreover, coma and curvature of field in the wide-angle end state, and coma, curvature of field and astigmatism in the telephoto end state become worse, so that it is undesirable.

In order to secure the effect of the present application, it is preferable to set the lower limit of conditional expression (6) to 0.005 or more, so that various aberrations can be excellently corrected. In order to fully secure the effect of the present application, it is most preferable to set the lower limit of conditional expression (6) to 0.010 or more.

In a zoom lens according to the second embodiment of the present application, the following conditional expression (7) is preferably satisfied:

$$0.50<(-Fn)/(Fw\cdot Ft)^{1/2}<1.30 \qquad (7)$$

where Fn denotes a focal length of the front lens group upon focusing on an infinitely distant object, Fw denotes a focal length of the zoom lens in the wide-angle end state upon focusing on an infinitely distant object, and Ft denotes a focal length of the zoom lens in the telephoto end state upon focusing on an infinitely distant object.

Conditional expression (7) defines the focal length of the front lens group. When the ratio $(-Fn)/(Fw\cdot Ft)^{1/2}$ is 1.00, it means that the total lens length of the zoom lens in the wide-angle end state coincides with the total lens length of the zoom lens in the telephoto end state. When the ratio $(-Fn)/(Fw\cdot Ft)^{1/2}$ is smaller than 1.00, it means that the total lens length becomes maximum in the telephoto end state. When the ratio $(-Fn)/(Fw\cdot Ft)^{1/2}$ is larger than 1.00, it means that the total lens length becomes maximum in the wide-angle end state.

When the ratio $(-Fn)/(Fw\cdot Ft)^{1/2}$ is equal to or exceeds the upper limit of conditional expression (7), an absolute value of the focal length of the front lens group becomes large, in other words, negative refractive power of the front lens group becomes small. Moreover, as described above, the total lens length of the zoom lens according to the second embodiment becomes maximum in the wide-angle end state. In this case, an incident height of oblique ray in the wide-angle end state becomes large, so that the diameter of the front lens group and the filter diameter become large, and light amount around a corner becomes small, so that it is undesirable. Moreover, in the case of aberration correction, variation in coma upon zooming becomes large, so that it is undesirable.

In order to secure the effect of the present application, it is preferable to set the upper limit of conditional expression (7) to 1.20 or less. In order to secure the effect of the present application, it is preferable to set the upper limit of conditional expression (7) to 1.10 or less, so that various aberrations can be excellently corrected. In order to further secure the effect of the present application, it is greatly preferable to set the upper limit of conditional expression (7) to 1.05 or less. In order to fully secure the effect of the present application, it is most preferable to set the upper limit of conditional expression (7) to 1.02 or less.

On the other hand, when the ratio $(-Fn)/(Fw\cdot Ft)^{1/2}$ is equal to or falls below the lower limit of conditional expression (7), the absolute value of the focal length of the front lens group becomes small, in other words, negative refractive power becomes large. Moreover, as described above, the total lens length of the zoom lens according to the second embodiment becomes maximum in the telephoto end state. In this case, variations in distortion, coma and curvature of field upon zooming, and spherical aberration in the telephoto end state become difficult to be corrected.

In order to secure the effect of the present application, it is preferable to set the lower limit of conditional expression (7) to 0.60 or more. In order to further secure the effect of the present application, it is greatly preferable to set the lower limit of conditional expression (7) to 0.70 or more. In order to fully secure the effect of the present application, it is most preferable to set the lower limit of conditional expression (7) to 0.80 or more.

In a zoom lens according to the second embodiment of the present application, the following conditional expression (8) is preferably satisfied:

$$1.50<Fp/Fw<3.00 \qquad (8)$$

where Fp denotes a focal length of the rear lens group upon focusing on an infinitely distant object, and Fw denotes a focal length of the zoom lens in the wide-angle end state upon focusing on an infinitely distant object.

Conditional expression (8) defines the magnitude of the focal length of the rear lens group, in other words, refractive power of the rear lens group upon focusing on an infinitely distant object.

When the ratio Fp/Fw is equal to or exceeds the upper limit of conditional expression (8), the focal length of the rear lens group becomes large, in other words, refractive power of the rear lens group becomes small. In this case, a moving amount of the rear lens group upon zooming becomes large, so that the total lens length becomes large. Moreover, variation in curvature of field upon zooming becomes large, so that it is undesirable.

In order to secure the effect of the present application, it is preferable to set the upper limit of conditional expression (8) to 2.90 or less. In order to secure the effect of the present application, it is preferable to set the upper limit of conditional expression (8) to 2.80 or less. In order to further secure the effect of the present application, it is greatly preferable to set the upper limit of conditional expression (8) to 2.70 or less. In order to fully secure the effect of the present application, it is most preferable to set the upper limit of conditional expression (8) to 2.45 or less.

On the other hand, when the ratio Fp/Fw is equal to or falls below the lower limit of conditional expression (8), the focal length of the rear lens group becomes small, in other words, refractive power of the rear lens group becomes large. In this case, spherical aberration and coma become worse, and variations in spherical aberration and coma upon zooming become large, so that it is undesirable.

In order to secure the effect of the present application, it is preferable to set the lower limit of conditional expression (8) to 1.70 or more. In order to secure the effect of the present application, it is preferable to set the lower limit of conditional expression (8) to 1.80 or more, so that various aberrations can be excellently corrected. In order to further secure the effect of the present application, it is greatly preferable to set the lower limit of conditional expression (8) to 1.90 or more. In order to fully secure the effect of the present application, it is most preferable to set the lower limit of conditional expression (8) to 2.00 or more.

In a zoom lens according to the second embodiment of the present application, it is preferable that the front lens group includes the aspherical lens component Ga, and the aspherical lens component Gb, and further includes at least a cemented negative lens component Gc constructed by a negative lens cemented with a positive lens. With this cemented negative lens component Gc, it becomes possible to excellently correct aberrations, in particular, coma, lateral chromatic aberration and curvature of field.

In a zoom lens according to the second embodiment of the present application, the following conditional expression (9) is preferably satisfied:

$$0.50<(-Fc)/Fw<5.00 \quad (9)$$

where Fc denotes a focal length of the cemented negative lens component Gc in the front lens group, and Fw denotes a focal length of the zoom lens in the wide-angle end state upon focusing on an infinitely distant object.

Conditional expression (9) defines the magnitude of the focal length of the cemented negative lens Gc, in other words, refractive power of the cemented negative lens Gc in the front lens group.

When the ratio (−Fc)/Fw is equal to or exceeds the upper limit of conditional expression (9), an absolute value of the focal length of the cemented negative lens Gc becomes large, in other words, negative refractive power of the cemented negative lens Gc becomes small. Accordingly, sufficiently corrected lateral chromatic aberration and curvature of field become worse.

In order to secure the effect of the present application, it is preferable to set the upper limit of conditional expression (9) to 4.00 or less. In order to secure the effect of the present application, it is preferable to set the upper limit of conditional expression (9) to 3.00 or less, so that various aberrations can be excellently corrected. In order to further secure the effect of the present application, it is greatly preferable to set the upper limit of conditional expression (9) to 2.80 or less. In order to fully secure the effect of the present application, it is most preferable to set the upper limit of conditional expression (9) to 2.50 or less.

On the other hand, when the ratio (−Fc)/Fw is equal to or falls below the lower limit of conditional expression (9), the absolute value of the focal length of the cemented negative lens Gc becomes small, in other words, negative refractive power of the cemented negative lens Gc becomes large. Accordingly, variation in lateral chromatic aberration with respect to the angle of view and residual error of curvature of field with respect to each wavelength are generated, so that it is undesirable.

In order to secure the effect of the present application, it is preferable to set the lower limit of conditional expression (9) to 0.60 or more. In order to secure the effect of the present application, it is preferable to set the lower limit of conditional expression (9) to 0.80 or more, so that various aberrations can be excellently corrected. In order to further secure the effect of the present application, it is greatly preferable to set the lower limit of conditional expression (9) to 1.00 or more. In order to fully secure the effect of the present application, it is most preferable to set the lower limit of conditional expression (9) to 1.30 or more.

In a zoom lens according to the second embodiment of the present application, it is preferable that the front lens group includes the aspherical lens component Ga, and the aspherical lens component Gb, and further includes the cemented negative lens component Gc constructed by a negative lens cemented with a positive lens, and a positive lens disposed to the image side of the cemented negative lens component Gc. With this configuration, it becomes possible to excellently correct, in particular, distortion, curvature of field and coma in the wide-angle end state, and coma and spherical aberration in the telephoto end state.

In a zoom lens according to the second embodiment of the present application, the following conditional expression (10) is preferably satisfied:

$$0.00<Ncn-Ncp \quad (10)$$

where Ncn denotes a refractive index at d-line (wavelength λ=587.6 nm) of the negative lens in the cemented negative lens component Gc, and Ncp denotes a refractive index at d-line (wavelength λ=587.6 nm) of the positive lens in the cemented negative lens component Gc.

Conditional expression (10) defines difference in refractive indices between the negative lens and the positive lens in the cemented negative lens component Gc. In a zoom lens according to the second embodiment of the present application, the fact that the refractive index of the negative lens is larger than the refractive index of the positive lens in the cemented negative lens component Gc is effective for correcting aberrations.

When the value Ncn−Ncp is equal to or falls below the lower limit of conditional expression (10), the refractive index of the negative lens becomes relatively small. Accordingly, it becomes difficult to make optimum setting of Petzval sum, and curvature of field and astigmatism become worse, so that it is undesirable.

In order to secure the effect of the present application, it is preferable to set the lower limit of conditional expression (10) to 0.05 or more. In order to secure the effect of the present application, it is preferable to set the lower limit of conditional expression (10) to 0.10 or more, so that various aberrations can be excellently corrected. In order to further secure the effect of the present application, it is greatly preferable to set the lower limit of conditional expression (10) to 0.15 or more. In order to fully secure the effect of the present application, it is most preferable to set the lower limit of conditional expression (10) to 0.20 or more.

In a zoom lens according to the second embodiment of the present application, the aspherical lens component Ga in the front lens group preferably has a shape that the radius of curvature of the image side lens surface becomes large toward the periphery, and the radius of curvature of the object side lens surface becomes small toward the periphery. With this configuration, it becomes possible to excellently correct, in particular, distortion, curvature of field and coma in the wide-angle end state.

In a zoom lens according to the second embodiment of the present application, the aspherical lens component Gb in the front lens group preferably composed of a compound lens formed by a glass material and a resin material. With this configuration, it becomes possible to manufacture the aspherical lens component Gb at a low cost, and the glass material can be freely selected. As a result, better optical performance can be accomplished, so that it is desirable.

An imaging apparatus according to the second embodiment of the present application is characterized by including the zoom lens described above. With this configuration, it becomes possible to realize a downsized imaging apparatus having a wide angle of view, excellent optical performance with excellently correcting various aberrations.

A method for manufacturing a zoom lens according to the second embodiment of the present application is a method for manufacturing a zoom lens including, in order from an object side, a front lens group having negative refractive power, and a rear lens group having positive refractive power, the method comprising steps of:

disposing, in order from the object side, an aspherical lens component Ga that has negative refractive power and the negative refractive power becomes weaker toward periphery, and an aspherical lens component Gb that has positive refractive power and the positive refractive power varies to negative toward periphery, or has negative refractive power and the negative refractive power becomes strong toward periphery into the front lens group Gn;

disposing the aspherical lens component Ga and the aspherical lens component Gb with satisfying conditional expression (6):

$$0.000 \leq (-Fa)/|Fb| < 0.650 \quad (6)$$

where Fa denotes a focal length of the aspherical lens component Ga in the front lens group, and Fb denotes a focal length of the aspherical lens component Gb in the front lens group; and making an arrangement so as to carry out zooming by varying a distance between the front lens group Gn and the rear lens group Gp.

With the method for manufacturing a zoom lens according to the second embodiment of the present application, it becomes possible to manufacture a downsized zoom lens having a wide angle of view and excellent optical performance with excellently correcting various aberrations.

Then, a zoom lens, an imaging apparatus equipped therewith, and a method for manufacturing the zoom lens seen from another point of view according to the second embodiment of the present application are explained below.

A zoom lens seen from another point of view according to the second embodiment of the present application includes, in order from an object side, a front lens group having negative refractive power, and a rear lens group having positive refractive power. The front lens group includes, in order from the object side, an aspherical lens component Ga that has negative refractive power and a shape that the negative refractive power becomes smaller toward the periphery, and an aspherical lens component Gb that has positive refractive power and a shape that the positive refractive power turns to negative refractive power toward the periphery or has negative refractive power and a shape that the negative refractive becomes stronger toward the periphery. A distance between the front lens group and the rear lens group is varied, thereby carrying out zooming. The following conditional expression (6) is satisfied:

$$0.000 \leq (-Fa)/|Fb| < 0.650 \quad (6)$$

where Fa denotes a focal length of the aspherical lens component Ga in the front lens group, and Fb denotes a focal length of the aspherical lens component Gb in the front lens group.

With constructing in this manner, it becomes possible to compose a downsized zoom lens having a wide angle of view and excellent optical performance with correcting various aberrations and suppressing ghost images and flare.

In a zoom lens seen from another point of view according to the second embodiment of the present application, at least one optical surface in the front lens group is applied with an antireflection coating, and the antireflection coating includes at least one layer that is formed by a wet process. With this configuration, a zoom lens seen from another point of view according to the second embodiment of the present application makes it possible to suppress ghost images and flare generated by the light rays from the object reflected from the optical surfaces, thereby realizing excellent optical performance.

Moreover, in a zoom lens seen from another point of view according to the second embodiment of the present application, the antireflection coating is a multilayer film, and the layer formed by the wet process is preferably the outermost layer among the layers composing the multilayer coating. With this configuration, since difference in refractive index with respect to the air can be small, reflection of light can be small, so that ghost images and flare can further be suppressed.

In a zoom lens seen from another point of view according to the second embodiment of the present application, when a refractive index at d-line of the layer formed by the wet process is denoted by nd, the refractive index nd is preferably 1.30 or less. With this configuration, since difference in refractive index with respect to the air can be small, reflection of light can be small, so that ghost images and flare can further be suppressed.

Moreover, in a zoom lens seen from another point of view according to the second embodiment of the present application, the optical surface in the front lens group on which the antireflection coating is formed is preferably a concave surface seen from an aperture stop. Since ghost images are liable to be generated on a concave surface seen from the aperture stop among optical surfaces in the front lens group, with applying the antireflection coating on such an optical surface, ghost images and flare can effectively be suppressed.

In a zoom lens seen from another point of view according to the second embodiment, it is desirable that, among the front lens group, the concave surface as viewed from the aperture stop on which the antireflection coating is applied is an image side lens surface. Since the concave surface as viewed from the aperture stop among optical surfaces in the front lens group tends to generate ghost images, that concave optical surface is formed with the antireflection coating, thereby enabling ghost images and flare to be effectively reduced.

In a zoom lens seen from another point of view according to the second embodiment, it is desirable that the image side lens surface on which the antireflection coating is applied is the most object side lens in the front lens group. Since the image side concave surface of the most object side lens in the front lens group as viewed from the aperture stop tends to generate ghost images, that optical surface is formed with the antireflection coating, thereby enabling ghost images and flare to be effectively reduced.

In a zoom lens seen from another point of view according to the second embodiment, it is desirable that, among the front lens group, the concave surface on which the antireflection coating is applied as viewed from the aperture stop is an object side lens surface. Since the object side concave surface as viewed from the aperture stop among optical surfaces in the front lens group tends to generate ghost images, that optical surface is formed with the antireflection coating, thereby enabling ghost images and flare to be effectively reduced.

In a zoom lens seen from another point of view according to the second embodiment, among optical surfaces in the front lens group, it is desirable that the optical surface on which the antireflection coating is applied is a concave surface as viewed from the object. With this configuration, since the concave surface as viewed from the object among optical surfaces in the front lens group tends to generate ghost images, that optical surface is formed with the antireflection coating, thereby enabling ghost images and flare to be effectively reduced.

In a zoom lens seen from another point of view according to the second embodiment, among optical surfaces in the front lens group, it is desirable that the optical surface having the concave shape as viewed from the object on which the antireflection coating is applied is the object side lens surface of the image side third lens from the most object side of the front lens group. Since the object side lens surface of the image side third lens from the most object side of the front lens group tends to generate ghost images, that optical surface is formed with the antireflection coating, thereby enabling ghost images and flare to be effectively reduced.

In a zoom lens seen from another point of view according to the second embodiment, among optical surfaces in the front lens group, it is desirable that the optical surfaces on which the antireflection coating is applied are the image side lens surface of the most object side lens which is a concave surface seen from the aperture stop, and the object side lens surface of the image side third lens from the most object side of the front lens group which is a concave surface seen from the object. Among optical surfaces in the front lens group, since the image side lens surface of the most object side lens which is a concave surface seen from the aperture stop, and the object side lens surface of the image side third lens from the most object side of the front lens group which is a concave surface seen from the object tend to generate ghost images, those optical surfaces are formed with the antireflection coating, thereby enabling ghost images and flare to be effectively reduced.

In a zoom lens seen from another point of view according to the second embodiment, the antireflection coating may also be formed by a dry process etc without being limited to the wet process. On this occasion, it is preferable that the antireflection coating contains at least one layer of which the refractive index is equal to 1.30 or less. Thus, the same effects as in the case of using the wet process can be obtained by forming the antireflection coating based on the dry process etc. Note that at this time the layer of which the refractive index is equal to 1.30 or less is preferably the layer of the uppermost surface of the layers composing the multi-layered film.

Then, characteristic of a zoom lens seen from another point of view according to the second embodiment of the present application will be explained with reference to each conditional expression.

Conditional explanation (6) defines paraxial power ratio between the aspherical lens component Ga and the aspherical lens component Gb in the front lens group. However, conditional expression (6) has already been explained above, so that duplicated explanations are omitted.

In a zoom lens seen from another point of view according to the second embodiment of the present application, the following conditional expression (7) is preferably satisfied:

$$0.50<(-Fn)/(Fw \cdot Ft)^{1/2}<1.30 \quad (7)$$

where Fn denotes a focal length of the front lens group upon focusing on an infinitely distant object, Fw denotes a focal length of the zoom lens in the wide-angle end state, and Ft denotes a focal length of the zoom lens in the telephoto end state.

Conditional expression (7) defines the focal length of the front lens group. However, conditional expression (7) has already been explained above, so that duplicated explanations are omitted.

In a zoom lens seen from another point of view according to the second embodiment of the present application, the following conditional expression (8) is preferably satisfied:

$$1.50<Fp/Fw<3.00 \quad (8)$$

where Fp denotes a focal length of the rear lens group upon focusing on an infinitely distant object, and Fw denotes a focal length of the zoom lens in the wide-angle end state upon focusing on an infinitely distant object.

Conditional expression (8) defines the magnitude of the focal length of the rear lens group, in other words, refractive power of the rear lens group upon focusing on an infinitely distant object. However, conditional expression (8) has already been explained above, so that duplicated explanations are omitted.

In a zoom lens seen from another point of view according to the second embodiment of the present application, it is preferable that the front lens group further includes at least a cemented negative lens component Gc constructed by a negative lens cemented with a positive lens. With this cemented negative lens component Gc, it becomes possible to excellently correct aberrations, in particular, coma, lateral chromatic aberration and curvature of field.

In a zoom lens seen from another point of view according to the second embodiment of the present application, the following conditional expression (9) is preferably satisfied:

$$0.50<(-Fc)/Fw<5.00 \quad (9)$$

where Fc denotes a focal length of the cemented negative lens component Gc in the front lens group, and Fw denotes a focal length of the zoom lens in the wide-angle end state upon focusing on an infinitely distant object.

Conditional expression (9) defines the magnitude of the focal length of the cemented negative lens Gc, in other words, refractive power of the cemented negative lens Gc in the front lens group. However, conditional expression (9) has already been explained above, so that duplicated explanations are omitted.

In a zoom lens seen from another point of view according to the second embodiment of the present application, it is preferable that the front lens group further includes the cemented negative lens component Gc constructed by a negative lens cemented with a positive lens, and a positive lens disposed to the image side of the cemented negative lens component Gc. With this configuration, it becomes possible to excellently correct, in particular, distortion, curvature of field and coma in the wide-angle end state, and coma and spherical aberration in the telephoto end state.

In a zoom lens seen from another point of view according to the second embodiment of the present application, the following conditional expression (10) is preferably satisfied:

$$0.00<Ncn-Ncp \quad (10)$$

where Ncn denotes a refractive index at d-line (wavelength λ=587.6 nm) of the negative lens in the cemented negative lens component Gc, and Ncp denotes a refractive index at d-line (wavelength λ=587.6 nm) of the positive lens in the cemented negative lens component Gc.

Conditional expression (10) defines difference in refractive indices between the negative lens and the positive lens in the cemented negative lens component Gc. However, conditional expression (10) has already been explained above, so that duplicated explanations are omitted.

In a zoom lens seen from another point of view according to the second embodiment of the present application, the aspherical lens component Ga in the front lens group preferably has a shape that the radius of curvature of the image side lens surface becomes large toward the periphery, and the radius of curvature of the object side lens surface becomes small toward the periphery. With this configuration, it becomes possible to excellently correct, in particular, distortion, curvature of field and coma in the wide-angle end state.

In a zoom lens seen from another point of view according to the second embodiment of the present application, the aspherical lens component Gb in the front lens group is preferably composed of a compound lens formed by a glass material and a resin material. With this configuration, it becomes possible to manufacture the aspherical lens component Gb at a low cost, and the glass material can be freely selected. As a result, better optical performance can be accomplished, so that it is desirable.

An imaging apparatus seen from another point of view according to the second embodiment of the present application is characterized by including the zoom lens described above. With this configuration, it becomes possible to realize a downsized imaging apparatus having a wide angle of view, excellent optical performance with excellently correcting various aberrations.

A method for manufacturing a zoom lens seen from another point of view according to the second embodiment of the present application is a method for manufacturing a zoom lens including, in order from an object side, a front lens group having negative refractive power, and a rear lens group having positive refractive power, the method comprising steps of:

disposing, in order from the object side, an aspherical lens component Ga that has negative refractive power and the negative refractive power becomes weaker toward periphery, and an aspherical lens component Gb that has positive refractive power and the positive refractive power varies to negative toward periphery, or has negative refractive power and the negative refractive power becomes strong toward periphery into the front lens group Gn;

disposing the aspherical lens component Ga and the aspherical lens component Gb with satisfying conditional expression (6):

$$0.000 \leq (-Fa)/|Fb| < 0.650 \quad (6)$$

where Fa denotes a focal length of the aspherical lens component Ga in the front lens group, and Fb denotes a focal length of the aspherical lens component Gb in the front lens group;

making an arrangement so as to carry out zooming by varying a distance between the front lens group Gn and the rear lens group Gp; and applying an antireflection coating on at least one optical surface in the front lens group, and including at least one layer that is formed by a wet process in the antireflection coating.

With the method for manufacturing a zoom lens seen from another point of view according to the second embodiment of the present application, it becomes possible to manufacture a downsized zoom lens having a wide angle of view and excellent optical performance with excellently correcting various aberrations.

Then, a zoom lens according to each Example of the second embodiment is explained below with reference to accompanying drawings.

Example 6

FIG. 12 is a sectional view showing a lens configuration of a zoom lens according to Example 6 of the second embodiment of the present application.

The zoom lens according to Example 6 of the second embodiment is composed of, in order from the object side, a front lens group Gn having negative refractive power, and a rear lens group Gp having positive refractive power.

The front lens group Gn is composed of, in order from the object side, an aspherical lens component Ga, an aspherical lens component Gb, a cemented negative lens component Gc and a double convex positive lens L15.

The aspherical lens component Ga is composed of a double aspherical meniscus lens L11 having negative refractive power and a concave surface facing the image plane I side. The negative refractive power becomes weaker toward periphery.

The aspherical lens component Gb is composed of a compound type aspherical positive lens L12 formed by combination of a glass material and a resin material having a shape that positive refractive power formed by combination turns to negative refractive power from the center to the periphery.

The cemented negative lens component Gc is composed of a cemented negative lens constructed by, in order from the object side, a double concave negative lens L13 cemented with a positive meniscus lens L14 having a convex surface facing the object side.

The rear lens group Gp is composed of, in order from the object side, a cemented positive lens constructed by a negative meniscus lens L21 having a convex surface facing the object side cemented with a double convex positive lens L22, an aperture stop S, a double convex positive lens L23, a negative meniscus lens L24 having a concave surface facing the object side, a cemented positive lens constructed by a double concave negative lens L25 cemented with a double convex positive lens L26, and a cemented positive lens constructed by a positive meniscus lens L27 having a convex surface facing the image plane I side cemented with a negative meniscus lens L28 having a convex surface facing the image plane I side.

In the zoom lens seen from another point of view according to Example 6 of the second embodiment, an antireflection coating explained above is applied to each of the image plane I side lens surface of the negative meniscus lens L11 and the object side lens surface of the negative lens L13 in the front lens group Gn, thereby suppressing reflection light from each lens surface and effectively suppressing ghost images and flare.

In the zoom lens according to Example 6 of the second embodiment, a distance between the front lens group Gn and the rear lens group Gp is varied, thereby carrying out zooming from the wide-angle end state to the telephoto end state. Each arrow in FIG. 12 indicates moving trajectory of each of the front lens group Gn and the rear lens group Gp upon zooming from the wide-angle end state to the telephoto end state.

Various values associated with Example 6 are listed in Table 6.

TABLE 6

| (Specifications) zoom ratio = 1.77 | | | |
|---|---|---|---|
| | W | M | T |
| F = | 16.48 | 24.00 | 29.10 |
| FNO = | 4.41 | 5.29 | 5.88 |
| ω = | 53.27 | 41.72 | 36.32° |
| Y = | 21.60 | 21.60 | 21.60 |
| TL = | 138.15 | 135.51 | 138.24 |

TABLE 6-continued

| | | | |
|---|---|---|---|
| Σd = | 99.84 | 84.47 | 78.57 |
| BF = | 38.31 | 51.04 | 59.67 |

(Lens Data)

| i | r | d | nd | vd |
|---|---|---|---|---|
| *1) | 120.0323 | 3.0000 | 1.744430 | 49.53 |
| *2) | 14.8111 | 11.0000 | | |
| 3) | 320.0965 | 3.0000 | 1.516800 | 64.12 |
| 4) | 70.0000 | 1.0000 | 1.553890 | 38.09 |
| *5) | −993.8663 | 4.5000 | | |
| 6) | −56.5907 | 2.0000 | 1.816000 | 46.63 |
| 7) | 17.0196 | 7.0000 | 1.603420 | 38.02 |
| 8) | 73.8459 | 0.1000 | | |
| 9) | 32.4760 | 5.0000 | 1.717360 | 29.52 |
| 10) | −157.9244 | (d10) | | |
| 11) | 23.8096 | 1.0000 | 1.795000 | 45.30 |
| 12) | 15.6593 | 3.0000 | 1.497820 | 82.56 |
| 13) | −1090.6220 | 6.0000 | | |
| 14) | ∞ | 0.7000 | Aperture Stop S | |
| 15) | 26.3980 | 2.5000 | 1.497820 | 82.56 |
| 16) | −79.3224 | 4.6000 | | |
| 17) | −39.5467 | 8.0000 | 1.744000 | 44.79 |
| 18) | −162.0229 | 2.0000 | | |
| 19) | −92.3426 | 1.0000 | 1.755000 | 52.29 |
| 20) | 20.8016 | 5.0000 | 1.518230 | 58.89 |
| 21) | −21.0542 | 0.1000 | | |
| 22) | −344.4872 | 5.5000 | 1.497820 | 82.56 |
| 23) | −13.5094 | 1.0000 | 1.834810 | 42.72 |
| 24) | −31.7192 | BF | | |

(Aspherical Surface Data)

Surface Number = 1

κ = 12.7063
A4 = 2.52869E−07
A6 = 5.51300E−10
A8 = 4.77913E−13
A10 = −3.07832E−16
A12 = −0.49549E−19

Surface Number = 2

κ = −0.0947
A4 = −6.70196E−06
A6 = −1.78783E−08
A8 = −5.15142E−12
A10 = −4.83366E−14
A12 = 0.21367E−15

Surface Number = 5

κ = 0.00000
A4 = 2.50710E−05
A6 = 2.09871E−08
A8 = 1.63612E−10
A10 = −1.20936E−13
A12 = −0.17594E−14

(Variable Distances)

| | W | M | T |
|---|---|---|---|
| F = | 16.48000 | 24.00000 | 29.10000 |
| d0 = | ∞ | ∞ | ∞ |
| d10 = | 22.83854 | 7.47382 | 1.57260 |
| BF = | 38.31325 | 51.03766 | 59.66724 |

(Lens Group Data)

| Group | I | Focal Length |
|---|---|---|
| Gn | 1 | −21.85385 |
| Gp | 11 | 36.97834 |

(Values for Conditional Expressions)

(6) (−Fa)/|Fb| = 0.0620
(7) (−Fn)/(Fw · Ft)$^{1/2}$ = 0.998
(8) Fp/Fw = 2.243

TABLE 6-continued (9) (−Fc)/Fw = 1.636
(10) Ncn − Ncp = 0.2126

Figure 13A:
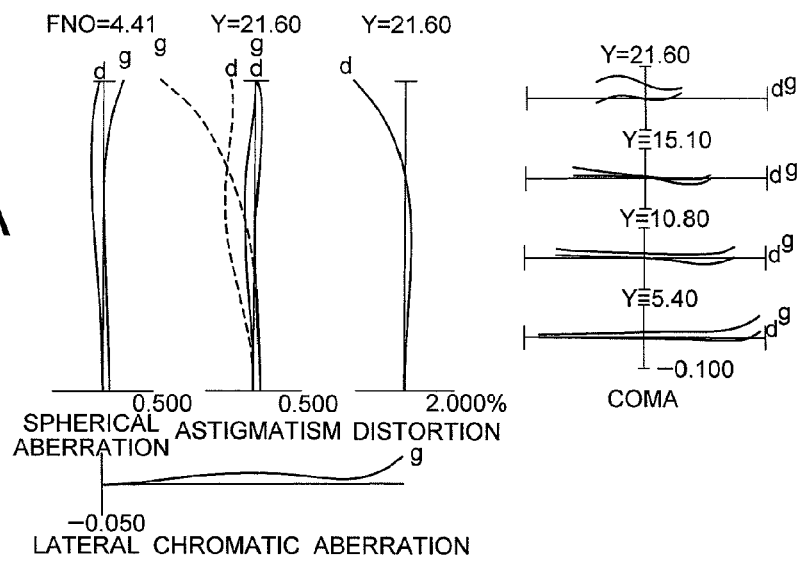
Figure 13B:
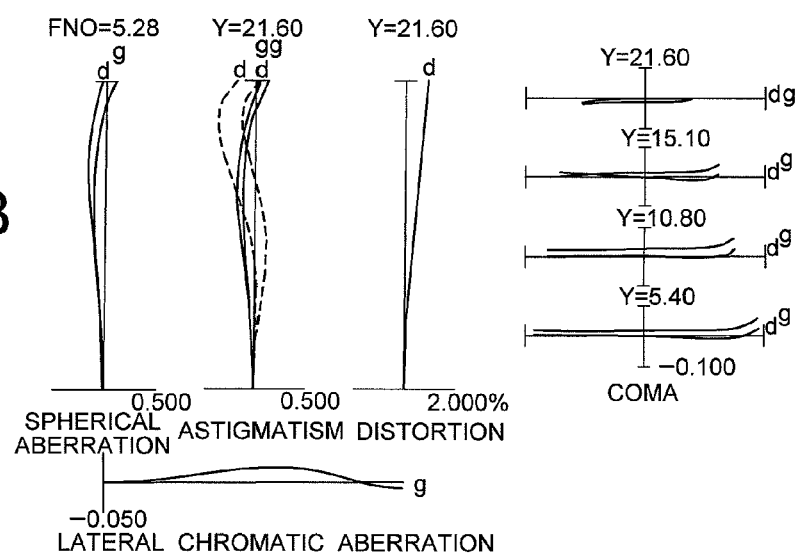
Figure 13C:
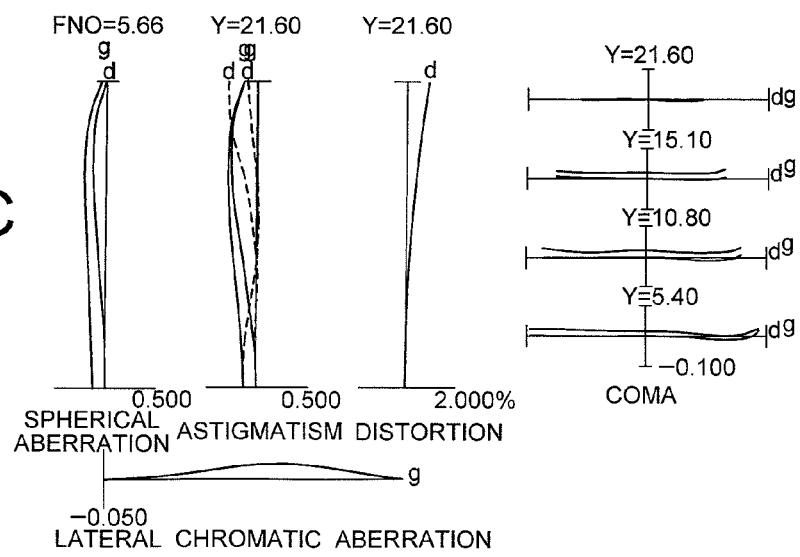

FIGS. 13A, 13B and 13C are graphs showing various aberrations of the zoom lens according to Example 6 of the second embodiment upon focusing on an infinitely distant object, in which FIG. 13A is a wide-angle end state, FIG. 13B is an intermediate focal length state, and FIG. 13C is a telephoto end state.

As is apparent from various graphs, the zoom lens according to Example 6 of the second embodiment shows superb optical performance as a result of good corrections to various aberrations including spherical aberration, curvature of field, astigmatism and coma.

An example of generation of ghost images in the zoom lens seen from another point of view according to Example 6 of the second embodiment is explained with reference to FIG. 14.

As shown in FIG. 14, when light rays BM from an object are incident on the zoom lens, the rays are reflected by the object side lens surface (a first-ghost-generating surface whose surface number is 6) of the negative lens L13, and the reflected light rays are reflected again by the image plane I side lens surface (a second-ghost-generating surface whose surface number is 2) of the negative meniscus lens L11 to reach the image plane I with generating ghost images. Incidentally, the first-ghost-generating surface 6 is a concave surface seen from the object side, and the second—ghost-generating surface 2 is a concave surface seen from the aperture stop S. With forming an antireflection coating corresponding to a broad wavelength range, it becomes possible to effectively suppress ghost images.

Example 7

FIG. 15 is a sectional view showing a lens configuration of a zoom lens according to Example 7 of the second embodiment of the present application.

The zoom lens according to Example 7 of the second embodiment is composed of, in order from the object side, a front lens group Gn having negative refractive power, and a rear lens group Gp having positive refractive power.

The front lens group Gn is composed of, in order from the object side, an aspherical lens component Ga, an aspherical lens component Gb, a cemented negative lens component Gc and a double convex positive lens L15.

The aspherical lens component Ga is composed of a double aspherical meniscus lens L11 having negative refractive power and a shape that the negative refractive power becomes weaker toward periphery and a concave surface faces the image plane I side.

The aspherical lens component Gb is composed of a compound type aspherical positive lens L12 formed by combination of a glass material and a resin material having a shape that positive refractive power formed by combination turns to negative refractive power from the center to the periphery.

The cemented negative lens component Gc is composed of a cemented negative lens constructed by, in order from the object side, a double concave negative lens L13 cemented with a positive meniscus lens L14 having a convex surface facing the object side.

The rear lens group Gp is composed of, in order from the object side, a cemented positive lens constructed by a negative meniscus lens L21 having a convex surface facing the object side cemented with a double convex positive lens L22, an aperture stop S, a double convex positive lens L23, a double concave negative lens L24, a cemented positive lens constructed by a double concave negative lens L25 cemented with a double convex positive lens L26, and a cemented negative lens constructed by a double convex positive lens L27 cemented with a negative meniscus lens L28 having a convex surface facing the image plane I side.

In the zoom lens seen from another point of view according to Example 7 of the second embodiment, an antireflection coating explained above is applied to each of the image plane I side lens surface of the negative meniscus lens L11 and the object side lens surface of the negative lens L13 in the front lens group Gn, thereby suppressing reflection light from each lens surface and effectively suppressing ghost images and flare.

In the zoom lens according to Example 7 of the second embodiment, a distance between the front lens group Gn and the rear lens group Gp is varied, thereby carrying out zooming from the wide-angle end state to the telephoto end state. Each arrow in FIG. 15 indicates moving trajectory of each of the front lens group Gn and the rear lens group Gp upon zooming from the wide-angle end state to the telephoto end state.

Various values associated with Example 7 are listed in Table 7.

TABLE 7

(Specifications)
zoom ratio = 1.77

| | W | M | T |
|---|---|---|---|
| F = | 16.48 | 24.00 | 29.10 |
| FNO = | 4.40 | 5.27 | 5.87 |
| ω = | 53.20 | 41.29 | 35.96° |
| Y = | 21.60 | 21.60 | 21.60 |
| TL = | 137.91 | 135.13 | 137.77 |
| Σd = | 99.61 | 84.25 | 78.35 |
| BF = | 38.29 | 50.88 | 59.41 |

(Lens Data)

| i | r | d | nd | νd |
|---|---|---|---|---|
| *1) | 82.7358 | 3.0000 | 1.744429 | 49.52 |
| *2) | 14.1379 | 9.0000 | | |
| 3) | 75.5790 | 3.0000 | 1.516800 | 64.12 |
| 4) | 40.0000 | 0.5000 | 1.553890 | 38.09 |
| *5) | 83.8029 | 6.0000 | | |
| 6) | −77.5324 | 2.0000 | 1.816000 | 46.63 |
| 7) | 17.4612 | 6.5000 | 1.603420 | 38.02 |
| 8) | 70.9358 | 1.0500 | | |
| 9) | 34.6649 | 5.0000 | 1.717360 | 29.52 |
| 10) | −214.0325 | (d10) | | |
| 11) | 27.4177 | 1.0000 | 1.788000 | 47.38 |
| 12) | 15.1887 | 3.0000 | 1.497820 | 82.56 |
| 13) | −218.1559 | 6.0000 | | |
| 14) | ∞ | 0.7000 | Aperture Stop S | |
| 15) | 23.2434 | 2.8000 | 1.487490 | 70.45 |
| 16) | −45.2239 | 4.6270 | | |
| 17) | −39.0084 | 8.0000 | 1.755000 | 52.29 |
| 18) | 114.1192 | 2.0000 | | |
| 19) | −94.3568 | 1.0000 | 1.755000 | 52.29 |
| 20) | 26.8051 | 5.0000 | 1.518230 | 58.89 |
| 21) | −18.1493 | 0.1000 | | |
| 22) | 471.7364 | 5.5000 | 1.497820 | 82.56 |
| 23) | −12.7396 | 1.0000 | 1.834810 | 42.72 |
| 24) | −33.4851 | BF | | |

(Aspherical Surface Data)

Surface Number = 1

κ = 4.0103
A4 = 1.16908E−06
A6 = 4.58987E−10

TABLE 7-continued

A8 = 4.52741E−14
A10 = −7.38248E−16
A12 = 0.0000
Surface Number = 2

κ = −0.0638
A4 = −7.94597E−07
A6 = −5.98169E−09
A8 = 2.11786E−11
A10 = −5.51429E−14
A12 = 0.81892E−16
Surface Number = 5

κ = −5.6064
A4 = 2.51241E−05
A6 = 2.20702E−08
A8 = 5.50134E−11
A10 = −1.42359E−13
A12 = −0.72010E−15

(Variable Distances)

| | W | M | T |
|---|---|---|---|
| F = | 16.48028 | 24.00000 | 29.10000 |
| d0 = | ∞ | ∞ | ∞ |
| d10 = | 22.83788 | 7.47624 | 1.57589 |
| BF = | 38.29222 | 50.87810 | 59.41406 |

(Lens Group Data)

| Group | I | Focal Length |
|---|---|---|
| Gn | 1 | −21.97176 |
| Gp | 11 | 36.77451 |

(Values for Conditional Expressions)

(6) (−Fa)/|Fb| = 0.0292
(7) (−Fn)/(Fw · Ft)$^{1/2}$ = 1.003
(8) Fp/Fw = 2.232
(9) (−Fc)/Fw = 1.883
(10) Ncn − Ncp = 0.2126

Figure 16A:
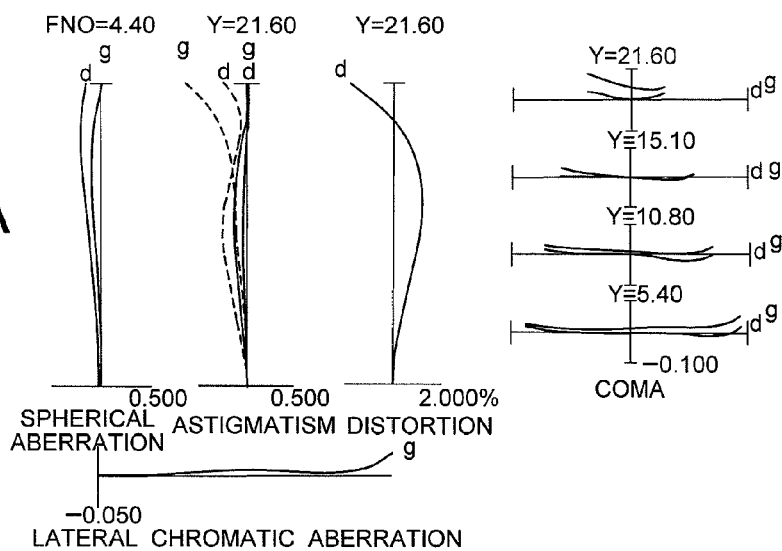
Figure 16B:
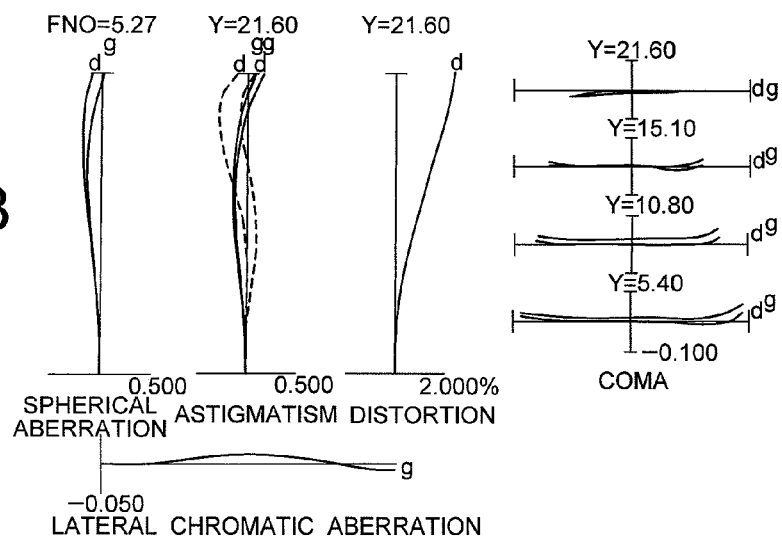
Figure 16C:
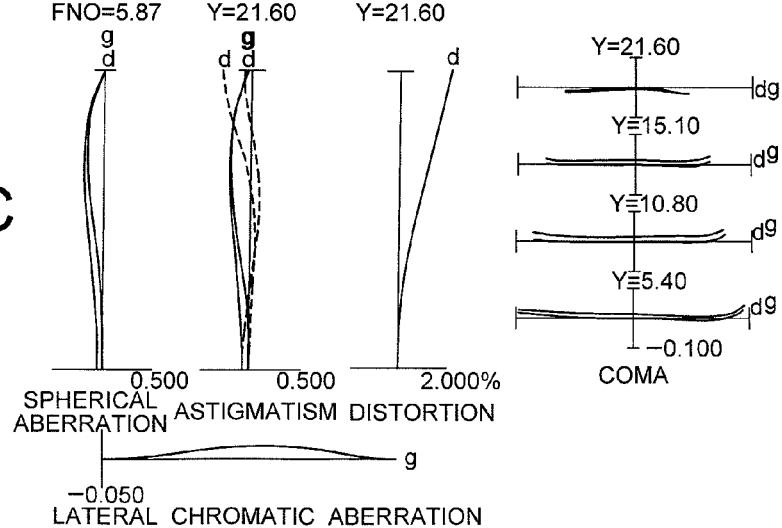

FIGS. 16A, 16B and 16C are graphs showing various aberrations of the zoom lens according to Example 7 of the second embodiment upon focusing on an infinitely distant object, in which FIG. 16A is a wide-angle end state, FIG. 16B is an intermediate focal length state, and FIG. 16C is a telephoto end state.

As is apparent from various graphs, the zoom lens according to Example 7 of the second embodiment shows superb optical performance as a result of good corrections to various aberrations including spherical aberration, curvature of field, astigmatism and coma.

Example 8

Figure 17:
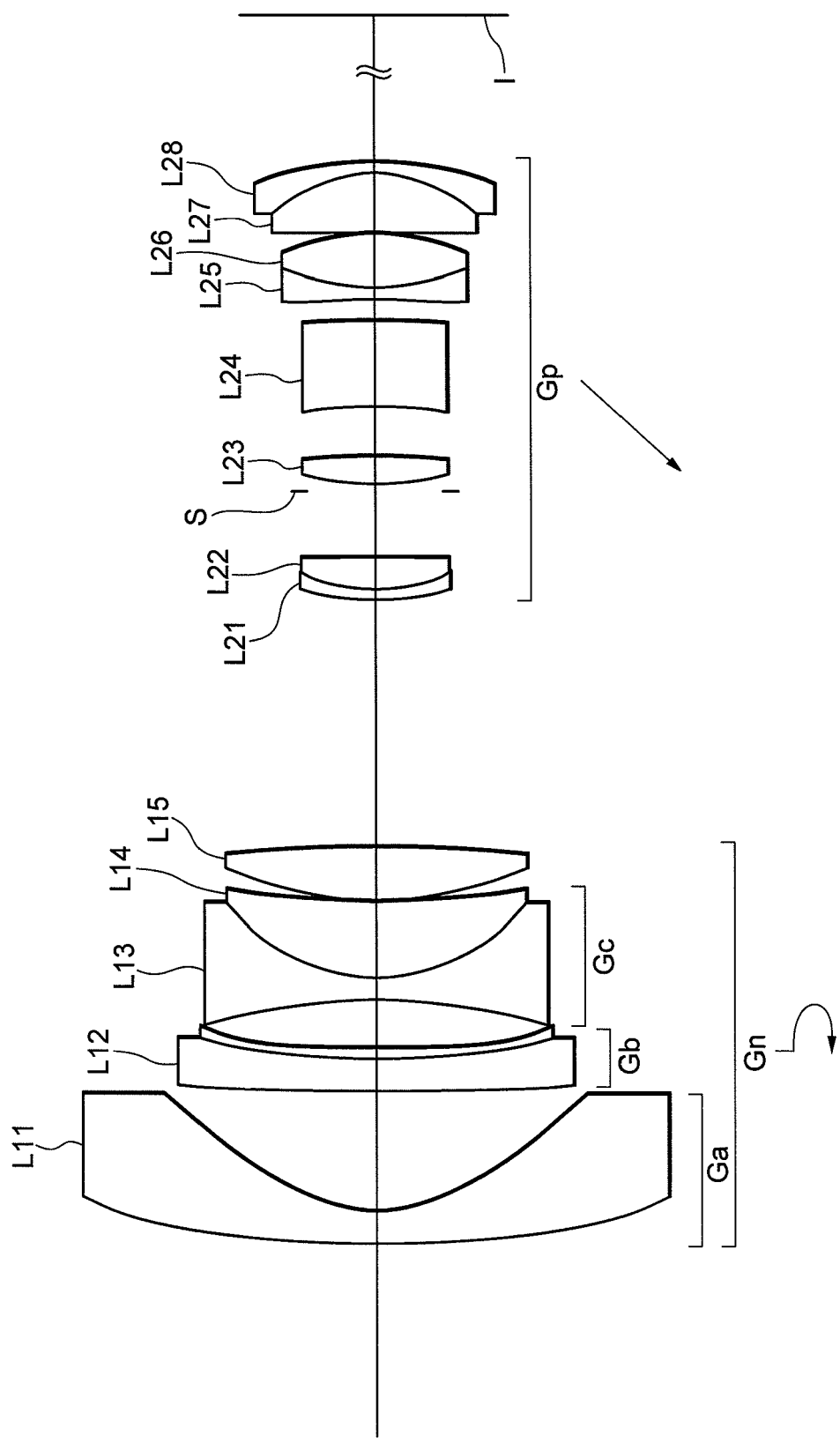
FIG. 17 is a sectional view showing a lens configuration of a zoom lens according to Example 8 of the second embodiment of the present application.

FIG. 17 is a sectional view showing a lens configuration of a zoom lens according to Example 8 of the second embodiment of the present application.

The zoom lens according to Example 8 of the second embodiment is composed of, in order from the object side, a front lens group Gn having negative refractive power, and a rear lens group Gp having positive refractive power.

The front lens group Gn is composed of, in order from the object side, an aspherical lens component Ga, an aspherical lens component Gb, a cemented negative lens component Gc and a double convex positive lens L15.

The aspherical lens component Ga is composed of a double aspherical meniscus lens L11 having negative refractive power and a concave surface facing the image plane I side. The negative refractive power becomes weaker toward periphery.

The aspherical lens component Gb is composed of a compound type aspherical positive lens L12 formed by combination of a glass material and a resin material having a shape that positive refractive power formed by combination turns to negative refractive power from the center to the periphery.

The cemented negative lens component Gc is composed of a cemented negative lens constructed by, in order from the object side, a double concave negative lens L13 cemented with a positive meniscus lens L14 having a convex surface facing the object side.

The rear lens group Gp is composed of, in order from the object side, a cemented positive lens constructed by a negative meniscus lens L21 having a convex surface facing the object side cemented with a double convex positive lens L22, an aperture stop S, a double convex positive lens L23, a negative meniscus lens L24 having a concave surface facing the object side, a cemented positive lens constructed by a double concave negative lens L25 cemented with a double convex positive lens L26, and a cemented positive lens constructed by a positive meniscus lens L27 having a convex surface facing the image plane I side cemented with a negative meniscus lens L28 having a convex surface facing the image plane I side.

In the zoom lens seen from another point of view according to Example 8 of the second embodiment, an antireflection coating explained above is applied to each of the image plane I side lens surface of the negative meniscus lens L11 and the object side lens surface of the negative lens L13 in the front lens group Gn, thereby suppressing reflection light from each lens surface and effectively suppressing ghost images and flare.

In the zoom lens according to Example 8 of the second embodiment, a distance between the front lens group Gn and the rear lens group Gp is varied, thereby carrying out zooming from the wide-angle end state to the telephoto end state. Each arrow in FIG. 17 indicates moving trajectory of each of the front lens group Gn and the rear lens group Gp upon zooming from the wide-angle end state to the telephoto end state.

Various values associated with Example 8 are listed in Table 8.

TABLE 8

(Specifications)
zoom ratio = 1.77

|  | W | M | T |
|---|---|---|---|
| F = | 16.48 | 24.00 | 29.10 |
| FNO = | 4.41 | 5.29 | 5.88 |
| ω = | 53.17 | 41.64 | 36.27° |
| Y = | 21.60 | 21.60 | 21.60 |
| TL = | 138.13 | 135.48 | 138.21 |
| Σd = | 99.84 | 84.47 | 78.57 |
| BF = | 38.29 | 51.01 | 59.64 |

(Lens Data)

| i | r | d | nd | νd |
|---|---|---|---|---|
| *1) | 118.9748 | 3.0000 | 1.744430 | 49.53 |
| *2) | 14.7456 | 11.0000 | | |
| 3) | 284.3220 | 3.0000 | 1.516800 | 64.12 |
| 4) | 70.0000 | 1.0000 | 1.553890 | 38.09 |
| *5) | −763.4452 | 4.5000 | | |
| 6) | −55.5066 | 2.0000 | 1.816000 | 46.63 |
| 7) | 17.0766 | 7.0000 | 1.603420 | 38.02 |
| 8) | 75.0652 | 0.1000 | | |
| 9) | 32.6574 | 5.0000 | 1.717360 | 29.52 |
| 10) | −157.9244 | (d10) | | |
| 11) | 23.8427 | 1.0000 | 1.795000 | 45.30 |
| 12) | 15.6582 | 3.0000 | 1.497820 | 82.56 |

TABLE 8-continued

| 13) | −1090.6220 | 6.0000 | | |
|---|---|---|---|---|
| 14) | ∞ | 0.7000 | Aperture Stop S | |
| 15) | 26.3772 | 2.5000 | 1.497820 | 82.56 |
| 16) | −77.6232 | 4.6000 | | |
| 17) | −39.5697 | 8.0000 | 1.744000 | 44.79 |
| 18) | −168.4305 | 2.0000 | | |
| 19) | −92.1532 | 1.0000 | 1.755000 | 52.29 |
| 20) | 20.6673 | 5.0000 | 1.518230 | 58.89 |
| 21) | −21.0064 | 0.1000 | | |
| 22) | −353.1908 | 5.5000 | 1.497820 | 82.56 |
| 23) | −13.5255 | 1.0000 | 1.834810 | 42.72 |
| 24) | −31.7192 | BF | | |

(Aspherical Surface Data)

Surface Number = 1

κ = 12.7326
A4 = 2.83606E−07
A6 = 4.94742E−10
A8 = 4.56144E−13
A10 = −3.11089E−16
A12 = 0.14795E−19

Surface Number = 2

κ = −0.0904
A4 = −6.75619E−06
A6 = −1.80695E−08
A8 = −4.67950E−12
A10 = −4.79969E−14
A12 = 0.21420E−15

Surface Number = 5

κ = 0.000
A4 = 2.50236E−05
A6 = 2.14959E−08
A8 = 1.65356E−10
A10 = −1.19372E−13
A12 = −0.17563E−14

(Variable Distances)

|  | W | M | T |
|---|---|---|---|
| F = | 16.48000 | 24.00000 | 29.10000 |
| d0 = | ∞ | ∞ | ∞ |
| d10 = | 22.83880 | 7.47127 | 1.56898 |
| BF = | 38.29336 | 51.01228 | 59.63815 |

(Lens Group Data)

| Group | I | Focal Length |
|---|---|---|
| Gn | 1 | −21.86055 |
| Gp | 11 | 36.97375 |

(Values for Conditional Expressions)

(6) (−Fa)/|Fb| = 0.0702
(7) (−Fn)/(Fw · Ft)$^{1/2}$ = 0.998
(8) Fp/Fw = 2.244
(9) (−Fc)/Fw = 1.663
(10) Ncn − Ncp = 0.2126

Figure 18A:
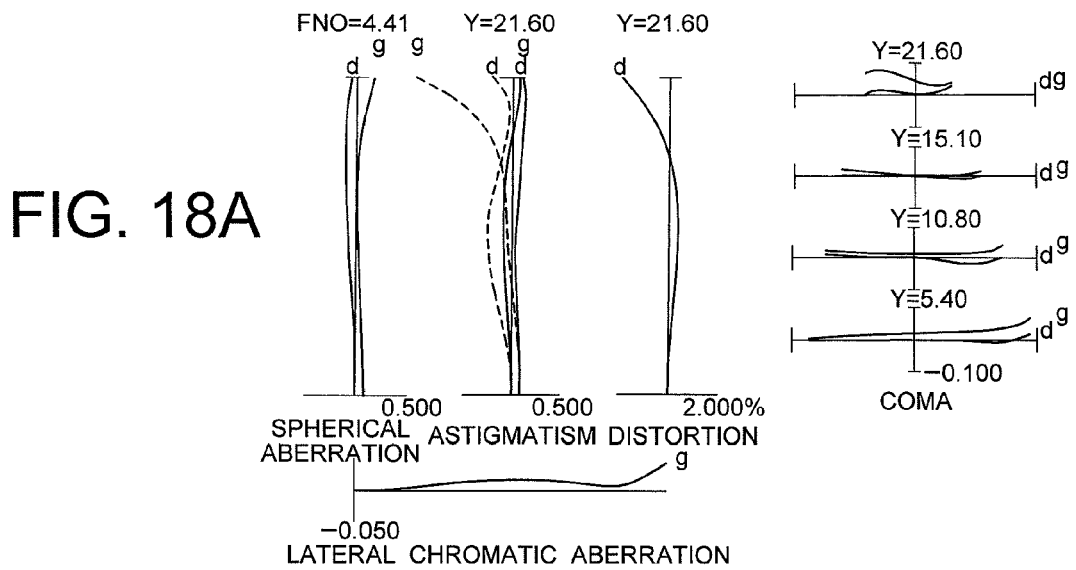
Figure 18B:
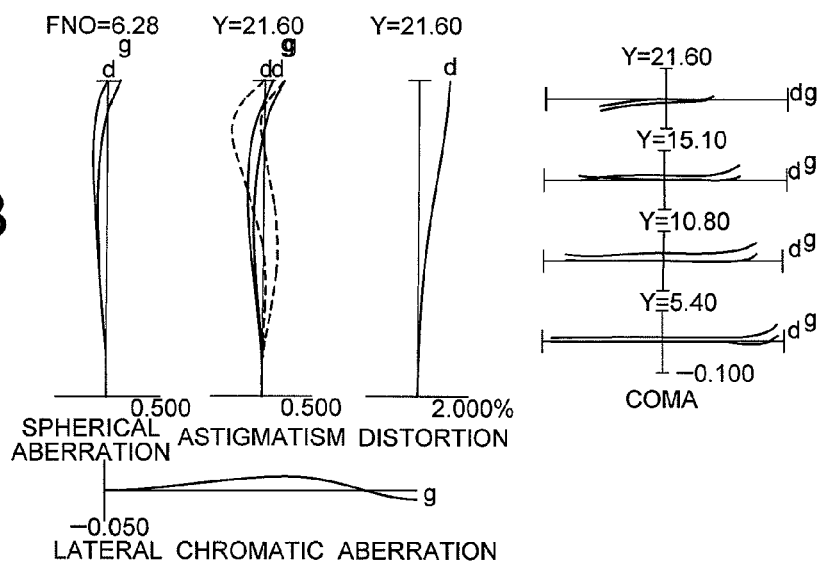
Figure 18C:
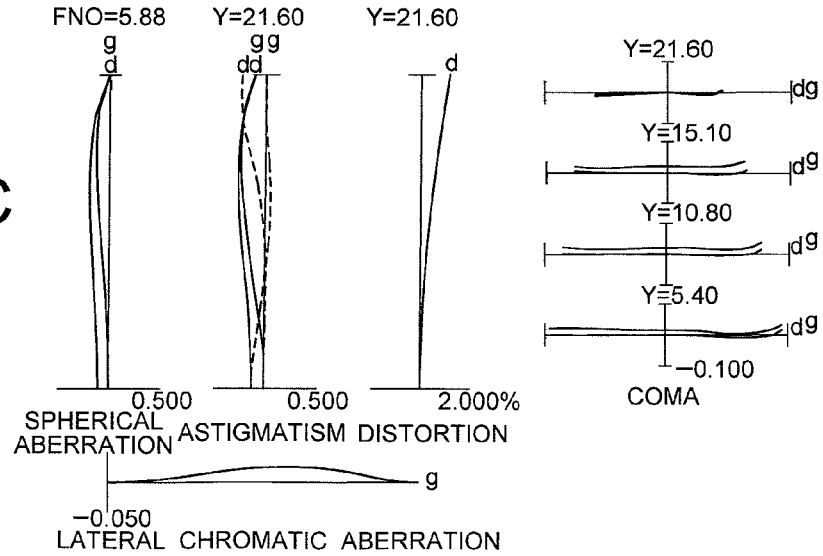

FIGS. 18A, 18B and 18C are graphs showing various aberrations of the zoom lens according to Example 8 of the second embodiment upon focusing on an infinitely distant object, in which FIG. 18A is a wide-angle end state, FIG. 18B is an intermediate focal length state, and FIG. 18C is a telephoto end state.

As is apparent from various graphs, the zoom lens according to Example 8 of the second embodiment shows superb optical performance as a result of good corrections to various aberrations including spherical aberration, curvature of field, astigmatism and coma.

Example 9

Figure 19:
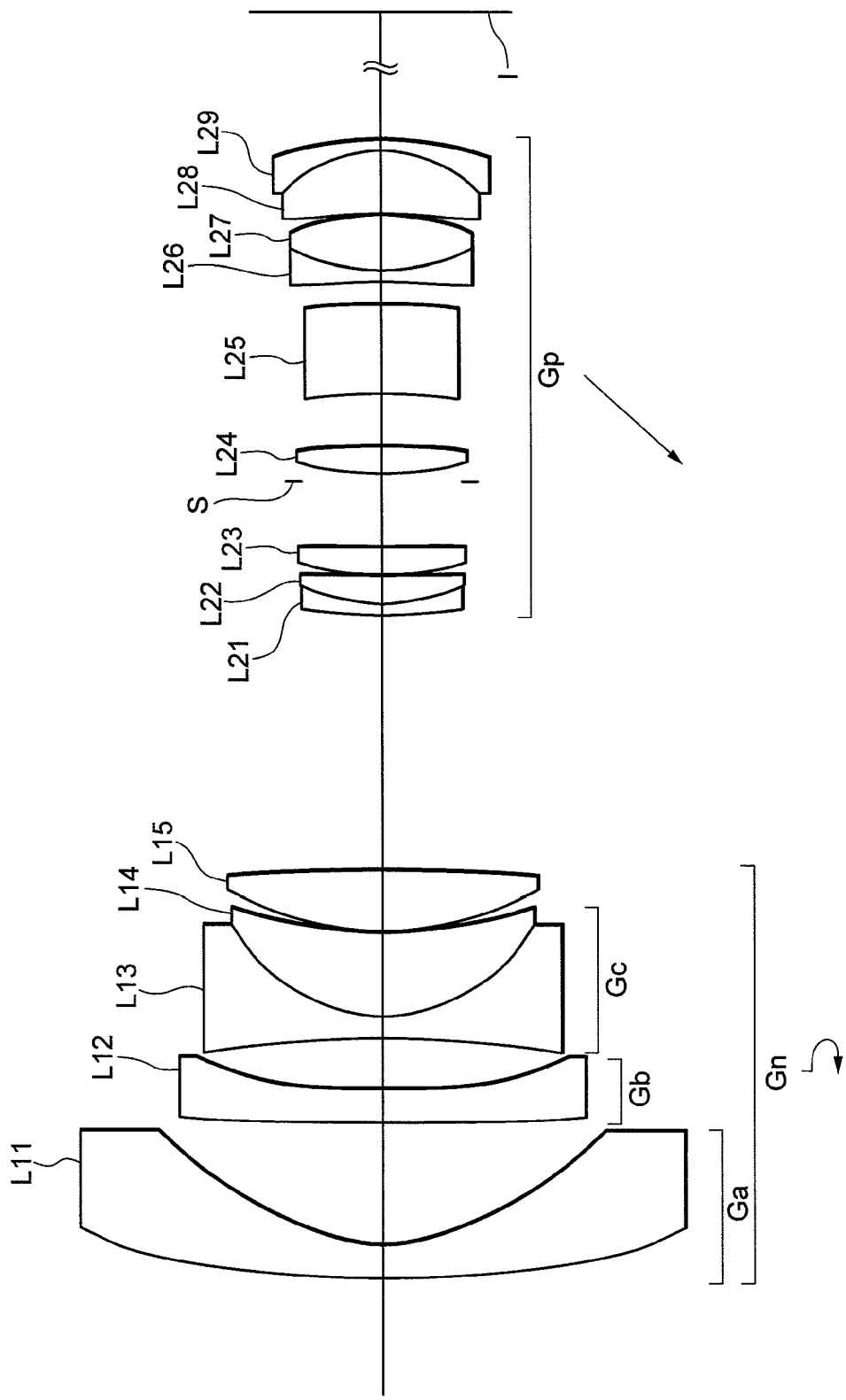
FIG. 19 is a sectional view showing a lens configuration of a zoom lens according to Example 9 of the second embodiment of the present application.

FIG. 19 is a sectional view showing a lens configuration of a zoom lens according to Example 9 of the second embodiment of the present application.

The zoom lens according to Example 9 of the second embodiment is composed of, in order from the object side, a front lens group Gn having negative refractive power, and a rear lens group Gp having positive refractive power.

The front lens group Gn is composed of, in order from the object side, an aspherical lens component Ga, an aspherical lens component Gb, a cemented negative lens component Gc and a double convex positive lens L15.

The aspherical lens component Ga is composed of a double aspherical meniscus lens L11 having negative refractive power and a concave surface facing the image plane I side. The aspherical lens component Ga has a shape that the negative refractive power becomes weaker toward periphery.

The aspherical lens component Gb is composed of an aspherical negative lens L12 having negative refractive power and a shape that negative refractive power becomes weak from the center to the periphery.

The cemented negative lens component Gc is composed of a cemented negative lens constructed by, in order from the object side, a double concave negative lens L13 cemented with a positive meniscus lens L14 having a convex surface facing the object side.

The rear lens group Gp is composed of, in order from the object side, a cemented negative lens constructed by a negative meniscus lens L21 having a convex surface facing the object side cemented with a positive meniscus lens L22 having a convex surface facing the object side, a positive meniscus lens L23 having a convex surface facing the object side, an aperture stop S, a double convex positive lens L24, a negative meniscus lens L25 having a concave surface facing the object side, a cemented positive lens constructed by a double concave negative lens L26 cemented with a double convex positive lens L27, and a cemented negative lens constructed by a positive meniscus lens L28 having a convex surface facing the image plane I side cemented with a negative meniscus lens L29 having a convex surface facing the image plane I side.

In the zoom lens seen from another point of view according to Example 9 of the second embodiment, an antireflection coating explained above is applied to each of the image plane I side lens surface of the negative meniscus lens L11 and the object side lens surface of the positive lens L15 in the front lens group Gn, thereby suppressing reflection light from each lens surface and effectively suppressing ghost images and flare.

In the zoom lens according to Example 9 of the second embodiment, a distance between the front lens group Gn and the rear lens group Gp is varied, thereby carrying out zooming from the wide-angle end state to the telephoto end state. Each arrow in FIG. 19 indicates moving trajectory of each of the front lens group Gn and the rear lens group Gp upon zooming from the wide-angle end state to the telephoto end state.

Various values associated with Example 9 are listed in Table 9.

TABLE 9

(Specifications)
zoom ratio = 1.88

|  | W | M | T |
|---|---|---|---|
| F = | 16.48 | 24.92 | 31.01 |
| FNO = | 4.32 | 5.19 | 5.86 |
| ω = | 53.87 | 40.72 | 34.68° |
| Y = | 21.60 | 21.60 | 21.60 |
| TL = | 140.236 | 139.54 | 144.237 |
| Σd = | 101.939 | 86.57 | 80.673 |
| BF = | 38.297 | 52.964 | 63.565 |

(Lens Data)

| i | r | d | nd | νd |
|---|---|---|---|---|
| *1) | 143.1913 | 3.0000 | 1.744430 | 49.53 |
| *2) | 15.6782 | 11.0000 |  |  |
| 3) | 410.4013 | 3.0000 | 1.713000 | 53.89 |
| *4) | 206.9456 | 4.5000 |  |  |
| 5) | −89.1834 | 2.0000 | 1.816000 | 46.63 |
| 6) | 15.1616 | 7.5000 | 1.603420 | 38.02 |
| 7) | 40.8243 | 0.1000 |  |  |
| 8) | 26.8914 | 5.5000 | 1.717360 | 29.52 |
| 9) | −157.9244 | (d9) |  |  |
| 10) | 46.8881 | 1.0000 | 1.804000 | 46.58 |
| 11) | 16.8336 | 2.5000 | 1.516800 | 64.12 |
| 12) | 141.4373 | 0.1000 |  |  |
| 13) | 25.7582 | 2.5000 | 1.497820 | 82.56 |
| 14) | 353.5585 | 6.0000 |  |  |
| 15) | ∞ | 0.7000 | Aperture Stop S | |
| 16) | 29.4255 | 2.5000 | 1.497820 | 82.56 |
| 17) | −63.3534 | 4.6000 |  |  |
| 18) | −51.5779 | 8.0000 | 1.744000 | 44.79 |
| 19) | −65.0596 | 2.0000 |  |  |
| 20) | −78.0641 | 1.0000 | 1.755000 | 52.29 |
| 21) | 17.7780 | 5.0000 | 1.518230 | 58.89 |
| 22) | −21.4040 | 0.1000 |  |  |
| 23) | −67.9060 | 5.5000 | 1.497820 | 82.56 |
| 24) | −12.6974 | 1.0000 | 1.834810 | 42.72 |
| 25) | −31.7192 | BF |  |  |

(Aspherical Surface Data)

Surface Number = 1

κ = 17.6085
A4 = 1.79431E−06
A6 = 6.80079E−10
A8 = −1.86415E−13
A10 = −8.67549E−16
A12 = 0.16129E−17

Surface Number = 2

κ = −0.2161
A4 = −7.04903E−06
A6 = −1.23127E−08
A8 = −1.85973E−11
A10 = −5.29912E−14
A12 = 0.27950E−15

Surface Number = 4

κ = 0.000
A4 = 2.47716E−05
A6 = 2.95962E−08
A8 = −1.58560E−13

TABLE 9-continued

A10 = −1.58560E−13
A12 = −0.20420E−14

(Variable Distances)

|      | W        | M        | T        |
|------|----------|----------|----------|
| F =  | 16.48524 | 24.91831 | 31.01490 |
| d0 = | ∞        | ∞        | ∞        |
| d9 = | 22.83854 | 7.47382  | 1.57260  |
| BF = | 38.29718 | 52.96439 | 63.56450 |

(Lens Group Data)

| Group | I  | Focal Length |
|-------|----|--------------|
| Gn    | 1  | −20.74244    |
| Gp    | 10 | 36.06477     |

(Values for Conditional Expressions)

(6) (−Fa)/|Fb| = 0.0406
(7) (−Fn)/(Fw · Ft)$^{1/2}$ = 0.884
(8) Fp/Fw = 2.188
(9) (−Fc)/Fw = 1.5222
(10) Ncn − Ncp = 0.2126

Figure 20A:
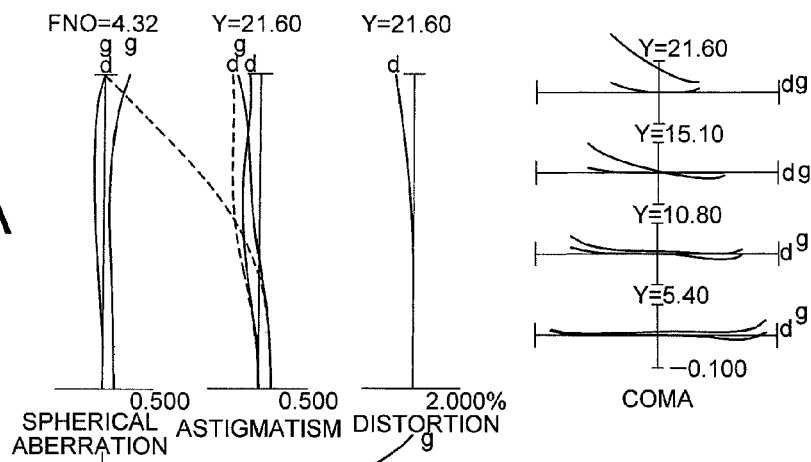
Figure 20B:
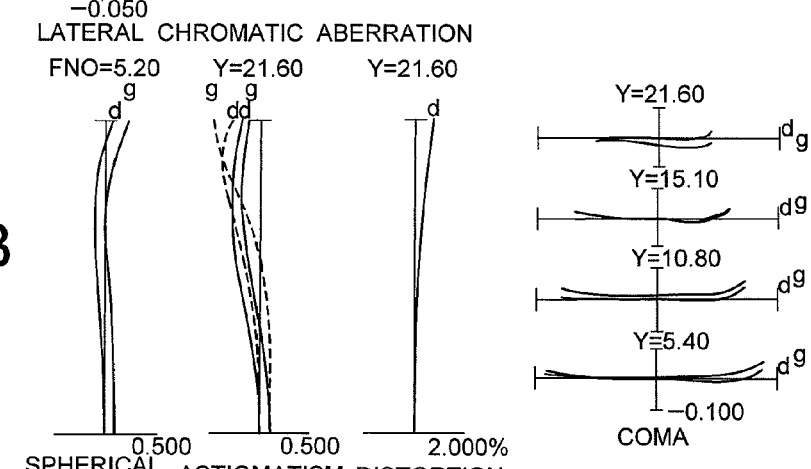
Figure 20C:
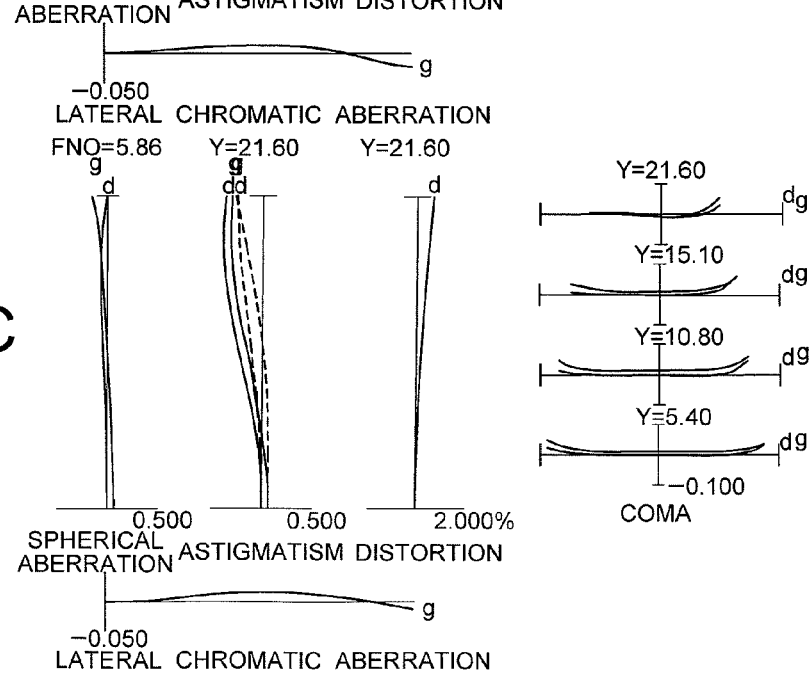

FIGS. 20A, 20B and 20C are graphs showing various aberrations of the zoom lens according to Example 9 of the second embodiment upon focusing on an infinitely distant object, in which FIG. 20A is a wide-angle end state, FIG. 20B is an intermediate focal length state, and FIG. 20C is a telephoto end state.

As is apparent from various graphs, the zoom lens according to Example 9 of the second embodiment shows superb optical performance as a result of good corrections to various aberrations including spherical aberration, curvature of field, astigmatism and coma.

Example 10

Figure 21:
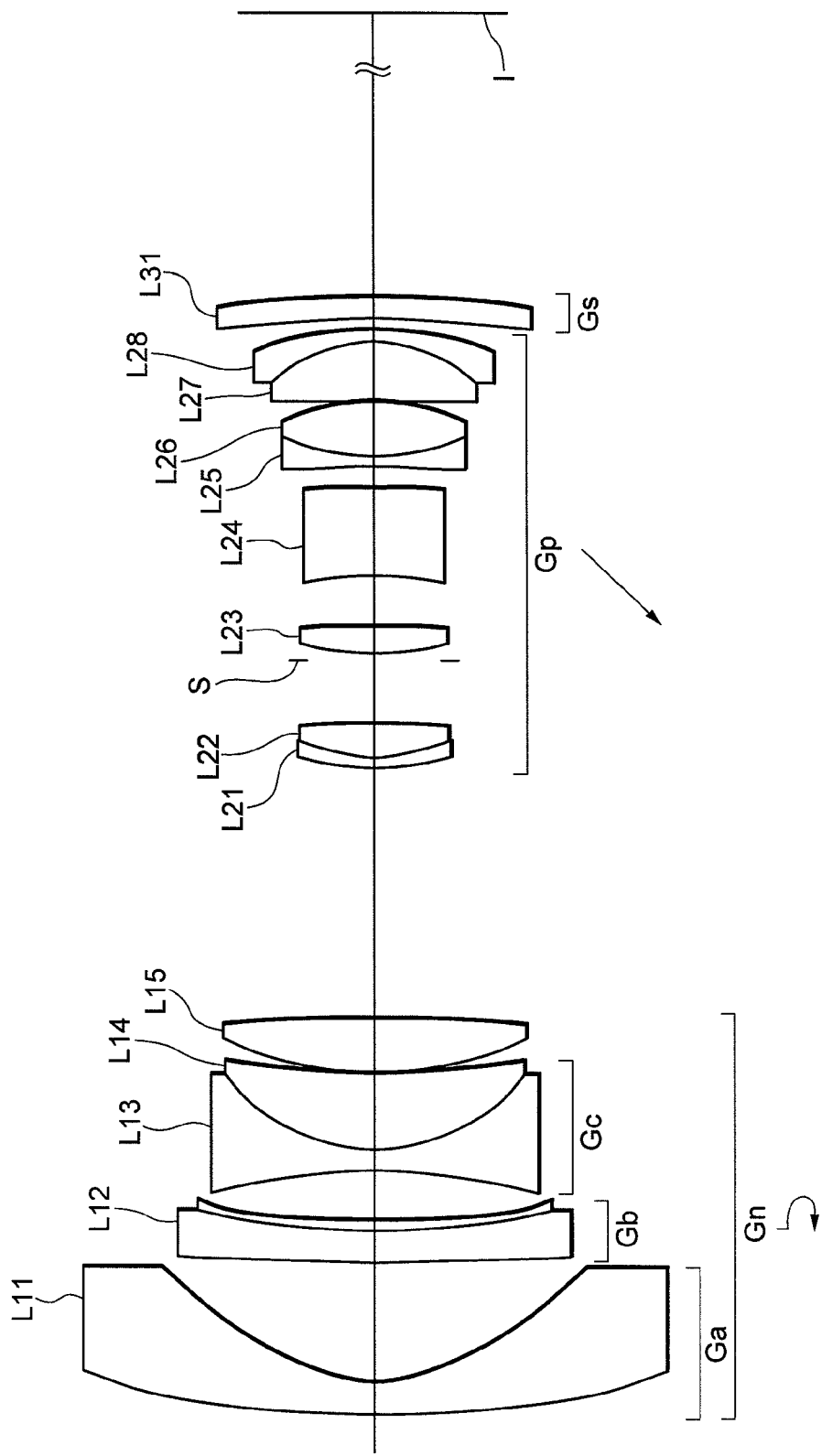
FIG. 21 is a sectional view showing a lens configuration of a zoom lens according to Example 10 of the second embodiment of the present application.

FIG. 21 is a sectional view showing a lens configuration of a zoom lens according to Example 10 of the second embodiment of the present application.

The zoom lens according to Example 10 of the second embodiment is composed of, in order from the object side, a front lens group Gn having negative refractive power, a rear lens group Gp having positive refractive power, and a fixed lens group Gs.

The front lens group Gn is composed of, in order from the object side, an aspherical lens component Ga, an aspherical lens component Gb, a cemented negative lens component Gc and a double convex positive lens L15.

The aspherical lens component Ga is composed of a double aspherical meniscus lens L11 having negative refractive power and a concave surface facing the image plane I side. The negative refractive power becomes weaker toward periphery.

The aspherical lens component Gb is composed of a compound type aspherical positive lens L12 formed by combination of a glass material and a resin material having a shape that positive refractive power formed by combination turns to negative refractive power from the center to the periphery.

The cemented negative lens component Gc is composed of a cemented negative lens constructed by, in order from the object side, a double concave negative lens L13 cemented with a positive meniscus lens L14 having a convex surface facing the object side.

The rear lens group Gp is composed of, in order from the object side, a cemented positive lens constructed by a negative meniscus lens L21 having a convex surface facing the object side cemented with a double convex positive lens L22, an aperture stop S, a double convex positive lens L23, a negative meniscus lens L24 having a concave surface facing the object side, a cemented positive lens constructed by a double concave negative lens L25 cemented with a double convex positive lens L26, and a cemented positive lens constructed by a positive meniscus lens L27 having a convex surface facing the image plane I side cemented with a negative meniscus lens L28 having a convex surface facing the image plane I side.

The fixed lens group Gs is composed of only a negative meniscus lens L31 having a convex surface facing the image plane I side.

In the zoom lens seen from another point of view according to Example 10 of the second embodiment, an antireflection coating explained above is applied to each of the image plane I side lens surface of the negative meniscus lens L11 and the object side lens surface of the negative lens L13 in the front lens group Gn, thereby suppressing reflection light from each lens surface and effectively suppressing ghost images and flare.

In the zoom lens according to Example 10 of the second embodiment, a distance between the front lens group Gn and the rear lens group Gp is varied, thereby carrying out zooming from the wide-angle end state to the telephoto end state. Each arrow in FIG. 21 indicates moving trajectory of each of the front lens group Gn and the rear lens group Gp upon zooming from the wide-angle end state to the telephoto end state.

Various values associated with Example 10 are listed in Table 10.

TABLE 10

(Specifications)
zoom ratio = 1.77

|       | W      | M      | T       |
|-------|--------|--------|---------|
| F =   | 16.48  | 24.00  | 29.10   |
| FNO = | 4.49   | 5.33   | 5.93    |
| ω =   | 52.73  | 41.73  | 36.33°  |
| Y =   | 21.60  | 21.60  | 21.60   |
| TL =  | 139.69 | 136.93 | 139.40  |
| Σd =  | 102.78 | 100.03 | 102.50  |
| BF =  | 36.90  | 36.90  | 36.90   |

(Lens Data)

| i   | r         | d       | nd              | νd    |
|-----|-----------|---------|-----------------|-------|
| *1) | 120.0323  | 3.0000  | 1.744430        | 49.53 |
| *2) | 14.8111   | 11.0000 |                 |       |
| 3)  | 320.0965  | 3.0000  | 1.516800        | 64.12 |
| 4)  | 70.0000   | 1.0000  | 1.553890        | 38.09 |
| *5) | −993.8663 | 4.5000  |                 |       |
| 6)  | −56.5907  | 2.0000  | 1.816000        | 46.63 |
| 7)  | 17.0196   | 7.0000  | 1.603420        | 38.02 |
| 8)  | 73.8459   | 0.1000  |                 |       |
| 9)  | 32.4760   | 5.0000  | 1.717360        | 29.52 |
| 10) | −157.9244 | (d10)   |                 |       |
| 11) | 23.8096   | 1.0000  | 1.795000        | 45.30 |
| 12) | 15.6593   | 3.0000  | 1.497820        | 82.56 |
| 13) | −1090.6220| 5.9435  |                 |       |
| 14) | ∞         | 0.7000  | Aperture Stop S |       |
| 15) | 26.3980   | 2.5000  | 1.497820        | 82.56 |
| 16) | −79.3224  | 4.6000  |                 |       |
| 17) | −39.5467  | 8.0000  | 1.744000        | 44.79 |
| 18) | −162.0229 | 2.0000  |                 |       |
| 19) | −92.3426  | 1.0000  | 1.755000        | 52.29 |
| 20) | 20.8016   | 5.0000  | 1.518230        | 58.89 |
| 21) | −21.0542  | 0.1000  |                 |       |
| 22) | −344.4872 | 5.5000  | 1.497820        | 82.56 |
| 23) | −13.5094  | 1.0000  | 1.834810        | 42.72 |

TABLE 10-continued

| | | | | |
|---|---|---|---|---|
| 24) | −31.7192 | (d24) | | |
| 25) | −100.0000 | 2.0000 | 1.516800 | 64.12 |
| 26) | −107.0000 | BF | | |

(Aspherical Surface Data)

Surface Number = 1

κ = 12.7063
A4 = 2.52869E−07
A6 = 5.51300E−10
A8 = 4.77913E−13
A10 = −3.07832E−16
A12 = −0.49549E−19

Surface Number = 2

κ = −0.0947
A4 = −6.70196E−06
A6 = −1.78783E−08
A8 = −5.15142E−12
A10 = −4.83366E−14
A12 = 0.21367E−15

Surface Number = 5

κ = 0.00000
A4 = 2.50710E−05
A6 = 2.09871E−08
A8 = 1.63612E−10
A10 = −1.20936E−13
A12 = −0.17594E−14

(Variable Distances)

| | W | M | T |
|---|---|---|---|
| F = | 16.48000 | 24.00000 | 29.10000 |
| d0 = | ∞ | ∞ | ∞ |
| d10 = | 22.83854 | 8.08582 | 2.08111 |
| d24 = | 1.00000 | 12.99953 | 21.47140 |
| BF = | 36.90477 | 36.90477 | 36.9047 |

(Lens Group Data)

| Group | I | Focal Length |
|---|---|---|
| Gn | 1 | −21.85385 |
| Gp | 11 | 36.95878 |
| Gs | 25 | −3276.74607 |

(Values for Conditional Expressions)

(6) (−Fa)/|Fb| = 0.0620
(7) (−Fn)/(Fw · Ft)$^{1/2}$ = 0.998
(8) Fp/Fw = 2.243
(9) (−Fc)/Fw = 1.636
(10) Ncn − Ncp = 0.2126

Figure 22A:
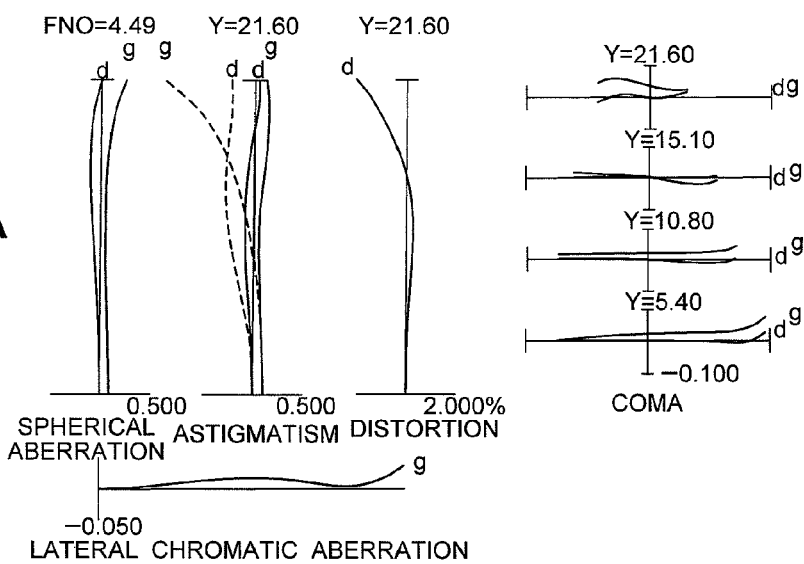
Figure 22B:
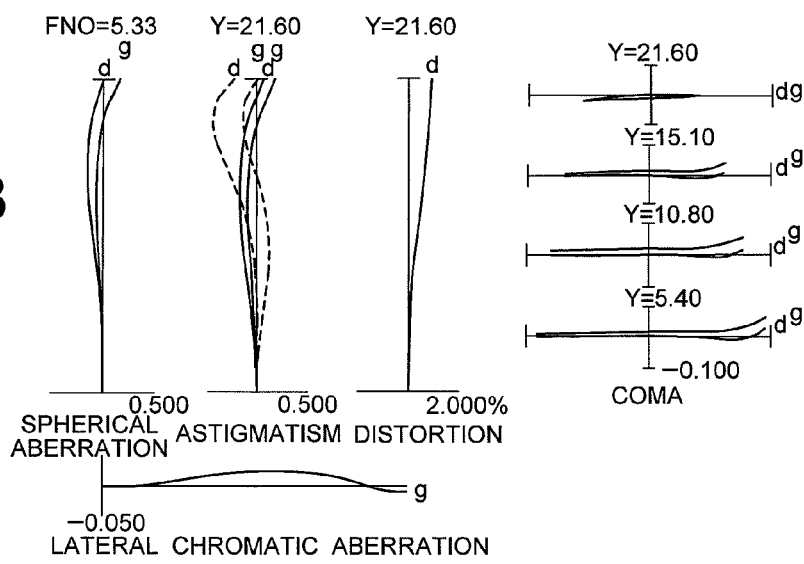
Figure 22C:
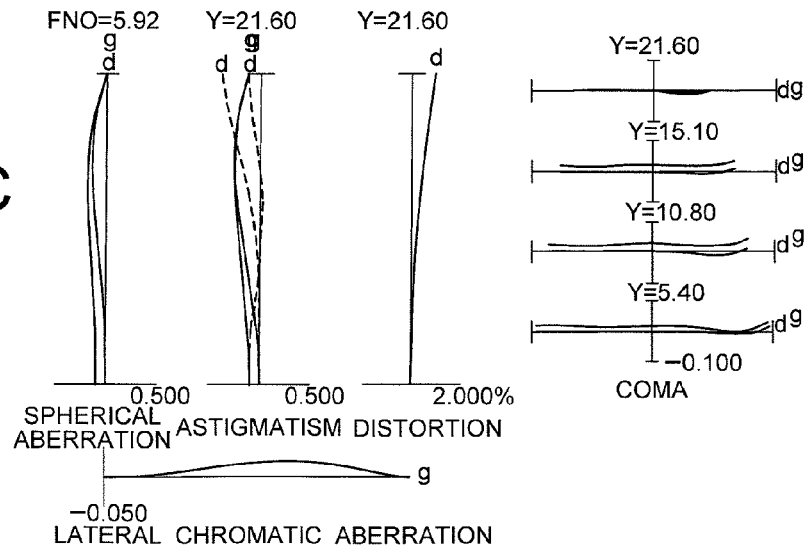

FIGS. 22A, 22B and 22C are graphs showing various aberrations of the zoom lens according to Example 10 of the second embodiment upon focusing on an infinitely distant object, in which FIG. 22A is a wide-angle end state, FIG. 22B is an intermediate focal length state, and FIG. 22C is a telephoto end state.

As is apparent from various graphs, the zoom lens according to Example 10 of the second embodiment shows superb optical performance as a result of good corrections to various aberrations including spherical aberration, curvature of field, astigmatism and coma.

An antireflection coating (which is also referred to as a multi-layered broadband antireflection coating) applied to the zoom lens seen from another point of view according each Example of the second embodiment is the same one explained above with reference to FIGS. 23 through 28.

Then, an example of applying the antireflection coating shown in the Tables 11 and 12 to Examples 6 through 10 of the second embodiment discussed above is explained.

In the zoom lens seen from another point of view according to Example 6, as shown in the Table 6, the refractive index nd of the negative meniscus lens L11 of the front lens group Gn is 1.744430 (nd=1.744430), and the refractive index nd of the negative lens L13 of the front lens group Gn is 1.816000 (nd=1.816000), whereby it is feasible to reduce the reflected light from each lens surface and to reduce ghost images and flare as well by applying the antireflection coating 101 (see Table 11) corresponding to 1.74 as the substrate refractive index to the image side lens surface of the negative meniscus lens L11 and applying the antireflection coating (see Table 11) corresponding to 1.85 as the substrate refractive index to the object side lens surface of the negative lens L13.

In the zoom lens seen from another point of view according to Example 7, as shown in the Table 7, the refractive index nd of the negative meniscus lens L11 of the front lens group Gn is 1.744430 (nd=1.744430), and the refractive index nd of the negative lens L13 of the front lens group Gn is 1.816000 (nd=1.816000), whereby it is feasible to reduce the reflected light from each lens surface and to reduce ghost images and flare as well by applying the antireflection coating 101 (see Table 11) corresponding to 1.74 as the substrate refractive index to the image side lens surface of the negative meniscus lens L11 and applying the antireflection coating (see Table 11) corresponding to 1.85 as the substrate refractive index to the object side lens surface of the negative lens L13.

In the zoom lens seen from another point of view according to Example 8, as shown in the Table 8, the refractive index nd of the negative meniscus lens L11 of the front lens group Gn is 1.744430 (nd=1.744430), and the refractive index nd of the negative lens L13 of the front lens group Gn is 1.816000 (nd=1.816000), whereby it is feasible to reduce the reflected light from each lens surface and to reduce ghost images and flare as well by applying the antireflection coating 101 (see Table 11) corresponding to 1.74 as the substrate refractive index to the image side lens surface of the negative meniscus lens L11 and applying the antireflection coating (see Table 11) corresponding to 1.85 as the substrate refractive index to the object side lens surface of the negative lens L13.

In the zoom lens seen from another point of view according to Example 9, as shown in the Table 9, the refractive index nd of the negative meniscus lens L11 of the front lens group Gn is 1.744430 (nd=1.744430), and the refractive index nd of the positive lens L15 of the front lens group Gn is 1.717360 (nd=1.717360), whereby it is feasible to reduce the reflected light from each lens surface and to reduce ghost images and flare as well by applying the antireflection coating 101 (see Table 11) corresponding to 1.74 as the substrate refractive index to the image side lens surface of the negative meniscus lens L11 and applying the antireflection coating (see Table 11) corresponding to 1.74 as the substrate refractive index to the object side lens surface of the positive lens L15.

In the zoom lens seen from another point of view according to Example 10, as shown in the Table 10, the refractive index nd of the negative meniscus lens L11 of the front lens group Gn is 1.744430 (nd=1.744430), and the refractive index nd of the positive lens L15 of the front lens group Gn is 1.717360 (nd=1.717360), whereby it is feasible to reduce the reflected light from each lens surface and to reduce ghost images and flare as well by applying the antireflection coating 101 (see Table 11) corresponding to 1.74 as the substrate refractive index to the image side lens surface of the negative meniscus lens L11 and applying the antireflection coating (see Table 11) corresponding to 1.74 as the substrate refractive index to the object side lens surface of the positive lens L15.

As described above, each example of the second embodiment makes it possible to realize a downsized retrofocus type zoom lens suitable for an imaging apparatus such as a single-lens reflex camera, having an angle of view of 2ω=106.3 degrees or more in the wide-angle end state, an f-number of about 4 to 5.6, fewer number of lens elements, a small diameter of the front lens, in other words, a small filter diameter, and excellent optical performance with excellently correcting various aberrations, suppressing ghost images and flare.

Figure 30:
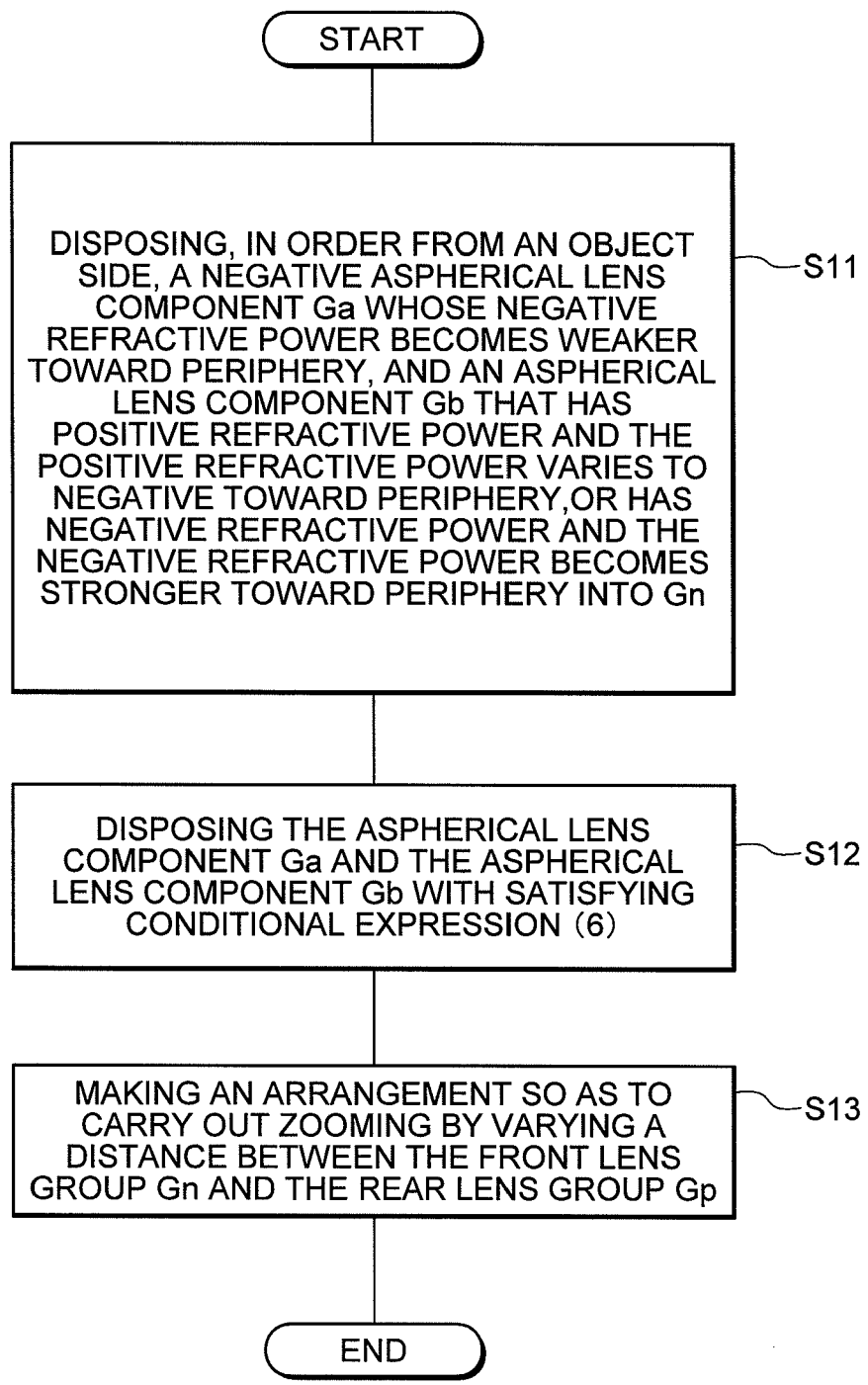
FIG. 30 is a flowchart schematically explaining a method for manufacturing the zoom lens according to the second embodiment.

Then, an outline of a method for manufacturing a zoom lens according to the first embodiment is explained with reference to FIG. 30.

The method for manufacturing a zoom lens according to the second embodiment is a method for manufacturing a zoom lens including, in order from an object side, a front lens group Gn having negative refractive power, and a rear lens group Gp having positive refractive power, and being constructed such that at least one optical surface in the front lens group is applied with an antireflection coating, and the antireflection coating includes at least one layer that is formed by a wet process, the method including steps S11 through S13.

Step S11: disposing, in order from the object side, a negative aspherical lens component Ga whose negative refractive power becomes weaker toward periphery, and an spherical lens component Gb that has positive refractive power and the positive refractive power varies to negative power toward periphery, or has negative refractive power and the negative refractive power becomes stronger toward periphery into the front lens group Gn.

Step S12: Disposing the front lens group Gn and the rear lens group Gp with satisfying conditional expression (6):

$$0.000 \le (-Fa)/|Fb| < 0.650 \qquad (6)$$

where Fa denotes a focal length of the aspherical lens component Ga in the front lens group, and Fb denotes a focal length of the aspherical lens component Gb in the front lens group.

Step S13: making an arrangement so as to carry out zooming by varying a distance between the front lens group Gn and the rear lens group Gp.

With this method for manufacturing a zoom lens according to the second embodiment, it becomes possible to manufacture a downsized zoom lens having a wide angle of view and excellent optical performance with fewer number of lenses with correcting various aberrations suppressing ghost images and flare.

The above described Examples of each embodiment of the present application only show a specific example for the purpose of better understanding of the present application. Accordingly, it is needless to say that the present application in its broader aspect is not limited to the specific details and representative devices.

Incidentally, the following description may suitably be applied within limits that do not deteriorate optical performance.

In the above described explanations and Examples, although zoom lenses having a two-lens-group configuration and a three-lens-group configuration have been shown, the present application can be applied to other lens configurations such as a four-lens-group configuration and a five-lens-group configuration. Specifically, a lens configuration in which a lens or a lens group is added to the most object side, or the most image side of the zoom lens is possible. Incidentally, a lens group is defined as a portion including at least one lens separated by air spaces.

In a zoom lens according to the present application, in order to vary focusing from infinitely distant object to a close object, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that at least a portion of the front lens group or the rear lens group is moved as the focusing lens group.

Moreover, in a zoom lens according to the present application, a lens group or a portion of a lens group may be moved as a vibration reduction lens group in a direction perpendicular to the optical axis, or tilted (swayed) in a direction including the optical axis thereby correcting an image blur caused by a camera shake. In particular, at least a portion of the rear lens group is preferably made as the vibration reduction lens group.

In a zoom lens according to the present application, any lens surface may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

In a zoom lens according to the present application, although an aperture stop is preferably disposed between the focusing lens group Gf and the positive lens group Gr in the rear lens group Gp, the aperture stop may be disposed between the front lens group Gn and the focusing lens group Gf, or between the positive lens La and the negative lens Lb in the positive lens group Gr. Otherwise, the aperture stop may be moved in a body with the focusing lens group Gf. Moreover, the function may be substituted by a lens frame without disposing a member as an aperture stop.

Moreover, the lens surface of the lenses composing the zoom lens may be applied with an antireflection coating having a high transmittance in a broad wavelength range. With this contrivance, it is feasible to attain the high contrast and the high optical performance by reducing a flare and ghost images.

In a zoom lens according to the present application, the zoom ratio is about 2 to 7.

In a zoom lens according to the present application, the front lens group preferably includes two positive lens components and two negative lens components, and, in particular, these lens components are preferably disposed, in order from the object side, negative-positive-negative-positive with disposing air spaces between them. Otherwise, the front lens group preferably includes one positive lens component and three negative lens components, and, in particular, these lens components are preferably disposed, in order from the object side, negative-negative-negative-positive with disposing air spaces between them. Moreover, the rear lens group preferably includes three positive lens components and two negative lens components, and, in particular, these lens components are preferably disposed, in order from the object side, positive-positive-negative-positive-negative with disposing air spaces between them. Otherwise, the rear lens group preferably includes four positive lens components and one negative lens component, and, in particular, these lens components are preferably disposed, in order from the object side, positive-positive-negative-positive-positive with disposing air spaces between them. Otherwise, the rear lens group preferably includes three positive lens components and one negative lens component, and, in particular, these lens components are preferably disposed, in order from the object side, positive-positive-negative-positive with disposing air spaces between them.

Then, a camera, which is an optical apparatus equipped with the lens system according to the present embodiment, is explained. Although a case that the lens system according to Example 1 of the first embodiment is installed is explained, the same result can be obtained by a lens system according to any other Examples according to first embodiment as well as the second embodiment.

Figure 31:
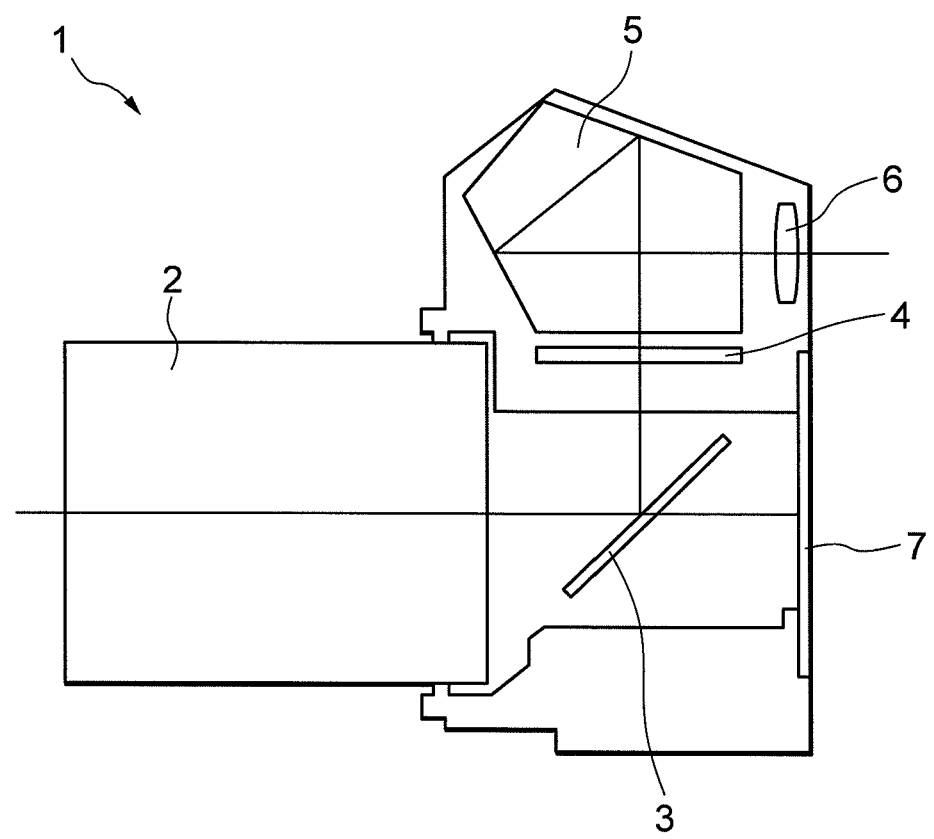
FIG. 31 is a diagram showing a construction of a camera equipped with the zoom lens according to Example 1 of the first embodiment.

FIG. 31 is a sectional view showing a single-lens reflex digital camera equipped with the lens system according to Example 1 of the first embodiment.

In FIG. 31, the camera 1 is a single-lens reflex digital camera 1 equipped with the zoom lens according to Example 1 as an imaging lens 2.

In the camera 1, light emitted from an unillustrated object is converged by the imaging lens 2, reflected by a quick return mirror 3, and focused on a focusing screen 4. The light focused on the focusing screen 4 is reflected a plurality of times in a pentagonal roof prism 5, and led to an eyepiece 6. Accordingly, a photographer can observe the object image as an erected image through the eyepiece 6.

When the photographer presses an unillustrated release button all the way down, the quick return mirror 3 is retracted from the optical path, the light from the unillustrated object is formed an object image on an imaging device 7. Accordingly, the light emitted from the object is captured by the imaging device 7, and stored in an unillustrated memory as a photographed image of the object. In this manner, the photographer can take a picture of an object by the camera 1.

With installing the lens system according to Example 1 as an imaging lens 2 into the camera 1, it becomes possible to realize a camera having high optical performance.

What is claimed is:

1. A zoom lens comprising, in order from an object side:
a front lens group having negative refractive power; and
a rear lens group having positive refractive power,
the front lens group including, in order from the object side,
an aspherical lens component Ga that has negative refractive power and a shape that the negative refractive power becomes smaller toward the periphery, and an aspherical lens component Gb that has positive refractive power and a shape that the positive refractive power turns to negative refractive power toward the periphery or has negative refractive power and a shape that the negative refractive becomes stronger toward the periphery,
a distance between the front lens group and the rear lens group being varied thereby carrying out zooming from a wide-angle end state to a telephoto end state,
the following conditional expression being satisfied:

$0.0406 \leq (-Fa)/|Fb| < 0.650$ where Fa denotes a focal length of the aspherical lens component Ga in the front lens group, and Fb denotes a focal length of the aspherical lens component Gb in the front lens group.

2. The zoom lens according to claim 1, wherein the following conditional expression is satisfied:

$0.50 < (-Fn)/(Fw \cdot Ft)^{1/2} < 1.30$ where Fn denotes a focal length of the front lens group upon focusing on an infinitely distant object, Fw denotes a focal length of the zoom lens in the wide-angle end state upon focusing on an infinitely distant object, and Ft denotes a focal length of the zoom lens in the telephoto end state upon focusing on an infinitely distant object.

3. The zoom lens according to claim 1, wherein the following conditional expression is satisfied:

$1.50 < Fp/Fw < 3.00$ where Fp denotes a focal length of the rear lens group upon focusing on an infinitely distant object, and Fw denotes a focal length of the zoom lens in the wide-angle end state upon focusing on an infinitely distant object.

4. The zoom lens according to claim 1, wherein
the front lens group includes the aspherical lens component Ga and the aspherical lens component Gb, and further includes at least a cemented negative lens component Gc constructed by a negative lens cemented with a positive lens, and the following conditional expression is satisfied:

$0.50 < (-Fc)/Fw < 5.00$ where Fc denotes a focal length of the cemented negative lens component Gc in the front lens group, and Fw denotes a focal length of the zoom lens in the wide-angle end state upon focusing on an infinitely distant object.

5. The zoom lens according to claim 4, wherein the following conditional expression is satisfied:

$0.00 < Ncn - Ncp$ where Ncn denotes a refractive index at d-line (wavelength $\lambda = 587.6$ nm) of the negative lens in the cemented negative lens component Gc, and Ncp denotes a refractive index at d-line (wavelength $\lambda = 587.6$ nm) of the positive lens in the cemented negative lens component Gc.

6. The zoom lens according to claim 1, wherein the front lens group includes the aspherical lens component Ga and the aspherical lens component Gb, and further includes a cemented negative lens component Gc constructed by a negative lens cemented with a positive lens, and a positive lens disposed to the image side of the cemented negative lens component Gc.

7. The zoom lens according to claim 6, wherein the following conditional expression is satisfied:

$0.00 < Ncn - Ncp$ where Ncn denotes a refractive index at d-line (wavelength $\lambda = 587.6$ nm) of the negative lens in the cemented negative lens component Gc, and Ncp denotes a refractive index at d-line (wavelength $\lambda = 587.6$ nm) of the positive lens in the cemented negative lens component Gc.

8. The zoom lens according to claim 1, wherein the aspherical, lens component Ga in the front lens group has a shape that the radius of curvature of the image side lens surface becomes large toward the periphery, and the radius of curvature of the object side lens surface becomes small toward the periphery.

9. The zoom lens according to claim 1, wherein the aspherical lens component Gb in the front lens group is composed of a compound lens formed by a glass material and a resin material.

10. The zoom lens according to claim 1, wherein an antireflection coating is applied on at least one optical surface of the front lens group, and the antireflection coating includes at least one layer that is formed by a wet process.

11. The zoom lens according to claim 10, wherein the antireflection coating is a multilayer film, and the layer formed by the wet process is the outermost layer among the layers composing the multilayer coating.

12. The zoom lens according to claim 10, wherein when a refractive index at d-line of the layer formed by the wet process is denoted by nd, the refractive index nd is 1.30 or less.

13. The zoom lens according to claim 10, wherein an optical surface on which the antireflection coating is applied is a concave surface seen from an aperture stop.

14. The zoom lens according to claim 13, wherein the concave surface on which the antireflection coating is applied is an image side lens surface.

15. The zoom lens according to claim 14, wherein the image side lens surface is the most object side lens.

16. The zoom lens according to claim 13, wherein the concave surface on which the antireflection coating is applied is an object side lens surface.

17. The zoom lens according to claim 10, wherein an optical surface on which the antireflection coating is applied is a concave surface seen from the object side.

18. The zoom lens according to claim 17, wherein the concave surface is the object side lens surface of the image side third lens from the most object side of the front lens group.

19. The zoom lens according to claim 10, wherein optical surfaces on which the antireflection coating is applied are an image side lens surface of the most object side lens which is a concave surface seen from the aperture stop, and an object side lens surface of the image side third lens from the most object side of the front lens group which is a concave surface seen from the object.

20. An imaging apparatus equipped with the zoom lens according to claim 1.

21. A method for manufacturing a zoom lens including, in order from an object side, a front lens group having negative refractive power, and a rear lens group having positive refractive power, the method comprising steps of:
  disposing, in order from the object side, an aspherical lens component Ga that has negative refractive power and the negative refractive power becomes weaker toward periphery, and an aspherical lens component Gb that has positive refractive power and the positive refractive power varies to negative toward periphery, or has negative refractive power and the negative refractive power becomes strong toward periphery into the front lens group;
  disposing the aspherical lens component Ga and the aspherical lens component Gb with satisfying the following conditional expression:

$0.0406 \leq (-Fa)/|Fb| < 0.650$ where Fa denotes a focal length of the aspherical lens component Ga in the front lens group, and Fb denotes a focal length of the aspherical lens component Gb in the front lens group; and
  making an arrangement so as to carry out zooming by varying a distance between the front lens group and the rear lens group.

22. The method according to claim 21, further comprising a step of:
  disposing the front lens group with satisfying the following conditional expression:

$0.50 < (-Fn)/(Fw \cdot Ft)^{1/2} < 1.30$ where Fn denotes a focal length of the front lens group upon focusing on an infinitely distant object, Fw denotes a focal length of the zoom lens in the wide-angle end state upon focusing on an infinitely distant object, and Ft denotes a focal length of the zoom lens in the telephoto end state upon focusing on an infinitely distant object.

23. The method according to claim 21, further comprising a step of:
  disposing the front lens group with satisfying the following conditional expression:

$1.50 < Fp/Fw < 3.00$ where Fp denotes a focal length of the rear lens group upon focusing on an infinitely distant object, and Fw denotes a focal length of the zoom lens in the wide-angle end state upon focusing on an infinitely distant object.

24. The method according to claim 21, further comprising a step of:
  disposing the front lens group with including the aspherical lens component Ga and the aspherical lens component Gb, and further including at least a cemented negative lens component Gc constructed by a negative lens cemented with a positive lens, with satisfying the following conditional expression:

$0.50 < (-Fc)/Fw < 5.00$ where Fc denotes a focal length of the cemented negative lens component Gc in the front lens group, and Fw denotes a focal length of the zoom lens in the wide-angle end state upon focusing on an infinitely distant object.

25. The method according to claim 21, further comprising a step of:
  disposing the front lens group with including the aspherical lens component Ga and the aspherical lens component Gb, and further including a cemented negative lens component Gc constructed by a negative lens cemented with a positive lens, and a positive lens disposed to the image side of the cemented negative lens component Gc.

26. The method according to claim 21, further including a step of:
  applying an antireflection coating on at least one optical surface of the front lens group, and the antireflection coating including at least one layer that is formed by a wet process.

27. The method according to claim 26, further including a step of:
  applying the antireflection coating whose refractive index at d-line nd of the layer formed by the wet process is 1.30 or less.

28. The method according to claim 26, further including a step of:
  applying the antireflection coating on a concave surface seen from an aperture stop.

29. The method according to claim 26, further including a step of:
  applying the antireflection coating on an image side lens surface of the most object side lens which is a concave surface seen from the aperture stop, and an object side lens surface of the image side third lens from the most object side of the front lens group which is a concave surface seen from the object.

* * * * *